(12) United States Patent
Yoshimoto et al.

(10) Patent No.: US 12,001,634 B2
(45) Date of Patent: Jun. 4, 2024

(54) DISPLAY APPARATUS AND DRIVING METHOD THEREOF

(71) Applicant: Semiconductor Energy Laboratory Co., Ltd., Kanagawa-ken (JP)

(72) Inventors: Satoshi Yoshimoto, Kanagawa (JP); Kazunori Watanabe, Tokyo (JP); Susumu Kawashima, Kanagawa (JP); Ryo Yamauchi, Kanagawa (JP); Motoharu Saito, Kanagawa (JP); Koji Kusunoki, Kanagawa (JP); Shunpei Yamazaki, Tokyo (JP)

(73) Assignee: Semiconductor Energy Laboratory Co., Ltd. (JP)

( * ) Notice: Subject to any disclaimer, the term of this patent is extended or adjusted under 35 U.S.C. 154(b) by 0 days.

(21) Appl. No.: 17/919,659

(22) PCT Filed: Apr. 19, 2021

(86) PCT No.: PCT/IB2021/053189
§ 371 (c)(1),
(2) Date: Oct. 18, 2022

(87) PCT Pub. No.: WO2021/214617
PCT Pub. Date: Oct. 28, 2021

(65) Prior Publication Data
US 2023/0152926 A1     May 18, 2023

(30) Foreign Application Priority Data

Apr. 24, 2020   (JP) ................................ 2020-077033

(51) Int. Cl.
  *G06F 3/042*   (2006.01)
  *G06T 7/20*    (2017.01)
  *G09G 3/3233*  (2016.01)

(52) U.S. Cl.
  CPC ................ *G06F 3/042* (2013.01); *G06T 7/20* (2013.01); *G09G 3/3233* (2013.01);
  (Continued)

(58) Field of Classification Search
  CPC . G06F 3/042; G06T 7/20; G06T 2207/20081; G09G 3/3233; G09G 2300/08; G09G 2310/08; G09G 2330/023
  See application file for complete search history.

(56) References Cited

U.S. PATENT DOCUMENTS 10,061,425 B2   8/2018   Hu
11,062,667 B2   7/2021   Kawashima et al.
(Continued)

FOREIGN PATENT DOCUMENTS

CN   105892776 A     8/2016
JP   2002-297305 A   10/2002
(Continued)

OTHER PUBLICATIONS

International Search Report (Application No. PCT/IB2021/053189) dated Jul. 13, 2021.
(Continued)

*Primary Examiner* — Kwang-Su Yang
(74) *Attorney, Agent, or Firm* — Husch Blackwell LLP

(57) ABSTRACT

A display apparatus capable of performing authentication in a short time is provided. The display apparatus includes a first display portion where first pixels are arranged in a matrix, a second display portion where second pixels are arranged in a matrix, first and second row driver circuits, and a control circuit. Each of the first and the second pixels includes a light-receiving element. The first and the second pixels each have a function of acquiring imaging data by using the light-receiving element. The first and the second row driver circuits each have a function of selecting the first
(Continued)

and the second pixels which read out the imaging data. The control circuit has a function of sequentially driving the first and the second row driver circuits in a first mode, and has a function of driving one of the first and the second row driver circuits on the basis of the imaging data in the second mode. Each of the scan rates of the first and the second row driver circuits in the first mode is higher than the scan rate of the first or the second row driver circuit in the second mode.

11 Claims, 29 Drawing Sheets

(52) U.S. Cl.
CPC .............. *G06T 2207/20081* (2013.01); *G09G 2300/08* (2013.01); *G09G 2310/08* (2013.01); *G09G 2330/023* (2013.01)

(56) References Cited

U.S. PATENT DOCUMENTS

| | | |
|---|---|---|
| 11,394,014 B2 | 7/2022 | Kubota et al. |
| 2009/0179923 A1* | 7/2009 | Amundson .......... G09G 3/2018 345/690 |
| 2016/0239146 A1 | 8/2016 | Hu |
| 2018/0151144 A1 | 5/2018 | Kawashima et al. |
| 2019/0130087 A1 | 5/2019 | Mori et al. |
| 2019/0325822 A1* | 10/2019 | Li ........................ G09G 3/3233 |
| 2021/0096678 A1 | 4/2021 | Kubota et al. |
| 2021/0193071 A1 | 6/2021 | Kawashima et al. |
| 2022/0057873 A1 | 2/2022 | Kubota et al. |
| 2022/0327187 A1 | 10/2022 | Yoshimoto et al. |

FOREIGN PATENT DOCUMENTS

| | | |
|---|---|---|
| JP | 2016-164777 A | 9/2016 |
| JP | 2019-079415 A | 5/2019 |
| JP | 2019-125072 A | 7/2019 |
| WO | WO 2019/138621 A1 | 7/2019 |

OTHER PUBLICATIONS

Written Opinion (Application No. PCT/IB2021/053189) dated Jul. 13, 2021.

* cited by examiner

FIG. 5A
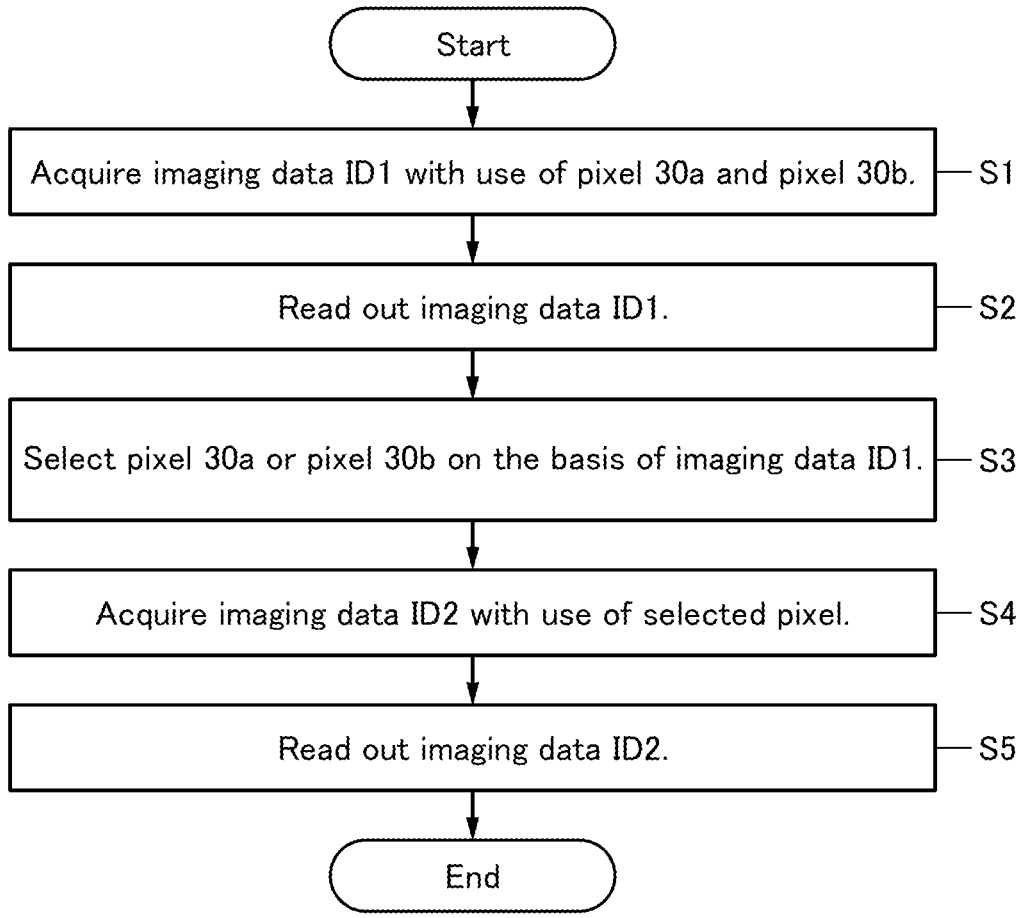
FIG. 5B1
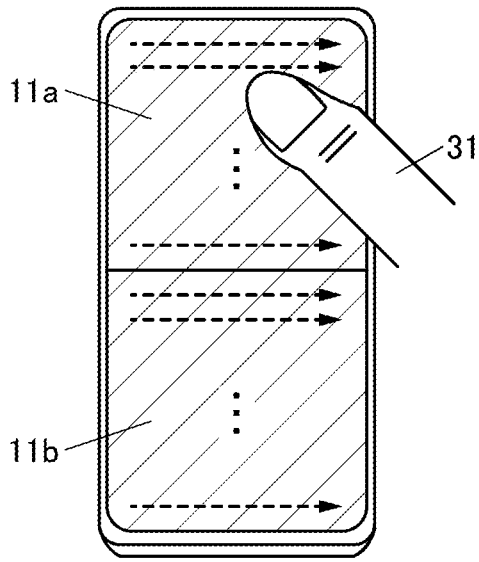
FIG. 5B2
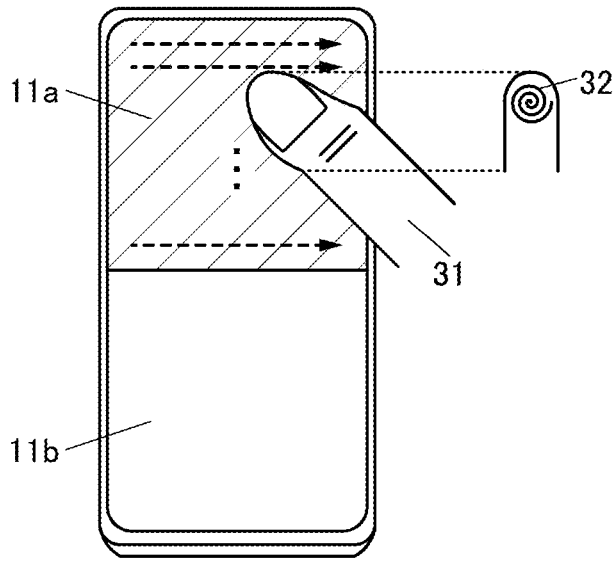

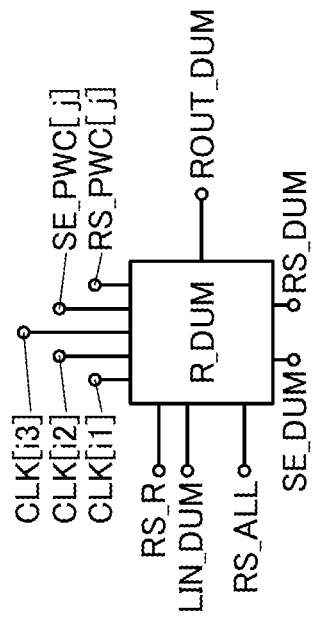
FIG. 8A1
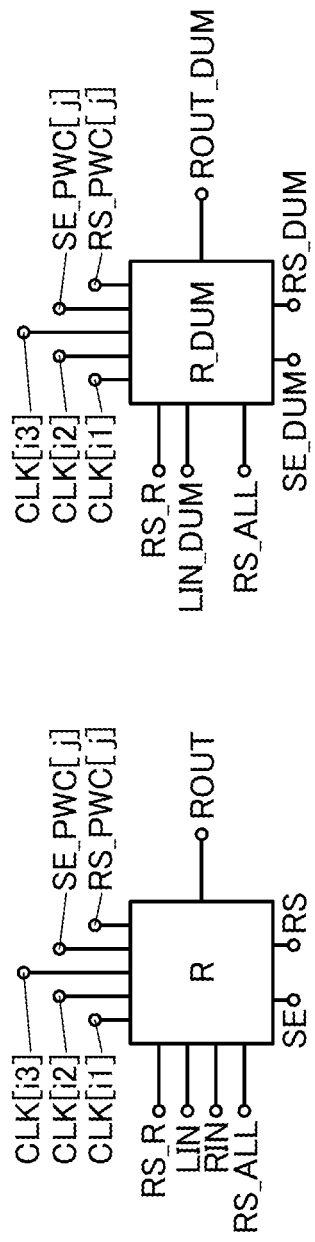
FIG. 8A2
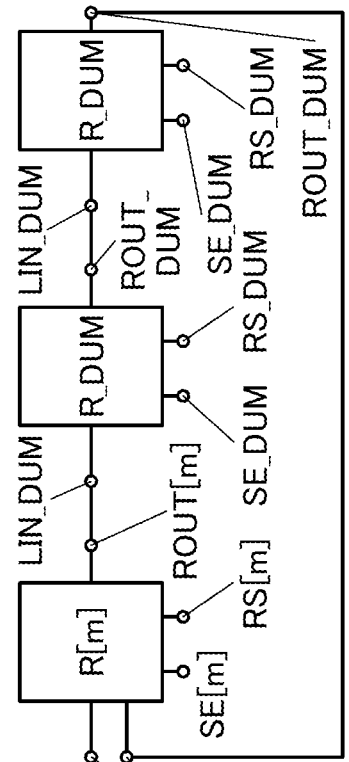
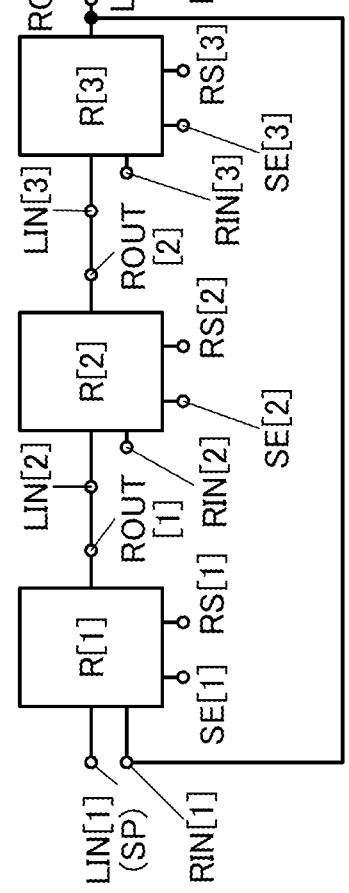
FIG. 8B

FIG. 12A
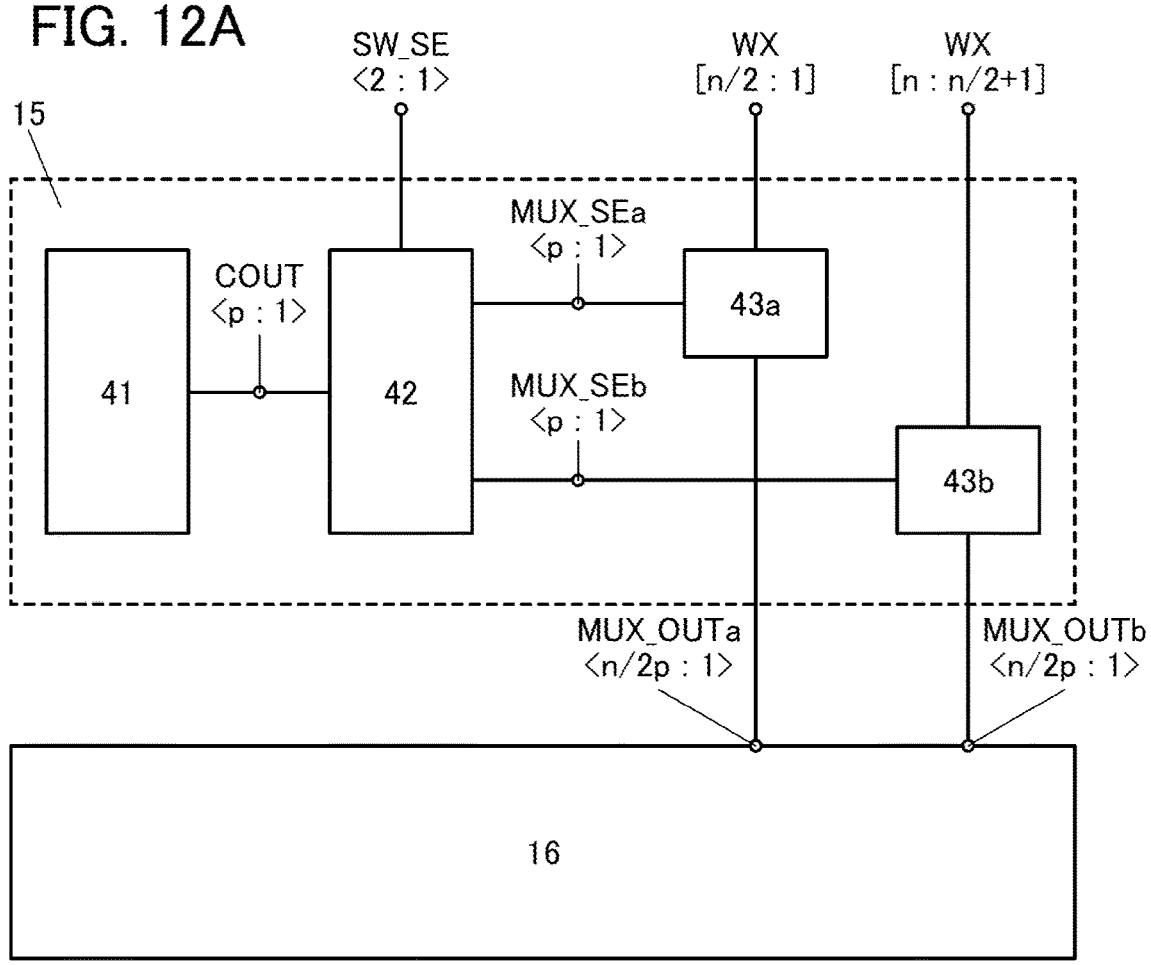
FIG. 12B1
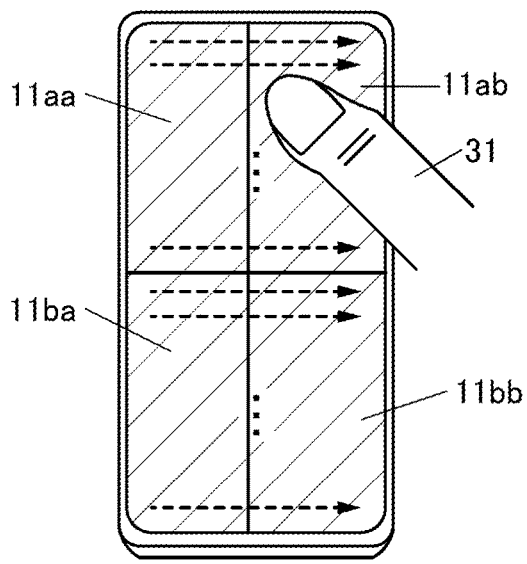
FIG. 12B2
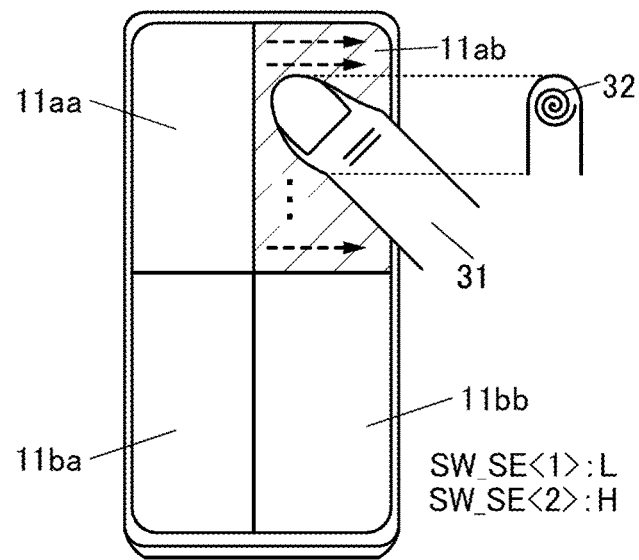

FIG. 14A1
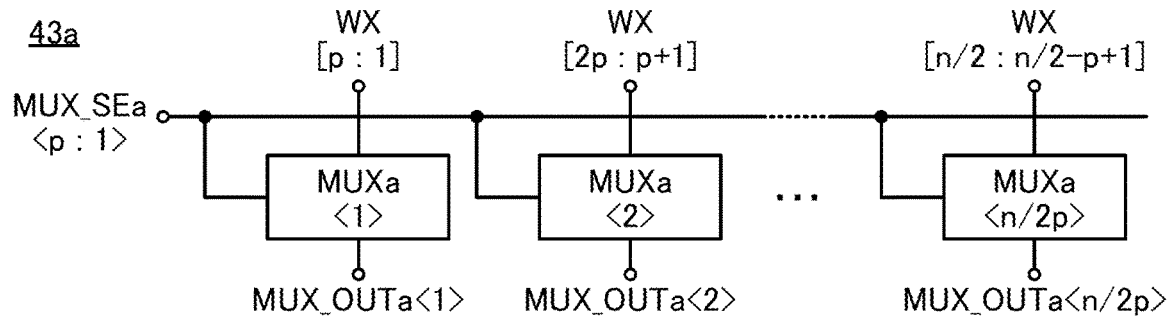
FIG. 14A2
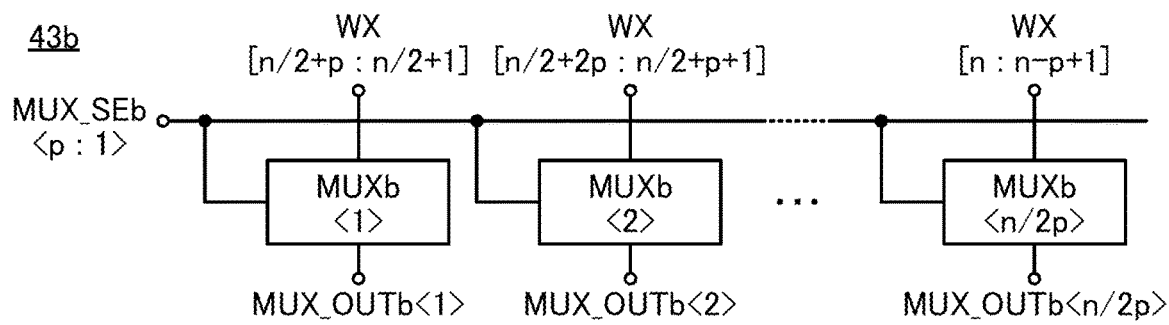
FIG. 14B
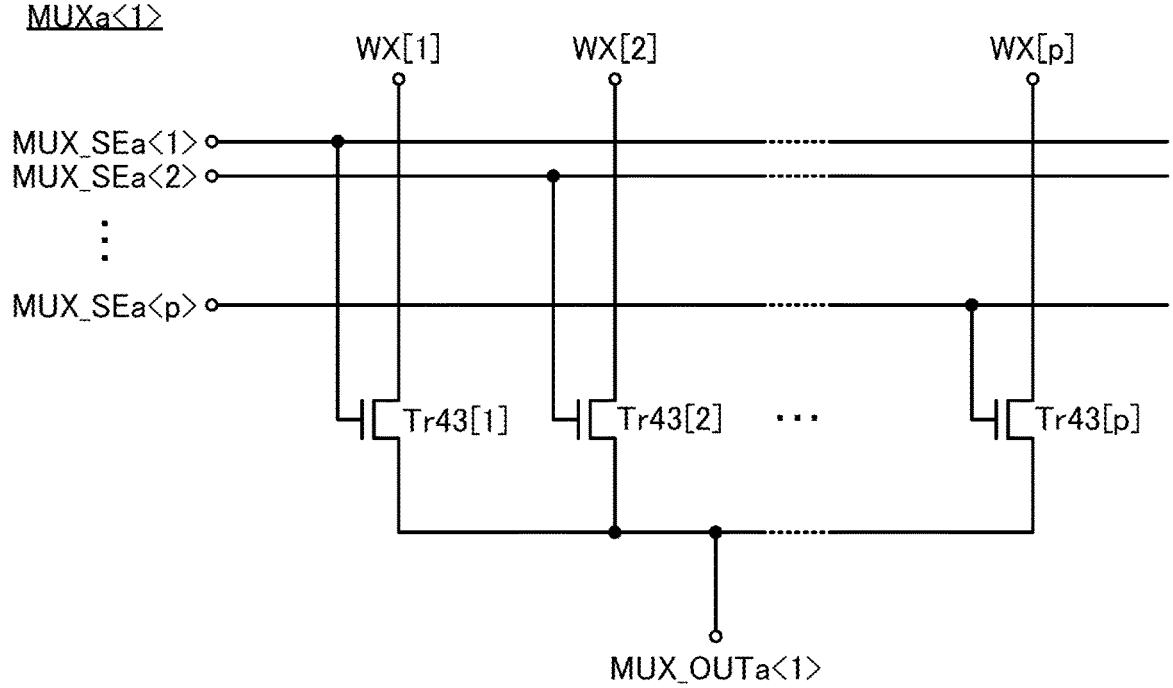

FIG. 20A
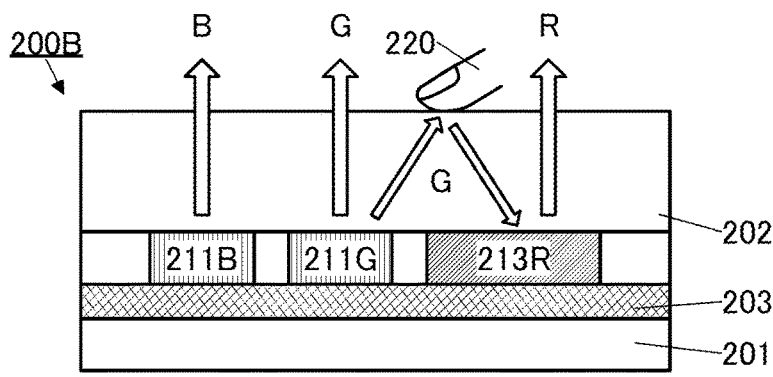
FIG. 20B  FIG. 20C  FIG. 20D  FIG. 20E
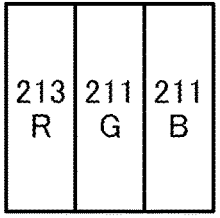 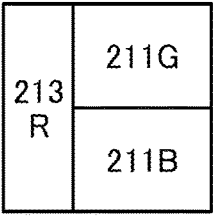  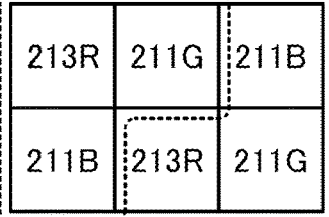
FIG. 20F  FIG. 20H
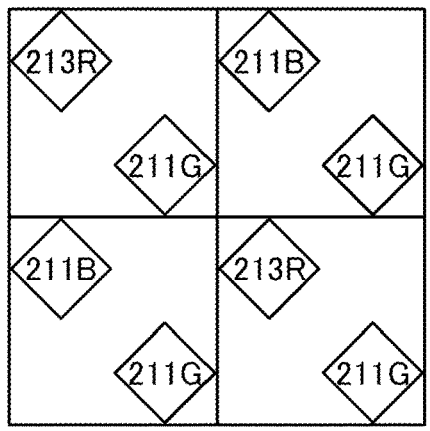 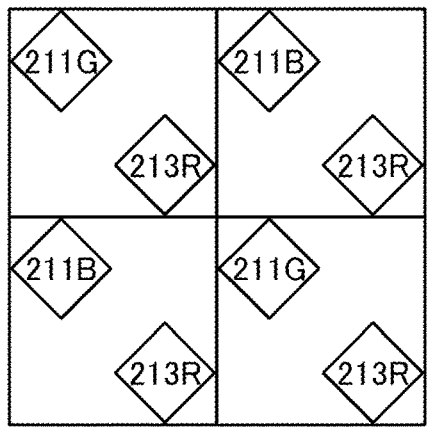
FIG. 20G  FIG. 20I
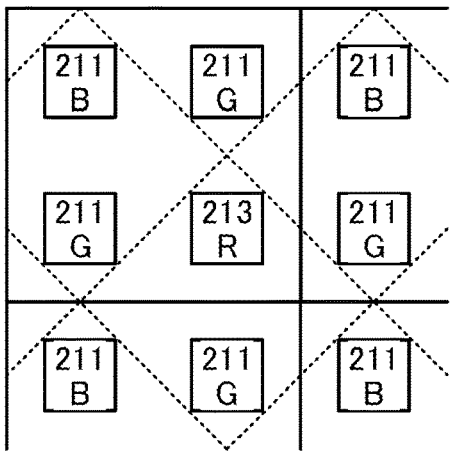 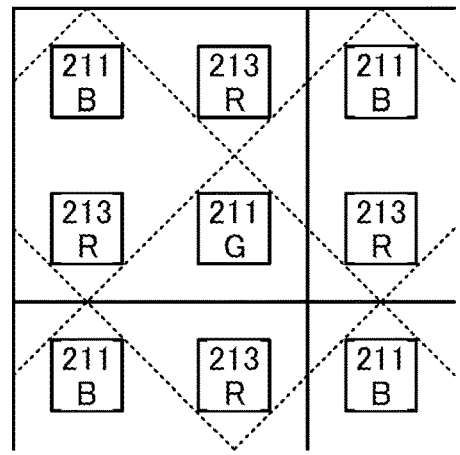

280A

280B

FIG. 22A
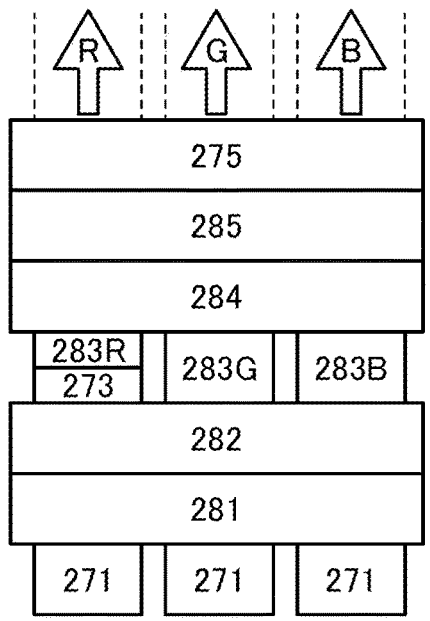
FIG. 22B
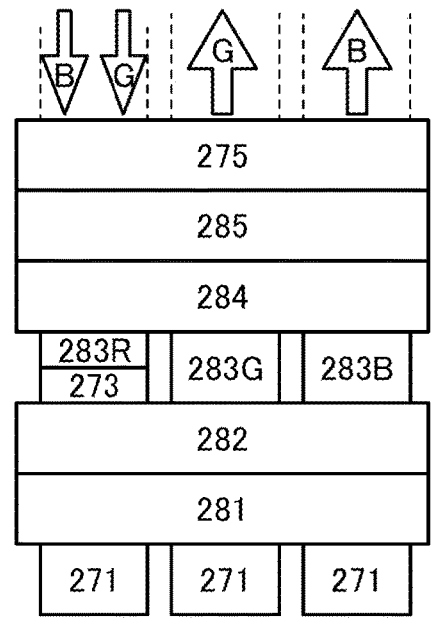
FIG. 22C  FIG. 22D  FIG. 22E  FIG. 22F  FIG. 22G
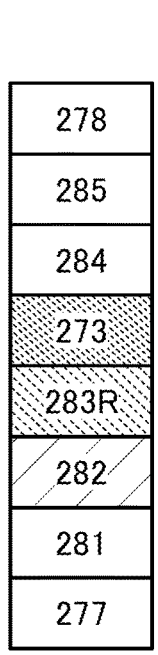 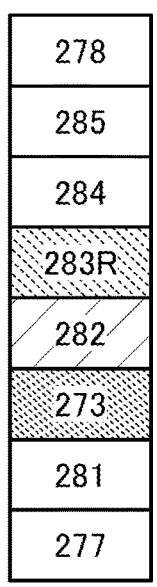 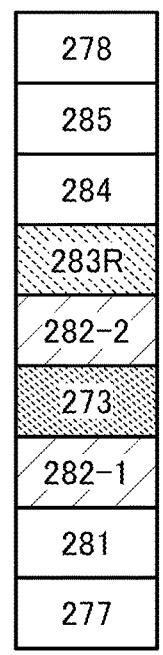 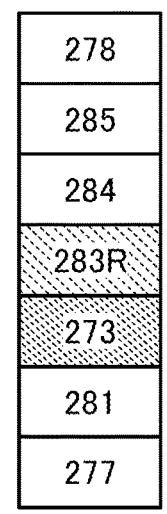 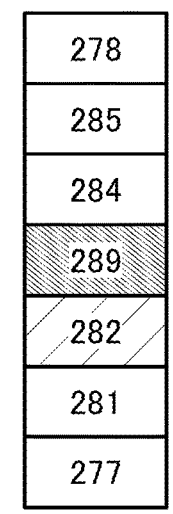

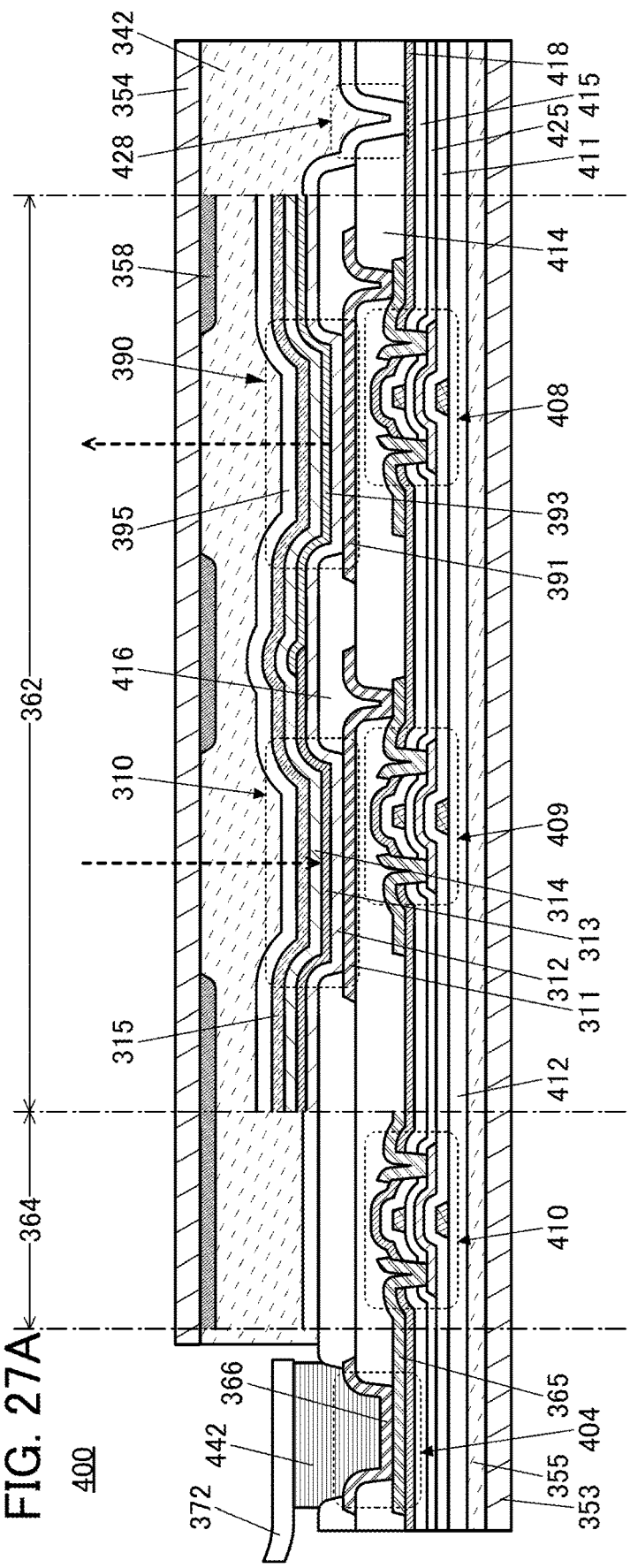
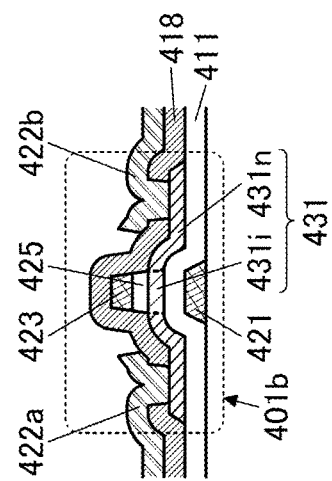
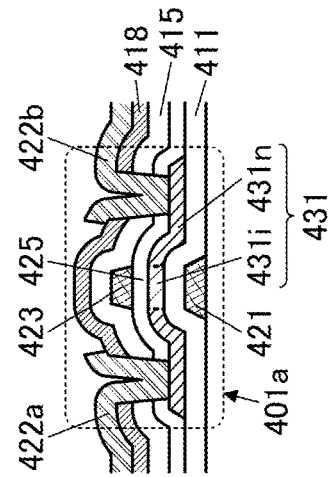

DISPLAY APPARATUS AND DRIVING METHOD THEREOF

This application is a 371 of international application PCT/IB2021/053189 filed on Apr. 19, 2021 which is incorporated herein by reference.

TECHNICAL FIELD

One embodiment of the present invention relates to a display apparatus and a driving method thereof. One embodiment of the present invention relates to a display apparatus having a function of capturing an image and a driving method thereof. One embodiment of the present invention relates to an electronic device including a display apparatus.

Note that one embodiment of the present invention is not limited to the above technical field. Examples of the technical field of one embodiment of the present invention disclosed in this specification and the like include a semiconductor device, a display apparatus, a light-emitting device, a power storage device, a memory device, an electronic device, a lighting device, an input device (e.g., a touch sensor), an input/output device (e.g., a touch panel), a driving method thereof, and a manufacturing method thereof. A semiconductor device means all devices that can function by utilizing semiconductor characteristics.

BACKGROUND ART

Display apparatuses are used in various devices such as information terminal devices such as smartphones, tablet terminals, and notebook PCs (personal computers), television devices, and monitor devices. In recent years, display apparatuses have been required to have a variety of functions such as a touch panel function and a function of capturing images of fingerprints for authentication, in addition to a function of displaying images. Patent Document 1 discloses electronic devices, such as a smartphone, which are capable of performing fingerprint authentication.

REFERENCE

Patent Document

[Patent Document 1] Japanese Published Patent Application No. 2019-79415

SUMMARY OF THE INVENTION

Problems to be Solved by the Invention

As a method of performing fingerprint authentication, which is one mode of authentication, there is a method in which a finger is irradiated with light from a light-emitting element and light reflected by the finger is detected by a light-receiving element. In this case, time-consuming fingerprint authentication allows high accuracy in the fingerprint authentication. However, if authentication such as fingerprint authentication takes a long time, it is stressful for a person being authenticated.

An object of one embodiment of the present invention is to provide a display apparatus capable of performing authentication in a short time. Another object is to provide a display apparatus capable of performing highly accurate authentication. Another object is to provide a display apparatus with reduced power consumption. Another object is to provide a highly reliable display apparatus. Another object is to provide a novel display apparatus.

Another object is to provide a method of driving a display apparatus capable of performing authentication in a short time. Another object is to provide a method of driving a display apparatus capable of performing highly accurate authentication. Another object is to provide a method of driving a display apparatus with reduced power consumption. Another object is to provide a method of driving a highly reliable display apparatus. Another object is to provide a method of driving a novel display apparatus.

Note that the description of these objects does not preclude the existence of other objects. One embodiment of the present invention does not have to achieve all these objects. Note that other objects can be derived from the description of the specification, the drawings, the claims, and the like.

Means for Solving the Problems

One embodiment of the present invention relates to a display apparatus having an image capturing function. The display apparatus of one embodiment of the present invention is capable of performing authentication such as fingerprint authentication.

One embodiment of the present invention is a display apparatus including a first display portion where first pixels are arranged in a matrix, a second display portion where second pixels are arranged in a matrix, a first row driver circuit, a second row driver circuit, and a control circuit. Each of the first and the second pixels includes a light-receiving element. Each of the first and the second pixels has a function of acquiring imaging data using the light-receiving element. The first row driver circuit has a function of selecting the first pixel from which the imaging data is to be read out. The second row driver circuit has a function of selecting the second pixel from which the imaging data is to be read out. The control circuit has a function of driving in a first mode in which the first row driver circuit and the second row driver circuit are sequentially driven. The control circuit has a function of driving in a second mode in which one of the first row driver circuit and the second row driver circuit is driven, based on the imaging data. Each of scan rates of the first and the second row driver circuits in the first mode is higher than a scan rate of the first or the second row driver circuit in the second mode.

Alternatively, in the above embodiment, each of the first and the second pixels may include a transistor, one of a source and a drain of the transistor may be electrically connected to one electrode of the light-receiving element, and the transistor may include a semiconductor layer including a metal oxide.

Alternatively, in the above embodiment, each of the first and the second pixels may include a light-emitting element.

Alternatively, in the above embodiment, in the first mode, the control circuit may have a function of detecting an object in contact with the first display portion or the second display portion, based on the imaging data, and in the second mode, the control circuit may have a function of performing authentication.

Alternatively, in the above embodiment, the display apparatus may include a machine learning arithmetic circuit, and when the object moves from a first point to a second point in the first display portion or the second display portion, the machine learning arithmetic circuit may have a function of performing authentication, based on a path of the object from the first point to the second point.

Another embodiment of the present invention is an electronic device including the display apparatus of one embodiment of the present invention and an operation button.

Another embodiment of the present invention is an electronic device including the display apparatus of one embodiment of the present invention and a housing. The machine learning arithmetic circuit has a function of performing the authentication, based on a contact region of the housing.

Another embodiment of the present invention is a method of driving a display apparatus including a first display portion where pixels each including a light-receiving element are arranged in a matrix and a second display portion. The pixels provided in the first display portion and the pixels provided in the second display portion acquire first imaging data by using the light-receiving element. The first imaging data is read out by the pixels provided in the first display portion, and then the first imaging data is read out by the pixels provided in the second display portion. One of the first display portion and the second display portion is selected based on the first imaging data. The pixels provided in the selected display portion acquire second imaging data by using the light-receiving element, and then reads out the second imaging data. The time required for reading out the second imaging data is longer than the time required for reading out the first imaging data.

Alternatively, in the above embodiment, the pixel may include a transistor, one of a source and a drain of the transistor may be electrically connected to one electrode of the light-receiving element, and the transistor may include a semiconductor layer including a metal oxide.

Alternatively, in the above embodiment, each of the pixels may include a light-emitting element.

Alternatively, in the above embodiment, an object in contact with the first display portion or the second display portion may be detected based on the first imaging data and then a display portion in contact with the object may be selected, and authentication may be performed based on the second imaging data.

Effect of the Invention

One embodiment of the present invention can provide a display apparatus capable of performing authentication in a short time. Alternatively, a display apparatus capable of performing highly accurate authentication can be provided. Alternatively, a display apparatus with reduced power consumption can be provided. Alternatively, a highly reliable display apparatus can be provided. Alternatively, a novel display apparatus can be provided.

Alternatively, a method of driving a display apparatus capable of performing authentication in a short time can be provided. Alternatively, a method of driving a display apparatus capable of performing highly accurate authentication can be provided. Alternatively, a method of driving a display apparatus with reduced power consumption can be provided. Alternatively, a method of driving a highly reliable display apparatus can be provided. Alternatively, a method of driving a novel display apparatus can be provided.

Note that the description of these effects does not preclude the existence of other effects. One embodiment of the present invention does not necessarily have all of these effects. Other effects can be derived from the description of the specification, the drawings, the claims, and the like.

BRIEF DESCRIPTION OF THE DRAWINGS

FIG. 5A is a flow chart showing an example of a method of driving a display apparatus. FIG. 5B1 and FIG. 5B2 are schematic diagrams illustrating an example of a method of driving a display apparatus.

FIG. 8A1, FIG. 8A2, and FIG. 8B are block diagrams each illustrating a structure example of a row driver circuit.

FIG. 12A is a block diagram illustrating a structure example of a reading circuit. FIG. 12B1 and FIG. 12B2 are schematic diagrams illustrating examples of a method of driving a display apparatus.

FIG. 14A1 and FIG. 14A2 are block diagrams each illustrating a structure example of a reading circuit. FIG. 14B is a circuit diagram illustrating a structure example of a reading circuit.

FIG. 20A is a cross-sectional diagram illustrating a structure example of a display apparatus. FIG. 20B to FIG. 20I are top views illustrating structure examples of a pixel.

FIG. 22A to FIG. 22G are diagrams illustrating structure examples of a display apparatus.

FIG. 27A is a diagram illustrating a structure example of a display apparatus. FIG. 27B and FIG. 27C are diagrams illustrating structure examples of a transistor.

MODE FOR CARRYING OUT THE INVENTION

Figure 1:
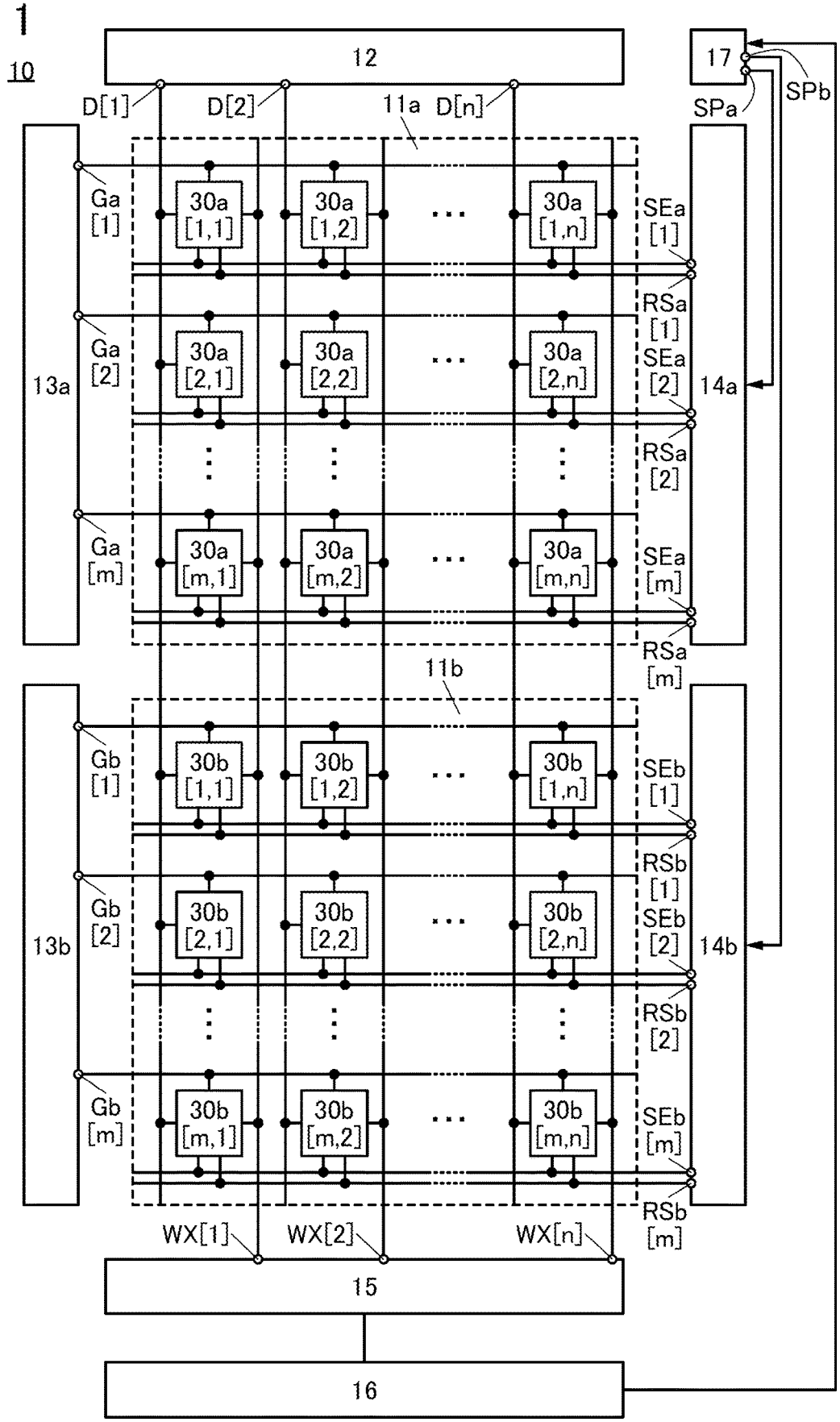
FIG. 1 is a block diagram illustrating a structure example of a display apparatus.

Hereinafter, embodiments will be described with reference to the drawings. Note that the embodiments can be implemented in many different modes, and it is readily understood by those skilled in the art that modes and details thereof can be changed in various ways without departing from the spirit and scope thereof. Thus, the present invention should not be construed as being limited to the following description of the embodiments.

Note that in structures of the invention described below, the same portions or portions having similar functions are denoted by the same reference numerals in different drawings, and a description thereof is not repeated. Furthermore, the same hatch pattern is used for the portions having similar functions, and the portions are not especially denoted by reference numerals in some cases.

Note that in each drawing described in this specification, the size, the layer thickness, or the region of each component is exaggerated for clarity in some cases. Therefore, they are not limited to the illustrated scale.

Note that in this specification and the like, the ordinal numbers such as "first" and "second" are used in order to avoid confusion among components and do not limit the number.

A transistor is a kind of semiconductor elements and can achieve amplification of current or voltage, switching operation for controlling conduction or non-conduction, or the like. A transistor in this specification and the like includes, in its category, an IGFET (Insulated Gate Field Effect Transistor) and a thin film transistor (TFT).

Functions of a "source" and a "drain" are sometimes replaced with each other when a transistor of opposite polarity is used or when the direction of current is changed in circuit operation, for example. Therefore, the terms "source" and "drain" can be switched in this specification.

In this specification and the like, the expression "electrically connected" includes the case where components are connected through an "object having any electric function". Here, there is no particular limitation on the "object having any electric function" as long as electric signals can be transmitted and received between components that are connected through the object. Examples of the "object having any electric action" include a switching element such as a transistor, a resistor, a coil, a capacitor, and other elements with a variety of functions as well as an electrode and a wiring.

In this specification and the like, the terms "electrode" and "wiring" do not functionally limit these components. For example, an "electrode" is used as part of a "wiring" in some cases, and vice versa. Furthermore, the terms "electrode" or "wiring" can also include the case where a plurality of "electrodes" or "wirings" are formed in an integrated manner.

In this specification and the like, the resistance value of a "resistor" is sometimes determined depending on the length of a wiring. Alternatively, the resistance value is sometimes determined through the connection of a conductive layer used for a wiring to a conductive layer with resistivity different from that of the conductive layer. Alternatively, the resistance value is sometimes determined by impurity doping in a semiconductor layer.

In this specification and the like, the term "terminal" in an electric circuit refers to a portion that inputs or outputs current or voltage or receives or transmits a signal. Accordingly, part of a wiring or an electrode functions as a terminal in some cases.

A voltage refers to a potential difference between a given potential and a reference potential (e.g., a ground potential or a source potential) in many cases. Therefore, the terms "voltage" and "potential" can be replaced with each other in many cases. In this specification and the like, the terms "voltage" and "potential" can be replaced with each other unless otherwise specified.

Note that in this specification and the like, an "on state" of a transistor refers to a state in which a source and a drain of the transistor can be regarded as being electrically short-circuited. Furthermore, an "off state" of the transistor refers to a state in which the source and the drain of the transistor can be regarded as being electrically disconnected. For example, the transistor in an on state can operate in a linear region.

In addition, in this specification and the like, an "on-state current" sometimes refers to a current that flows between a source and a drain when a transistor is in an on state. Furthermore, an "off-state current" sometimes refers to a current that flows between a source and a drain when the transistor is in an off state.

Embodiment 1

In this embodiment, a display apparatus of one embodiment of the present invention will be described.

Structure Example 1 of Display Apparatus

FIG. 1 is a block diagram illustrating a structure example of a display apparatus 10. The display apparatus 10 includes a display portion 11a, a display portion 11b, a data driver circuit 12, a gate driver circuit 13a, a gate driver circuit 13b, a row driver circuit 14a, a row driver circuit 14b, a reading circuit 15, a column driver circuit 16, a control circuit 17, and the like. That is, the display apparatus 10 illustrated in FIG. 1 includes two display portions 11, two gate driver circuits 13, and two row driver circuits 14. Note that the number of each of the display portions 11, the gate driver circuits 13, and the row driver circuits 14 included in the display apparatus 10 may be three or more.

The display portion 11a includes a plurality of pixels 30a arranged in a matrix of m rows and n columns (m and n are each an integer of 1 or more). The display portion 11b includes a plurality of pixels 30b arranged in a matrix of m rows and n columns. Note that the number of pixels 30a provided in the display portion 11a may be different from the number of pixels 30b provided in the display portion 11b. For example, the number of rows of the pixels 30a provided in the display portion 11a may be different from the number of rows of the pixels 30b provided in the display portion 11b. Although details are described later, the pixel 30a and the pixel 30b include both a light-emitting element functioning as a display element and a light-receiving element functioning as a photoelectric conversion element.

In this specification and the like, the term display portion 11 is used in the case where the display portion 11a and the display portion 11b are not distinguished from each other. The same applies to other elements.

In this specification and the like, reference numerals such as "[1,1]" and "[m,n]" are added to the pixels 30 to distinguish the pixels 30 in the m rows and the n columns. For example, [1] is added to a reference numeral that represents a terminal or the like electrically connected to the pixel 30 in the first row, and [m] is added to a reference numeral that represents a terminal or the like electrically connected to the pixel 30 in the m-th row; thus, m terminals and the like are distinguished. Furthermore, for example, [1] is added to a reference numeral that represents a terminal or the like electrically connected to the pixel 30 in the first column, and [n] is added to a reference numeral that represents a terminal or the like electrically connected to the pixel 30 in the n-th column, whereby n terminals and the like are distinguished.

In this specification and the like, a display element can be rephrased as a display device, a light-emitting element can be rephrased as a light-emitting device, and a light-receiving element can be rephrased as a light-receiving device. Also for other elements, "element" can be rephrased as "device" in some cases.

The pixels 30*a* and the pixels 30*b* are electrically connected to the data driver circuit 12 through terminals D. The pixels 30*a* and the pixels 30*b* are electrically connected to the reading circuit 15 through terminals WX.

The pixels 30*a* are electrically connected to the gate driver circuit 13*a* through terminals Ga. The pixels 30*a* are electrically connected to the row driver circuit 14*a* through terminals SEa, and are electrically connected to the row driver circuit 14*a* through terminals RSa. The pixels 30*b* are electrically connected to the gate driver circuit 13*b* through terminals Gb. The pixels 30*b* are electrically connected to the row driver circuit 14*b* through terminals SEb, and are electrically connected to the row driver circuit 14*b* through terminals RSb.

The reading circuit 15 is electrically connected to the column driver circuit 16. The column driver circuit 16 is electrically connected to the control circuit 17. The control circuit 17 is electrically connected to the row driver circuit 14*a* through a terminal SPa, and is electrically connected to the row driver circuit 14*b* through a terminal SPb.

Each of the terminal Ga, the terminal SEa, and the terminal RSa is electrically connected to a wiring extended in the row direction, and the wiring is electrically connected to the pixels 30*a* arranged in the row direction. Each of the terminal Gb, the terminal SEb, and the terminal RSb is electrically connected to a wiring extended in the row direction, and the wiring is electrically connected to the pixels 30*b* arranged in the row direction. FIG. 1 illustrates an example in which the display apparatus 10 includes m terminals Ga, m terminals Gb, m terminals SEa, m terminals SEb, m terminals RSa, and m terminals RSb.

Each of the terminal D and the terminal WX is electrically connected to a wiring extended in the column direction, and the wiring is electrically connected to the pixels 30*a* and the pixels 30*b* arranged in the column direction. FIG. 1 illustrates an example in which the display apparatus 10 includes n terminals D and n terminals WX.

The pixel 30*a* and the pixel 30*b* have a function of displaying an image corresponding to image data by using light-emitting elements. The pixel 30*a* and the pixel 30*b* have a function of acquiring imaging data by using light-receiving elements. Thus, the display apparatus 10 is a display apparatus having a function of capturing an image.

Although details are described later, the display apparatus 10 has a function of detecting the position of an object in contact with the display portion 11. The display apparatus 10 also has a function of performing authentication. For example, the display apparatus 10 has functions of detecting the position of a finger that is touching the display portion 11 and performing fingerprint authentication on the basis of a fingerprint of the finger.

The gate driver circuit 13*a* has a function of selecting the pixels 30*a* to which image data is written. Specifically, the gate driver circuit 13*a* can output a signal from the terminal Ga to select the pixels 30*a* to which image data is written. Here, the gate driver circuit 13*a* outputs the signal from a terminal Ga[1] to a terminal Ga[m] in order from Ga[1] to Ga[m], whereby image data can be written to the pixels 30*a* in order from the first row to the m-th row. Thus, the signal output from the terminal Ga by the gate driver circuit 13*a* is a scan signal. Here, a short interval between the time when the gate driver circuit 13*a* outputs a signal from the terminal Ga and the time when the gate driver circuit 13*a* outputs a signal from the terminal Ga in the next row is rephrased as a high scan rate of the gate driver circuit 13*a*. A long interval between the time when the gate driver circuit 13*a* outputs a signal from the terminal Ga and the time when the gate driver circuit 13*a* outputs a signal from the terminal Ga in the next row is rephrased as a low scan rate of the gate driver circuit 13*a*.

The gate driver circuit 13*b* has a function of selecting the pixels 30*b* to which image data is written. The gate driver circuit 13*b* can select the pixels 30*b* in a manner similar to the manner in which the gate driver circuit 13*a* selects the pixels 30*a*.

The data driver circuit 12 has a function of supplying image data to the pixels 30*a* or the pixels 30*b*. Specifically, the data driver circuit 12 has a function of outputting a signal representing image data from the terminal D. The signal output from the terminal D is supplied to the pixels 30*a* selected by the gate driver circuit 13*a* or the pixels 30*b* selected by the gate driver circuit 13*b*. In this manner, image data is written to the pixels 30*a* or the pixels 30*b*.

The row driver circuit 14*a* has a function of selecting the pixels 30*a* from which imaging data is to be read out. Specifically, the row driver circuit 14*a* can output a signal from the terminal SEa to select the pixels 30*a* from which imaging data is to be read out. The row driver circuit 14*a* also has a function of selecting the pixels 30*a* to be subjected to the reset of the acquired imaging data. Specifically, the row driver circuit 14*a* can output a signal from the terminal RSa to select the pixels 30*a* to be subjected to the reset of the imaging data. Here, the row driver circuit 14*a* outputs the signal from a terminal SEa[1] to a terminal SEa[m] in order from SEa[1] to SEa[m], whereby imaging data can be read out from the pixels 30*a* in order from the first row to the m-th row. Thus, a signal output from the terminal SEa by the row driver circuit 14*a* is a scan signal. Similarly, a signal output from the terminal RSa by the row driver circuit 14*a* can also be a scan signal. Here, a short interval between the time when the row driver circuit 14*a* outputs a scan signal and the time when the row driver circuit 14*a* outputs a next scan signal is rephrased as a high scan rate of the row driver circuit 14*a*. A long interval between the time when the row driver circuit 14*a* outputs a scan signal and the time when the row driver circuit 14*a* outputs a next scan signal is rephrased as a low scan rate of the row driver circuit 14*a*. For example, a short interval between the time when the row driver circuit 14*a* outputs a signal from the terminal SEa and the time when the row driver circuit 14*a* outputs a signal from the terminal SEa in the next row is rephrased as a high scan rate of the row driver circuit 14*a*. Furthermore, a long interval between the time when the row driver circuit 14*a* outputs a signal from the terminal SEa and the time when the row driver circuit 14a outputs a signal from the terminal SEa in the next row is rephrased as a low scan rate of the row driver circuit 14a.

The row driver circuit 14b has a function of selecting the pixels 30b from which imaging data is to be read out. The row driver circuit 14b also has a function of selecting the pixels 30b to be subjected to the reset of the acquired imaging data. The row driver circuit 14b can select the pixels 30b in a manner similar to the manner in which the row driver circuit 14a selects the pixels 30a.

The reading circuit 15 has a function of controlling the reading out of imaging data acquired by the pixel 30a and imaging data acquired by the pixel 30b. The structure example and the like of the reading circuit 15 will be described later.

The column driver circuit 16 has a function of performing A/D (Analog to Digital) conversion on imaging data read out from the pixel 30a or the pixel 30b. The imaging data after being subjected to the A/D conversion can be output to the outside of the display apparatus 10, for example. The imaging data after being subjected to the A/D conversion can be supplied to the control circuit 17.

The control circuit 17 has a function of controlling the driving of the row driver circuit 14a and the row driver circuit 14b. The control circuit 17 has functions of generating, for example, a start pulse signal and outputting the start pulse signal from the terminal SPa or the terminal SPb. The start pulse signal output from the terminal SPa is supplied to the row driver circuit 14a, and the start pulse signal output from the terminal SPb is supplied to the row driver circuit 14b. The supply of the start pulse signal to the row driver circuit 14a enables the row driver circuit 14a to output a signal in order from the terminal SEa[1] to the terminal SEa[m] and from a terminal RSa[1] to a terminal RSa[m]. The supply of the start pulse signal to the row driver circuit 14b enables the row driver circuit 14b to output a signal in order from a terminal SEb[1] to a terminal SEb[m] and from a terminal RSb[1] to a terminal RSb[m].

The control circuit 17 has a function of determining a terminal from which the start pulse signal is output, on the basis of the imaging data supplied from the column driver circuit 16. Specifically, the control circuit 17 has a function of determining from which the terminal SPa or the terminal SPb the start pulse signal is output, on the basis of the imaging data supplied from the column driver circuit 16. Thus, the control circuit 17 can determine the row driver circuit 14 to be driven on the basis of the imaging data read out from the pixels 30a or the pixels 30b.

Structure Example of Pixel

Figure 2:
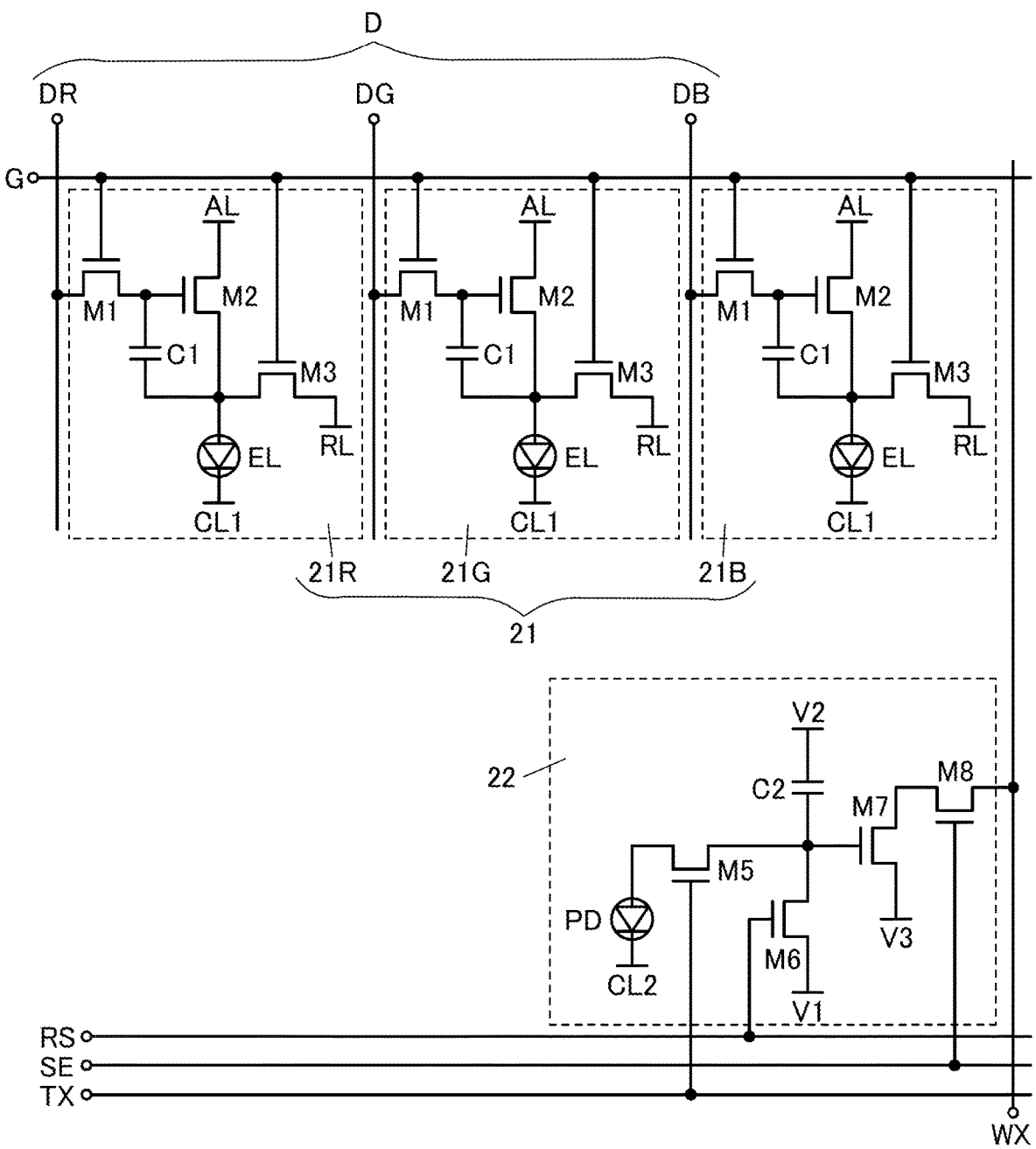
FIG. 2 is a circuit diagram illustrating a structure example of a pixel.

FIG. 2 is a circuit diagram illustrating a structure example of the pixel 30. The pixel 30 can have a structure including a plurality of subpixels 21 and an imaging pixel 22. FIG. 2 illustrates an example in which the pixel 30 includes a subpixel 21R, a subpixel 21G, and a subpixel 21B as the subpixels 21.

The subpixel 21R can be a subpixel 21 emitting a red color. The subpixel 21G can be a subpixel 21 exhibiting a green color. The subpixel 21B can be a subpixel 21 exhibiting a blue color. Since the pixel 30 includes the plurality of subpixels 21 which exhibit different colors, the display apparatus 10 can perform full-color display. Note that although the example where the pixel 30 includes three subpixels 21 which exhibit different colors is shown here, the pixel 30 may include four or more subpixels. The subpixel 21 may exhibit cyan, magenta, a yellow color, a white color, or the like. Furthermore, the pixel 30 may be provided with a subpixel 21 that emits infrared light.

The subpixel 21 includes a transistor M1, a transistor M2, a transistor M3, a capacitor C1, and a light-emitting element EL. A terminal G and the terminal D are electrically connected to the subpixel 21. Here, FIG. 2 illustrates a terminal DR, a terminal DG, and a terminal DB as the terminals D. As illustrated in FIG. 2, the subpixel 21R, the subpixel 21G, and the subpixel 21B can be electrically connected to the same terminal G. The subpixel 21R can be electrically connected to the terminal DR, the subpixel 21G can be electrically connected to the terminal DG, and the subpixel 21B can be electrically connected to the terminal DB.

A gate of the transistor M1 and a gate of the transistor M3 are electrically connected to the terminal G. One of a source and a drain of the transistor M1 is electrically connected to the terminal D. The other of the source and the drain of the transistor M1 is electrically connected to one electrode of the capacitor C1. The one electrode of the capacitor C1 is electrically connected to a gate of the transistor M2. One of a source and a drain of the transistor M2 is electrically connected to a wiring AL. The other of the source and the drain of the transistor M2 is electrically connected to one electrode of the light-emitting element EL. The one electrode of the light-emitting element EL is electrically connected to the other electrode of the capacitor C1. The other electrode of the capacitor C1 is electrically connected to one of a source and a drain of the transistor M3. The other electrode of the light-emitting element EL is electrically connected to a wiring CL1. The other of the source and the drain of the transistor M3 is electrically connected to a wiring RL.

The transistor M1 and the transistor M3 each function as a switch. The transistor M2 functions as a transistor that controls a current flowing through the light-emitting element EL.

Here, it is preferable to use a transistor containing low-temperature polysilicon (LTPS) in its semiconductor layer (hereinafter also referred to as an LTPS transistor) as each of the transistor M1 to the transistor M3. Alternatively, it is preferable that a transistor including a metal oxide (hereinafter also referred to as an oxide semiconductor) in its semiconductor layer where a channel is formed (hereinafter such a transistor is also referred to as an OS transistor) be used as each of the transistor M1 and the transistor M3 and an LTPS transistor be used as the transistor M2.

As the OS transistor, a transistor including an oxide semiconductor in a semiconductor layer in which a channel is formed can be used. The semiconductor layer preferably includes indium, M (M is one or more kinds selected from gallium, aluminum, silicon, boron, yttrium, tin, copper, vanadium, beryllium, titanium, iron, nickel, germanium, zirconium, molybdenum, lanthanum, cerium, neodymium, hafnium, tantalum, tungsten, and magnesium), and zinc, for example. In particular, M is preferably one or more kinds selected from aluminum, gallium, yttrium, and tin. It is particularly preferable to use an oxide containing indium (In), gallium (Ga), and zinc (Zn) (also referred to as IGZO) for the semiconductor layer of the OS transistor. Alternatively, it is preferable to use an oxide containing indium (In), tin (Sn), and zinc (Zn). Further alternatively, it is preferable to use an oxide containing indium (In), gallium (Ga), tin (Sn), and zinc (Zn).

A transistor using an oxide semiconductor having a wider band gap and a lower carrier density than silicon can achieve an extremely low off-state current. Thus, such a low off-state current enables retention of electric charge accumulated in a capacitor that is connected in series with the transistor for a long time. Therefore, it is particularly preferable to use a transistor using an oxide semiconductor as the transistor M1 and the transistor M3 each of which is connected in series with the capacitor C1. The use of the transistor containing an oxide semiconductor as each of the transistor M1 and the transistor M3 can prevent leakage of electric charge held in the capacitor C1 through the transistor M1 or the transistor M3. Furthermore, since electric charge held in the capacitor C1 can be held for a long time, a still image can be displayed for a long time without rewriting image data written to the subpixel 21.

A reset potential is supplied to the wiring RL. An anode potential is supplied to the wiring AL. A cathode potential is supplied to the wiring CL1. In the subpixel 21, the anode potential is higher than the cathode potential. The reset potential supplied to the wiring RL can be set such that a potential difference between the reset potential and the cathode potential is lower than the threshold voltage of the light-emitting element EL. The reset potential can be a potential higher than the cathode potential, a potential equal to the cathode potential, or a potential lower than the cathode potential.

The imaging pixel 22 includes a transistor M5, a transistor M6, a transistor M7, a transistor M8, a capacitor C2, and a light-receiving element PD.

One electrode of the light-receiving element PD is electrically connected to one of a source and a drain of the transistor M5. The other electrode of the light-receiving element PD is electrically connected to a wiring CL2. The other of the source and the drain of the transistor M5 is electrically connected to one of a source and a drain of the transistor M6. A gate of the transistor M5 is electrically connected to a terminal TX. The one of the source and the drain of the transistor M6 is electrically connected to one electrode of the capacitor C2. The other of the source and the drain of the transistor M6 is electrically connected to a wiring V1. A gate of the transistor M6 is electrically connected to a terminal RS. The one electrode of the capacitor C2 is electrically connected to a gate of the transistor M7. The other electrode of the capacitor C2 is electrically connected to a wiring V2. One of a source and a drain of the transistor M7 is electrically connected to one of a source and a drain of the transistor M8. The other of the source and the drain of the transistor M7 is electrically connected to a wiring V3. The other of the source and the drain of the transistor M8 is electrically connected to the terminal WX. A gate of the transistor M8 is electrically connected to a terminal SE.

The transistor M5, the transistor M6, and the transistor M8 function as switches. The transistor M7 functions as an amplifier element (amplifier).

It is preferable to use LTPS transistors as all of the transistor M5 to the transistor M8. Alternatively, it is preferable to use OS transistors as the transistor M5 and the transistor M6 and to use an LTPS transistor as the transistor M7. At this time, the transistor M8 may be either an OS transistor or an LTPS transistor.

By using OS transistors as the transistor M5 and the transistor M6, a potential held in the gate of the transistor M7 on the basis of electric charge generated in the light-receiving element PD can be inhibited from leaking through the transistor M5 or the transistor M6.

For example, in the case where the display apparatus 10 performs image capturing using a global shutter system, a period from the end of electric charge transfer operation to the start of reading operation (charge holding period) varies among pixels. For example, when an image having the same grayscale value in all the pixels is captured, output signals in all the pixels ideally have potentials of the same level. However, in the case where the length of the charge holding period varies row by row, if electric charge accumulated at nodes in the pixels in each row leaks out over time, the potential of an output signal in a pixel varies row by row, and image data varies in grayscale level row by row. Thus, when the OS transistors are used as the transistor M5 and the transistor M6, such a potential change at the node can be extremely small. That is, even when image capturing is performed using the global shutter system, it is possible to inhibit variation in grayscale of image data due to a difference in the length of the charge holding period, and it is possible to enhance the quality of captured images.

Meanwhile, it is preferable to use, as the transistor M7, an LTPS transistor using low-temperature polysilicon as a semiconductor layer. The LTPS transistor can have a higher field-effect mobility than the OS transistor, and has excellent drive capability and current capability. Thus, the transistor M7 enables higher speed driving than the transistor M5 and the transistor M6. By using the LTPS transistor as the transistor M7, an output in accordance with the extremely low potential based on the amount of light received by the light-receiving element PD can be quickly supplied to the transistor M8.

In other words, in the imaging pixel 22, the transistor M5 and the transistor M6 have low leakage current and the transistor M7 has high drive capability, whereby electric charges transferred from the light-receiving element PD to the gate of the transistor M7 through the transistor M5 can be held without leakage. In addition, the reading out can be performed at a high speed.

Low off-state current, high-speed driving, and the like, which are required for the transistor M5 to the transistor M7, are not necessarily required for the transistor M8, which functions as a switch for supplying the output from the transistor M7 to the terminal WX. For this reason, either low-temperature polysilicon or an oxide semiconductor may be used for the semiconductor layer of the transistor M8.

Note that the transistor M5 and the transistor M6 may be LTPS transistors. In this case, for example, the display apparatus 10 can perform image capturing using a rolling shutter system. When LTPS transistors are used as the transistor M5 and the transistor M6, all the transistor M5 to the transistor M8 can be LTPS transistors. Furthermore, all the transistor M1 to the transistor M3 and the transistor M5 to the transistor M8 can be LTPS transistors. Accordingly, the display apparatus 10 can be driven at a high speed while the process of manufacturing the pixel 30 can be simplified.

Note that the display apparatus 10 may have a function of performing image capturing using a rolling shutter system also in the case where the transistor M5 and the transistor M6 are OS transistors. Alternatively, the display apparatus 10 may have a function of performing image capturing using a global shutter system also in the case where the transistor M5 and the transistor M6 are LTPS transistors.

Although the transistors are illustrated as n-channel transistors in FIG. 2, p-channel transistors can be used. The same applies to transistors described below.

Example of Function of Display Apparatus

Figure 3A:
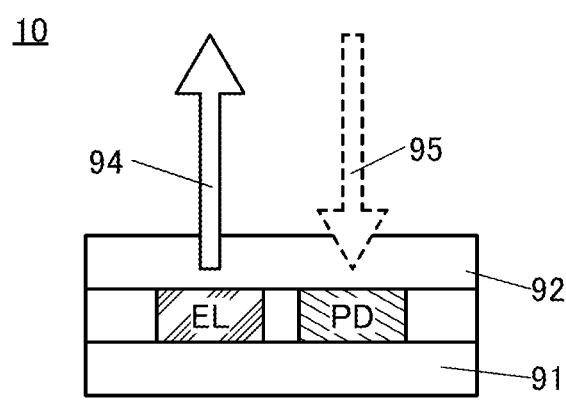
FIG. 3A is a schematic diagram illustrating a structure example of a display apparatus.

Examples of functions of the display apparatus 10 are described below. FIG. 3A is a schematic diagram illustrating a structure example of the display apparatus 10. The display apparatus 10 includes a substrate 91 and a substrate 92, and the light-emitting element EL and the light-receiving element PD are provided between the substrate 91 and the substrate 92.

The light-emitting element EL can emit light 94. The light 94 can be visible light or infrared light. The light-receiving element PD can detect incident light 95.

Figure 3B:
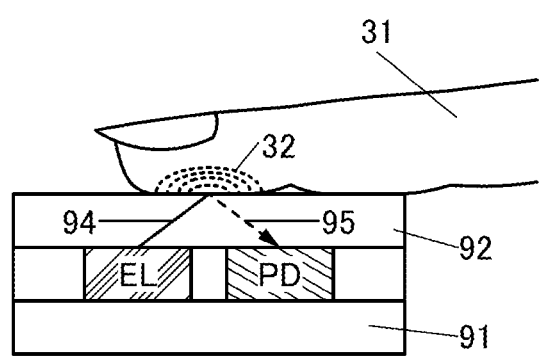
FIG. 3B is a schematic diagram illustrating an example of a fingerprint authentication method.

FIG. 3B illustrates a state in which a finger 31, which is an example of an object, is in contact with the display apparatus 10 having the structure in FIG. 3A. Here, the finger 31 has a fingerprint 32. In the case of FIG. 3B, the finger 31 is irradiated with the light 94. Then, the light-receiving element PD detects light reflected by the finger 31 as the light 95. Thus, the light-receiving element PD acquires imaging data, and the display apparatus 10 can detect the position of the finger 31, for example. The display apparatus 10 can perform fingerprint authentication on the basis of the fingerprint 32 shown by the imaging data. Note that the position detection and the authentication can be performed by analysis of the imaging data by the control circuit 17, for example. Alternatively, the position detection and the authentication may be performed through analysis of the imaging data by a circuit provided outside the display apparatus 10, for example.

Here, in the case where authentication such as fingerprint authentication is performed, the display apparatus 10 preferably performs image capturing with high accuracy in order to increase the accuracy of the authentication. In contrast, in the case where authentication is not performed and the position of the finger 31 is detected, the accuracy of image capturing can be lower than that in the case where the authentication is performed. Here, as the reading speed of the imaging data is decreased, shapes of a fingerprint and the like can be read out more accurately, whereby the authentication can be performed with high accuracy. Accordingly, in the case where the authentication is not performed and the position of the finger 31 is detected, the imaging data can be read out at a higher speed than in the case where the authentication is performed, for example.

In view of the above, in one embodiment of the present invention, first, first imaging data is acquired by the pixels 30a and the pixels 30b. Next, the first imaging data acquired by the pixels 30a is read out through scanning by the row driver circuit 14a, and then the first imaging data acquired by the pixels 30b is read out by scanning by the row driver circuit 14b. After that, either the display portion 11a or the display portion 11b is in contact with the finger 31 is determined on the basis of the first imaging data which has been read out. Next, second imaging data is acquired by the pixel 30 provided in the display portion 11 that the finger 31 is in contact with, and then the second imaging data is read out through scanning by the row driver circuit 14 electrically connected to the pixel 30. Fingerprint authentication or the like can be performed on the basis of the second imaging data.

In other words, in one embodiment of the present invention, first, the first imaging data is acquired by both the pixels 30a and the pixels 30b to detect the position of the finger 31. Next, the second imaging data is acquired by either the pixels 30a or the pixels 30b to perform the fingerprint authentication or the like. Since the first imaging data is not used for the fingerprint authentication or the like, each of the scan rates of the row driver circuit 14a and the row driver circuit 14b at the time when the first imaging data is read out can be higher than the scan rate of the row driver circuit 14a or the row driver circuit 14b at the time when the second imaging data is read out.

As described above, in one embodiment of the present invention, both the display portion 11a and the display portion 11b are scanned at a high speed, and then only the display portion 11 that the finger 31 is in contact with can be scanned at a lower speed. Accordingly, the display portion which is scanned at a lower speed for the fingerprint authentication or the like can be only part of the display portion included in the display apparatus 10. Therefore, the authentication can be performed in a shorter period of time than in the case where the whole display portion included in the display apparatus 10 is scanned at a lower speed for the fingerprint authentication or the like. Note that the authentication can be performed in a much shorter period of time when three or more display portions 11 and three or more row driver circuits 14 are provided in the display apparatus 10.

Example of Driving Method of Display Apparatus

Figure 4:
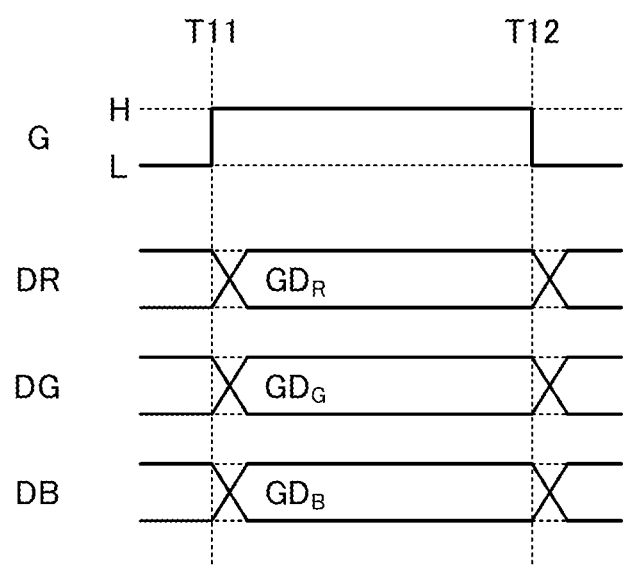
FIG. 4 is a timing chart showing an example of a method of driving a display apparatus.

An example of a method of driving the display apparatus 10 is described below. FIG. 4 is a timing chart showing an example of a method of driving the subpixel 21R, the subpixel 21G, and the subpixel 21B.

In the timing chart shown in FIG. 4, a high potential is denoted as "H" and a low potential is denoted as "L". The same applies to the other timing charts and the like. In the following description of the driving method, a transistor is turned on when a high-potential signal is supplied to a gate of the transistor, and a transistor is turned off when a low-potential signal is supplied to a gate of the transistor.

Before Time T11, a low potential is supplied to the terminal G. Thus, the transistor M1 and the transistor M3 are turned off. Accordingly, a period before Time T11 can be said as a period in which the subpixel 21R, the subpixel 21G, and the subpixel 21B are not selected.

A period from Time T11 to Time T12 corresponds to a period in which image data GD is written to the pixel 30. Here, the image data GD includes, for example, image data $GD_R$ expressing a red image, image data $GD_G$ expressing a green image, and image data $GD_B$ expressing a blue image.

At Time T11, a high potential is supplied to the terminal G. Furthermore, a potential corresponding to the image data $GD_R$ is supplied to the terminal DR, a potential corresponding to the image data $GD_G$ is supplied to the terminal DG, and a potential corresponding to the image data $GD_B$ is supplied to the terminal DB. Thus, the transistor M1 is turned on, the potential corresponding to the image data $GD_R$, the potential corresponding to the image data $GD_G$, or the potential corresponding to the image data $GD_B$ is supplied to the gate of the transistor M2. In addition, the transistor M3 is turned on, and the potential of the one electrode of the light-emitting element EL becomes the potential of the wiring RL. The potential of the one electrode of the light-emitting element EL which is the same as the potential of the wiring RL can inhibit the light-emitting element EL from emitting light in the period from Time T11 to Time T12.

At Time T12, a low potential is supplied to the terminal G. Thus, the transistor M1 and the transistor M3 are turned off, a current corresponding to the potential of the gate of the transistor M2 flows through the light-emitting element EL, and the light-emitting element EL emits light with a luminance corresponding to the image data GD. The above is an example of the method of driving the subpixel 21R, the subpixel 21G, and the subpixel 21B.

FIG. 5A is a flow chart showing an example of a method of driving the imaging pixel 22. In the case where the display apparatus 10 is driven by the driving method of one embodiment of the present invention, first, the display apparatus 10 acquires imaging data ID1 using both the pixels 30a and the pixels 30b (Step S1). For example, the light-receiving element PD detects light emitted from the light-emitting element EL to an object such as a finger and reflected by the object, whereby the display apparatus 10 can acquire the imaging data ID1.

Next, the display apparatus 10 reads out the imaging data ID1 sequentially from the pixels 30a, and then reads out the imaging data ID1 sequentially from the pixels 30b (Step S2). Specifically, with use of the row driver circuit 14a, imaging data is read out from the pixels 30a in order from the first row to the m-th row, and then, with use of the row driver circuit 14b, imaging data is read out from the pixels 30b in order from the first row to the m-th row. Here, it is preferable not to drive the row driver circuit 14a and the row driver circuit 14b at the same time. Thus, the number of elements and the like provided in the reading circuit 15 and the column driver circuit 16 can be reduced, which can simplify the structures of the reading circuit 15 and the column driver circuit 16. Accordingly, the layout flexibility of the display apparatus 10 can be increased.

FIG. 5B1 is a schematic diagram illustrating an example of operation of the display apparatus 10 in Step S2. In Step S2, the imaging data ID1 acquired by the pixels 30a is read out through scanning of the pixels 30a provided in the display portion 11a by the row driver circuit 14a, and then the imaging data ID1 acquired by the pixels 30b is read out through scanning of the pixels 30b provided in the display portion 11b by the row driver circuit 14b.

The display apparatus 10 reads out the imaging data ID1, whereby the position of an object such as a finger in contact with the display portion 11 can be detected, for example. In the example illustrated in FIG. 5B1, the contact of the finger 31 with the display portion 11a is detected.

After that, the control circuit 17 selects the pixels 30a or the pixels 30b on the basis of the imaging data ID1 (Step S3). Specifically, the control circuit 17 selects the row driver circuit 14 to be driven in a subsequent step on the basis of the imaging data ID1. For example, the control circuit 17 selects the row driver circuit 14 that drives the pixel 30 where an object such as a finger is detected using the imaging data ID1. Note that selecting the pixels 30a or the pixels 30b can be rephrased as selecting the display portion 11a or the display portion 11b.

Next, with use of the pixels selected in Step S3, the display apparatus 10 acquires imaging data ID2 (Step S4). After that, the display apparatus 10 reads out the imaging data ID2 from the pixels 30 (Step S5). Specifically, between the row driver circuit 14a and the row driver circuit 14b, the row driver circuit 14 selected by the control circuit 17 in Step S3 is used to read out the imaging data from the pixels 30.

FIG. 5B2 is a schematic diagram illustrating an example of the operation of the display apparatus 10 in Step S5. In the example illustrated in FIG. 5B2, the display portion 11a that the finger 31 is in contact with is selected in Step S3. In FIG. 5B2, the display portion 11a is hatched and the display portion 11b is not hatched, which means that the display portion 11a is selected. In the example illustrated in FIG. 5B2, the row driver circuit 14a reads out the imaging data ID2 acquired by the pixels 30a by scanning the pixels 30a provided in the display portion 11a. Here, in the example illustrated in FIG. 5B2, driving of the row driver circuit 14b can be stopped.

Reading out the imaging data ID2 enables authentication such as fingerprint authentication. In the example illustrated in FIG. 5B2, the fingerprint 32 is detected, and authentication is performed by the display apparatus 10 on the basis of the fingerprint 32.

Note that reading out the imaging data from the pixels 30a sequentially and then from the pixels 30b sequentially as in Step S2 is referred to as driving the display apparatus 10 in a first mode. Accordingly, in the first mode, the control circuit 17 can drive the row driver circuit 14a and the row driver circuit 14b sequentially. Driving the row driver circuit 14a and the row driver circuit 14b sequentially by the control circuit 17 in this manner is referred to as driving the control circuit 17 in the first mode.

Furthermore, reading out the imaging data from either the pixels 30a or the pixels 30b as in Step S5 is referred to as driving the display apparatus 10 in a second mode. Accordingly, in the second mode, the control circuit 17 can drive one of the row driver circuit 14a and the row driver circuit 14b on the basis of the imaging data read out in the first mode. Driving one of the row driver circuit 14a and the row driver circuit 14b by the control circuit 17 on the basis of the imaging data read out in the first mode in this manner is referred to as driving the control circuit 17 in the second mode. As described above, the control circuit 17 has a function of driving in the first mode and the second mode.

Figure 6:
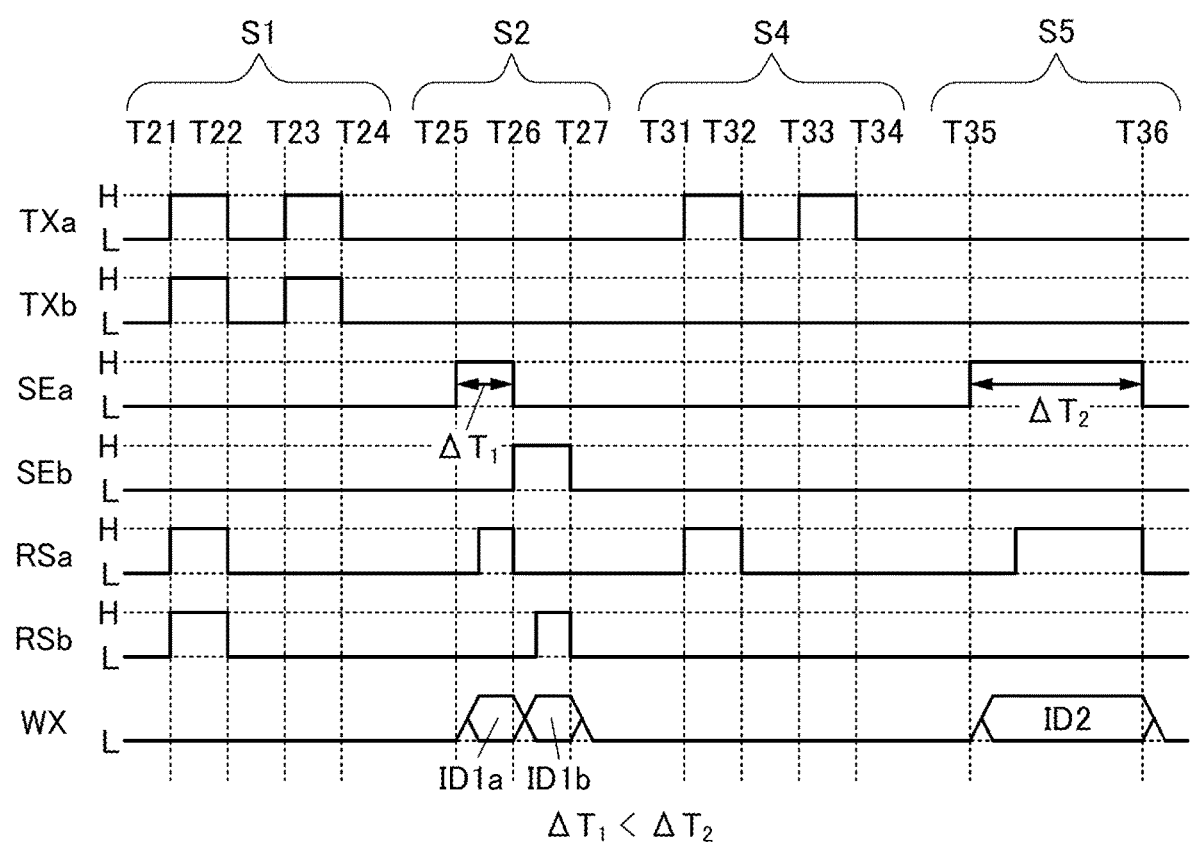
FIG. 6 is a timing chart showing an example of a method of driving a display apparatus.

FIG. 6 is a timing chart showing the details of the driving method in each step in the flow chart of FIG. 5A. Here, the potential of the wiring V1 is lower than the potential of the wiring CL2. For example, the potential of the wiring V1 can be a low potential, and the potential of the wiring CL2 can be a high potential. The potential of the wiring V2 can be a low potential, for example.

In FIG. 6, a period from Time T21 to Time T24 corresponds to Step S1, and a period from Time T25 to Time T27 corresponds to Step S2. A period from Time T31 to Time T34 corresponds to Step S4, and a period from Time T35 to Time T36 corresponds to Step S5. Although not shown in FIG. 6, operation shown in Step S3 is performed in a period from Time T27 to Time T31.

Before Time T21, a low potential is supplied to each of a terminal TXa, a terminal TXb, the terminal SEa, the terminal SEb, the terminal RSa, and the terminal RSb. A low potential of the terminal WX means a state in which imaging data is not input to the terminal WX. Note that the terminal WX may be supplied with a predetermined potential.

At Time T21, a high potential is supplied to each of the terminal TXa, the terminal TXb, the terminal RSa, and the terminal RSb. As a result, the transistor M5 included in the pixel 30a, the transistor M5 included in the pixel 30b, the transistor M6 included in the pixel 30a, and the transistor M6 included in the pixel 30b are turned on. Thus, a potential lower than a potential of a cathode electrode of the light-receiving element PD is supplied to an anode electrode thereof from the wiring V1 through the transistor M6 and the transistor M5. That is, a reverse bias voltage is applied to the light-receiving element PD. The potential of the wiring V1 is also supplied to the one electrode of the capacitor C2.

In the above manner, reset operation is performed on the pixels 30a and the pixels 30b. Accordingly, a period from Time T21 to Time T22 can also be referred to as a reset (initialization) period.

At Time T22, a low potential is supplied to each of the terminal TXa, the terminal TXb, the terminal RSa, and the terminal RSb. As a result, the transistor M5 included in the pixel 30a, the transistor M5 included in the pixel 30b, the transistor M6 included in the pixel 30a, and the transistor M6 included in the pixel 30b are turned off.

Since the transistor M5 is turned off, the state in which the reverse bias voltage is applied to the light-receiving element PD is maintained. Here, photoelectric conversion is caused by light incident on the light-receiving element PD, and electric charges are accumulated in the anode electrode of the light-receiving element PD.

A period from Time T22 to Time T23 can also be referred to as a light exposure period. The light exposure period is set in accordance with the sensitivity of the light-receiving element PD, the amount of incident light, or the like and is preferably set to be much longer than at least the reset period.

In addition, in the period from Time T22 to T23, the transistor M5 and the transistor M6 are turned off, so that the potential of the one electrode of the capacitor C2 is held at a low potential supplied from the wiring V1.

At Time T23, a high potential is supplied to each of the terminal TXa and the terminal TXb. Accordingly, the transistor M5 included in the pixel 30a and the transistor M5 included in the pixel 30b are turned on, and electric charges accumulated in the light-receiving element PD are transferred to the one electrode of the capacitor C2 through the transistor M5. Accordingly, the potential of a node to which the one electrode of the capacitor C2 is connected increases in accordance with the amount of the electric charges accumulated in the light-receiving element PD. Consequently, a potential corresponding to the amount of light to which the light-receiving element PD is exposed is supplied to the gate of the transistor M7.

At Time T24, a low potential is supplied to each of the terminal TXa and the terminal TXb. Thus, the transistor M5 included in the pixel 30a and the transistor M5 included in the pixel 30b are turned off, and a node to which the gate of the transistor M7 is connected is brought into a floating state. Since the light-receiving element PD is continuously exposed to light, a change in the potential of the node to which the gate of the transistor M7 is connected can be inhibited by turning off the transistor M5 after the transfer operation in a period from Time T23 to T24 is completed.

In the above manner, the pixel 30a and the pixel 30b can acquire the imaging data ID1 in the period from Time T21 to Time T24. Here, the imaging data ID can be acquired either by a global shutter system or a rolling shutter system.

At Time T25, a high potential is supplied to the terminal SEa. Accordingly, the transistor M8 included in the pixel 30a is turned on. For example, a source follower circuit or a source-grounded circuit can be formed with the transistor M7 included in the pixel 30a and a transistor included in the reading circuit 15 to read out the imaging data ID acquired by the pixel 30a. Here, imaging data acquired by the pixel 30a among the imaging data ID1 is referred to as imaging data ID1a. In the case where a source follower circuit is formed with the transistor M7 and the transistor included in the reading circuit 15, the potential of the terminal WX is determined depending on the gate potential of the transistor M7. Specifically, the potential of the terminal WX is a potential obtained by subtracting the threshold voltage of the transistor M7 from the gate potential of the transistor M7.

Although details are described later, here, a high-potential signal can be output from the terminal SEa[1] to the terminal SEa[m] in order from SEa[1] to SEa[m] in a period from Time T25 to Time T26. Thus, the display apparatus 10 can read out the imaging data ID1a.

In this specification and the like, "a signal is input" means input of a high-potential signal in some cases. In addition, "a signal is output" means output of a high-potential signal in some cases.

In the period from Time T25 to Time T26, after a high potential is supplied to the terminal SEa, a high potential can be supplied to the terminal RSa. Accordingly, the transistor M8 included in the pixel 30a is turned on and then the transistor M6 included in the pixel 30a is turned on, whereby the potential of the wiring V1 is supplied to the one electrode of the capacitor C2. Therefore, electric charges accumulated in the capacitor C2 are discharged and reset. Thus, correlated double sampling (CDS) can be performed on the imaging data ID1a in the period from Time T25 to Time T26.

At Time T26, a low potential is supplied to each of the terminal SEa and the terminal RSa, and a high potential is supplied to the terminal SEb. As a result, the transistor M8 and the transistor M6 included in the pixel 30a are turned off and the transistor M8 included in the pixel 30b is turned on. Since the transistor M8 included in the pixel 30b is turned on, the imaging data ID1 acquired by the pixel 30b can be read out. Here, imaging data acquired by the pixel 30b among the imaging data ID1 is referred to as imaging data ID1b. Although details are described later, in a period from Time T26 to Time T27, a high-potential signal is output from the terminal SEb[1] to the terminal SEb[m] in order from SEb[1] to SEb[m], whereby the display apparatus 10 can read out the imaging data ID1b. Note that in the period from Time T25 to Time T26, a low potential may be supplied to the terminal RSa and then a low potential may be supplied to the terminal SEa. That is, the supply of a low potential to the terminal RSa and the supply of a low potential to the terminal SEa are not necessarily performed at the same time.

In the period from Time T26 to Time T27, after a high potential is supplied to the terminal SEb, a high potential can be supplied to the terminal RSb. Accordingly, the transistor M8 included in the pixel 30b is turned on and then the transistor M6 included in the pixel 30b is turned on, whereby the potential of the wiring V1 is supplied to the one electrode of the capacitor C2. Therefore, electric charges accumulated in the capacitor C2 are discharged and reset. Thus, CDS can be performed on the imaging data ID1b in the period from Time T26 to Time T27.

At Time T27, a low potential is supplied to each of the terminal SEb and the terminal RSb. As a result, the transistor M8 and the transistor M6 included in the pixel 30b are turned off. Note that in the period from Time T26 to Time T27, a low potential may be supplied to the terminal RSb and then a low potential may be supplied to the terminal SEb. That is, the supply of a low potential to the terminal RSb and the supply of a low potential to the terminal SEb are not necessarily performed at the same time.

In the above manner, the imaging data ID1 can be read out in the period from Time T25 to Time T27. Here, in Step S3, the pixel 30a is selected on the basis of the imaging data ID1. That is, a contact of the finger 31 or the like with the display portion 11a is detected in accordance with the read imaging data ID1.

At Time T31, a high potential is supplied to each of the terminal TXa and the terminal RSa. As a result, the transistor M5 included in the pixel 30a and the transistor M6 included in the pixel 30a are turned on. Thus, reset operation is performed on the pixel 30a. Like the period from Time T21 to Time T22, a period from Time T31 to Time T32 can also be referred to as a reset (initialization) period.

At Time T32, a low potential is supplied to each of the terminal TXa and the terminal RSa. As a result, the transistor M5 included in the pixel 30a and the transistor M6 included in the pixel 30a are turned off. Thus, photoelectric conversion is caused by light incident on the light-receiving element PD, and electric charges are accumulated in the anode electrode of the light-receiving element PD. Therefore, like a period from Time T22 to Time T23, a period from Time T32 to Time T33 can also be referred to as a light exposure period.

At Time T33, a high potential is supplied to the terminal TXa. Accordingly, the transistor M5 included in the pixel 30a is turned on. Consequently, a potential corresponding to the amount of light to which the light-receiving element PD is exposed is supplied to the gate of the transistor M7.

At Time T34, a low potential is supplied to the terminal TXa. Accordingly, the transistor M5 included in the pixel 30a is turned off.

In the above manner, the pixel 30a can acquire the imaging data ID2 in a period from Time T31 to Time T34. Here, the imaging data ID2 may be acquired by a global shutter system as well as the imaging data ID1, or by a rolling shutter system. Alternatively, for example, in Step S1 in which imaging data is acquired with use of both the pixels 30a and the pixels 30b, the imaging data ID1 may be acquired by the global shutter system, and in Step S4 in which imaging data is acquired with use of either the pixels 30a or the pixels 30b, the imaging data ID2 may be acquired by the rolling shutter system. Note that in the case where the imaging data ID2 is acquired by the global shutter system, even when imaging data is acquired with use of both the pixels 30a and the pixels 30b, the length of the period from Time T31 to Time T34 can be equal to that in the case where imaging data is acquired with use of only the pixels 30a.

At Time T35, a high potential is supplied to the terminal SEa. Accordingly, the transistor M8 included in the pixel 30a is turned on. Thus, the imaging data ID2 can be read out. In the period from Time T35 to Time T36, after a high potential is supplied to the terminal SEa, a high potential can be supplied to the terminal RSa. Accordingly, the transistor M8 included in the pixel 30a is turned on and then the transistor M6 included in the pixel 30a is turned on, whereby CDS can be performed on the imaging data ID2.

At Time T36, a low potential is supplied to each of the terminal SEa and the terminal RSa. As a result, the transistor M8 and the transistor M6 included in the pixel 30a are turned off. In the above manner, the imaging data ID2 can be read out in the period from Time T35 to Time T36. Note that in the period from Time T35 to Time T36, a low potential may be supplied to the terminal RSa and then a low potential may be supplied to the terminal SEa. That is, the supply of a low potential to the terminal RSa and the supply of a low potential to the terminal SEa are not necessarily performed at the same time.

The above is an example of the driving method of the display apparatus 10. As described above, in the case where authentication such as fingerprint authentication is performed, the display apparatus 10 preferably performs image capturing with high accuracy in order to increase the accuracy of the authentication. In contrast, in the case where authentication is not performed and the position of the finger or the like is detected, the accuracy of image capturing can be lower than that in the case where the authentication is performed. Here, as the reading speed of the imaging data is decreased, shapes of a fingerprint and the like can be read out more accurately, whereby the authentication can be performed with high accuracy. Accordingly, in the case where the authentication is not performed and the position of the finger or the like is detected, the imaging data can be read out at a higher speed than in the case where the authentication is performed, for example.

Accordingly, the time required for reading out the imaging data ID2 is preferably longer than the time required for reading out the imaging data ID1a, for example. Specifically, when the length from Time T25 to Time T26 is denoted by $\Delta T_1$ and the length from Time T35 to Time T36 is denoted by $\Delta T_2$, it is preferable to satisfy $\Delta T_1 < \Delta T_2$. Thus, detection of the position of a finger or the like using the imaging data ID1 is performed at a high speed, and authentication using the imaging data ID2 can be conducted with high accuracy. Therefore, the display apparatus 10 can perform highly accurate authentication in a short time. Here, for example, the scan rate of the row driver circuit 14a in the period from Time T25 to Time T26 is set higher than the scan rate of the row driver circuit 14b in the period from Time T35 to Time T36, whereby $\Delta T_1 < \Delta T_2$ is satisfied.

Note that the light exposure period in Step S4 may be equal to the light exposure period in Step S1 or longer than the light exposure period in Step S1. That is, the length from Time T32 to Time T33 may be equal to the length from Time T22 to Time T23 or longer than the length from Time T22 to Time T23.

Structure Example of Row Driver Circuit

Figure 7:
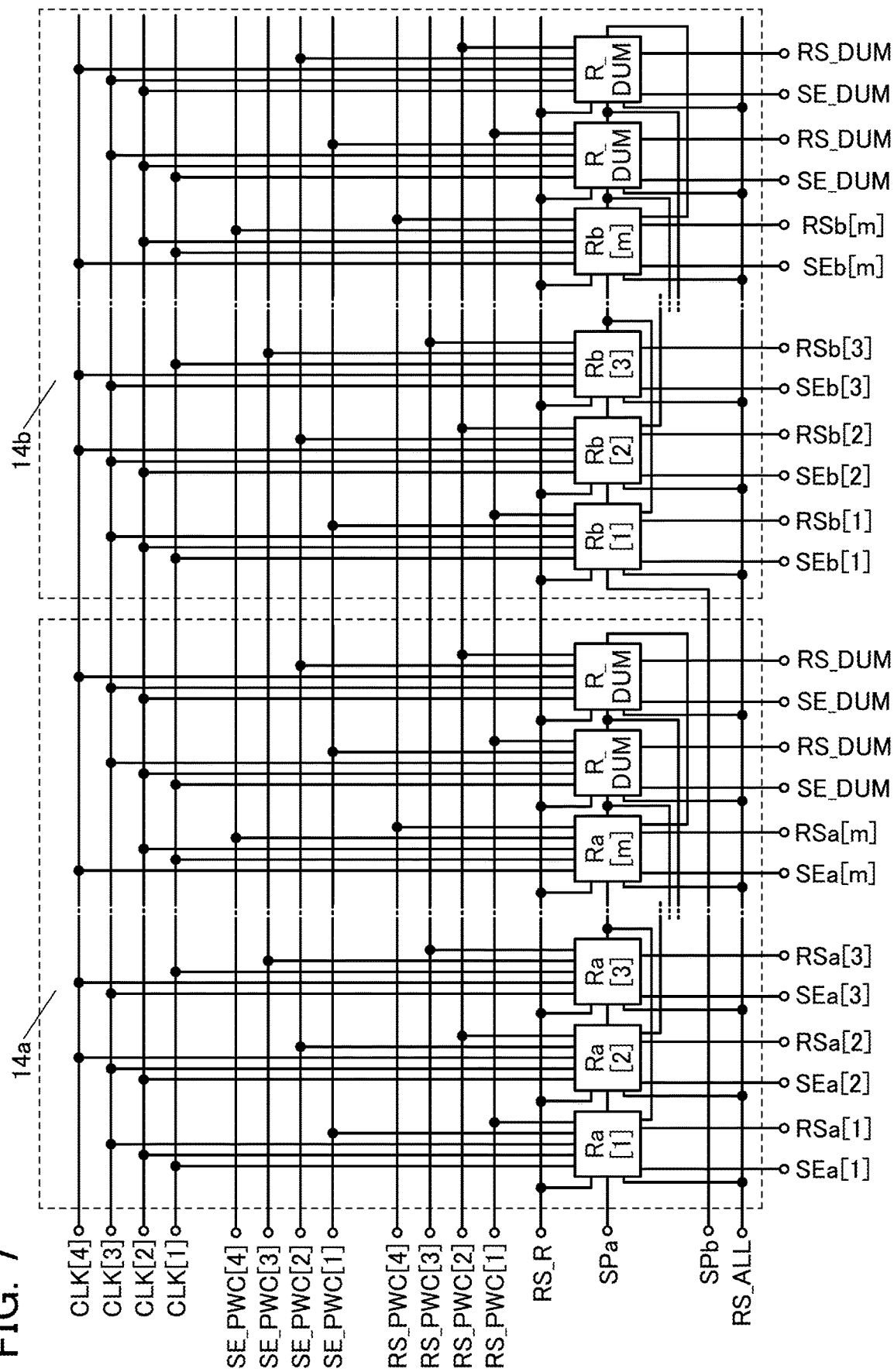
FIG. 7 is a block diagram illustrating a structure example of a row driver circuit.

FIG. 7 illustrates a structure example of the row driver circuit 14a and the row driver circuit 14b. Specifically, a structure example of shift register circuits included in the row driver circuit 14a and the row driver circuit 14b is illustrated. The row driver circuit 14a includes a register circuit Ra[1] to a register circuit Ra[m] and a register circuit R_DUM. The row driver circuit 14b includes a register circuit Rb[1] to a register circuit Rb[m] and a register circuit R_DUM.

The terminal SPa is electrically connected to the register circuit Ra[1], and the terminal SPb is electrically connected to the register circuit Rb[1]. The start pulse signal is input to the register circuit Ra[1] through the terminal SPa, and the start pulse signal is input to the register circuit Rb[1] through the terminal SPb. As described above, the start pulse signal can be generated by the control circuit 17.

The register circuit Ra[1] to the register circuit Ra[m] and the register circuit R_DUM are connected in series. Specifically, for example, the register circuit Ra[1] is electrically connected to a register circuit Ra[2], the register circuit Ra[2] is electrically connected to a register circuit Ra[3], and the register circuit Ra[m] is electrically connected to the register circuit R_DUM. The register circuit Rb[1] to the register circuit Rb[m] and the register circuit R_DUM are connected in series. Specifically, for example, the register circuit Rb[1] is electrically connected to a register circuit Rb[2], the register circuit Rb[2] is electrically connected to a register circuit Rb[3], and the register circuit Rb[m] is electrically connected to the register circuit R_DUM.

A register circuit Ra is electrically connected to the terminal SEa and the terminal RSa, and a signal can be output from these terminals. A register circuit Rb is electrically connected to the terminal SEb and the terminal RSb, and a signal can be output from these terminals.

Furthermore, the register circuit R_DUM is electrically connected to a terminal SE_DUM and a terminal RS_DUM, and a signal can be output from these terminals. As described above, the terminal SEa and the terminal RSa are electrically connected to the pixel 30a, and the terminal SEb and the terminal RSb are electrically connected to the pixel 30b.

A terminal CLK, a terminal RS_R, a terminal SE_PWC, a terminal RS_PWC, and a terminal RS_ALL can be electrically connected to the register circuit Ra, the register circuit Rb, and the register circuit R_DUM. Although FIG. 7 illustrates a structure in which a terminal CLK[1] to a terminal CLK[4] are provided as the terminals CLK, a terminal SE_PWC[1] to a terminal SE_PWC[4] are provided as the terminals SE_PWC, and a terminal RS_PWC[1] to a terminal RS_PWC[4] are provided as the terminals RS_PWC, the numbers of the terminals CLK, the terminals SE_PWC, and the terminals RS_PWC are not limited to the numbers illustrated in FIG. 7.

FIG. 7 illustrates a structure in which three terminals CLK are electrically connected to one register circuit R. For example, the register circuit Ra[1] and the register circuit Rb[1] are electrically connected to a terminal CLK[1], a terminal CLK[2], and a terminal CLK[3]. Furthermore, the register circuit Ra[2] and the register circuit Rb[2] are electrically connected to the terminal CLK[2], the terminal CLK[3], and a terminal CLK[4]. The register circuit Ra[3] and the register circuit Rb[3] are electrically connected to the terminal CLK[3], the terminal CLK[4], and the terminal CLK[1]. Furthermore, the register circuit Ra[m] and the register circuit Rb[m] are electrically connected to the terminal CLK[4], the terminal CLK[1], and the terminal CLK[2]. Note that the register circuit R_DUM can be electrically connected with three terminals CLK, as well as the register circuit R is.

FIG. 7 illustrates a structure in which one terminal SE_PWC and one terminal RS_PWC are electrically connected to one register circuit R. For example, the register circuit Ra[1] and the register circuit Rb[1] are electrically connected to the terminal SE_PWC[1] and the terminal RS_PWC[1]. The register circuit Ra[2] and the register circuit Rb[2] are electrically connected to a terminal SE_PWC[2] and a terminal RS_PWC[2]. The register circuit Ra[3] and the register circuit Rb[3] are electrically connected to a terminal SE_PWC[3] and a terminal RS_PWC[3]. Furthermore, the register circuit Ra[m] and the register circuit Rb[m] are electrically connected to the terminal SE_PWC[4] and the terminal RS_PWC[4]. Note that the register circuit R_DUM can be electrically connected with one terminal SE_PWC and one terminal RS_PWC, as well as the register circuit R is.

Note that the structure of the row driver circuit 14 illustrated in FIG. 7 can be used for the gate driver circuit 13 by replacing the terminal SE with the terminal G and not providing the terminal RS, for example.

FIG. 8A1 is a diagram illustrating an example of a terminal electrically connected to the register circuit R. A terminal CLK[i1], a terminal CLK[i2], a terminal CLK[i3], a terminal SE_PWC[j], a terminal RS_PWC[j], the terminal RS_R, the terminal RS_ALL, the terminal SE, the terminal RS, a terminal LIN, a terminal RIN, and a terminal ROUT are electrically connected to the register circuit R.

Here, the terminal CLK[i1], the terminal CLK[i2], and the terminal CLK[i3] can be any of the terminal CLK[1] to the terminal CLK[4]. For example, in the register circuit R[1], the terminal CLK[i1] can be the terminal CLK[1], the terminal CLK[i2] can be the terminal CLK[2], and the terminal CLK[i3] can be the terminal CLK[3]. Furthermore, in the register circuit R[2], the terminal CLK[i1] can be the terminal CLK[2], the terminal CLK[i2] can be the terminal CLK[3], and the terminal CLK[i3] can be the terminal CLK[4]. Furthermore, in the register circuit R[3], the terminal CLK[i1] can be the terminal CLK[3], the terminal CLK[i2] can be the terminal CLK[4], and the terminal CLK[i3] can be the terminal CLK[1]. Furthermore, in the register circuit R[m], the terminal CLK[i1] can be the terminal CLK[4], the terminal CLK[i2] can be the terminal CLK[1], and the terminal CLK[i3] can be the terminal CLK[2].

The terminal SE_PWC[j] can be any of the terminal SE_PWC[1] to the terminal SE_PWC[4], and the terminal RS_PWC[j] can be any of the terminal RS_PWC[1] to the terminal RS_PWC[4]. For example, in the register circuit R[1], the terminal SE_PWC[j] can be the terminal SE_PWC[1] and the terminal RS_PWC[j] can be the terminal RS_PWC[1]. In the register circuit R[2], the terminal SE_PWC[j] can be the terminal SE_PWC[2] and the terminal RS_PWC[j] can be the terminal RS_PWC[2]. In the register circuit R[3], the terminal SE_PWC[j] can be the terminal SE_PWC[3] and the terminal RS_PWC[j] can be the terminal RS_PWC[3]. Furthermore, in the register circuit R[m], the terminal SE_PWC[j] can be the terminal SE_PWC[4] and the terminal RS_PWC[j] can be the terminal RS_PWC[4].

Although the details are described later, a signal is input to the register circuit R through the terminal SE_PWC, the terminal RS_PWC, the terminal RS_R, the terminal RS_ALL, the terminal LIN, and the terminal RIN, and the signal is output from the register circuit R to the terminal ROUT, the terminal SE, and the terminal RS. Thus, the terminal SE_PWC, the terminal RS_PWC, the terminal RS_R, the terminal RS_ALL, the terminal LIN, and the terminal RIN are input terminals, and the terminal ROUT, the terminal SE, and the terminal RS are output terminals.

Furthermore, a clock signal is input to the terminal CLK. Thus, the terminal CLK is a clock signal input terminal. Here, signals input to the terminal CLK, the terminal SE_PWC, the terminal RS_PWC, the terminal RS_R, and the terminal RS_ALL can be generated by the control circuit 17 illustrated in FIG. 1 and the like.

FIG. 8A2 is a diagram illustrating an example of a terminal electrically connected to the register circuit R_DUM. The terminal CLK[i1], the terminal CLK[i2], the terminal CLK[i3], the terminal SE_PWC[j], the terminal RS_PWC[j], the terminal RS_R, the terminal RS_ALL, the terminal SE_DUM, the terminal RS_DUM, a terminal LIN_DUM, and a terminal ROUT_DUM are electrically connected to the register circuit R. Here, the terminal LIN_DUM is an input terminal, and the terminal ROUT_DUM, the terminal SE_DUM, and the terminal RS_DUM are output terminals.

FIG. 8B illustrates a connection relation between the register circuit R[1] to the register circuit R[m] and the register circuits R_DUM. Here, the start pulse signal is input to a terminal LIN[1]. Thus, the terminal LIN[1] is a terminal SP. When the start pulse signal is input to the terminal LIN[1], the register circuit R[1] can output signals to a terminal ROUT[1], a terminal SE[1], and a terminal RS[1].

The terminal ROUT[1] is electrically connected to a terminal LIN[2]. Accordingly, a signal output from the terminal ROUT[1] of the register circuit R[1] is input to the register circuit R[2] through the terminal LIN[2]. When the signal is input to the terminal LIN[2], the register circuit R[2] can output signals to a terminal ROUT[2], a terminal SE[2], and a terminal RS[2].

The terminal ROUT[2] is electrically connected to a terminal LIN[3]. Accordingly, a signal output from the terminal ROUT[2] of the register circuit R[2] is input to the register circuit R[3] through the terminal LIN[3]. When the signal is input to the terminal LIN[3], the register circuit R[3] can output signals to a terminal ROUT[3], a terminal SE[3], and a terminal RS[3].

Although not illustrated in FIG. 8B, a terminal ROUT[m−1] is electrically connected to a terminal LIN[m]. Accordingly, a signal output from the terminal ROUT[m−1] of the register circuit R[m−1] is input to the register circuit R[m] through the terminal LIN[m]. When the signal is input to the terminal LIN[m], the register circuit R[m] can output signals to a terminal ROUT[m], a terminal SE[m], and a terminal RS[m].

As described above, the register circuits R are connected to one another in series through the terminals ROUT and the terminals LIN.

The terminal ROUT[m] is electrically connected to the terminal LIN_DUM. Accordingly, a signal output from the terminal ROUT[m] of the register circuit R[m] is input to the register circuit R_DUM through the terminal LIN_DUM. When the signal is input to the terminal LIN_DUM, the register circuit R_DUM can output signals to the terminal ROUT_DUM, the terminal SE_DUM, and the terminal RS_DUM.

The terminal ROUT[3] is electrically connected to a terminal RIN[1]. Accordingly, a signal output from the terminal ROUT[3] of the register circuit R[3] is input to the register circuit R[1] through the terminal RIN[1]. That is, a signal output from the register circuit R which is two stages after the current stage can be input to the terminal RIN. Although not illustrated in FIG. 8B, a terminal RIN[2] can be electrically connected to a terminal ROUT[4] which is electrically connected to a register circuit R[4]. Furthermore, a terminal RIN[3] can be electrically connected to a terminal ROUT[5] which is electrically connected to a register circuit R[5].

Here, since a signal output from the register circuit R which is two stages after the current stage is input to the terminal RIN, m register circuits R and two register circuits R_DUM are provided in the row driver circuit 14. Thus, the terminal ROUT_DUM can supply signals to a terminal RIN[m−1] and a terminal RIN[m]. Note that a signal output from the register circuit R which is the next stage after the current stage may be input to the terminal RIN, or a signal output from the register circuit R which is three or more stages after the current stage may be input to the terminal RIN. For example, in the case where a signal output from the register circuit R which is the next stage after the current stage is input to the terminal RIN, the number of register circuits R_DUM provided in the row driver circuit 14 can be one. In the case where a signal output from the register circuit R which is three or more stages after the current stage is input to the terminal RIN, the number of register circuits R_DUM provided in the row driver circuit 14 can be three.

Figure 9A:
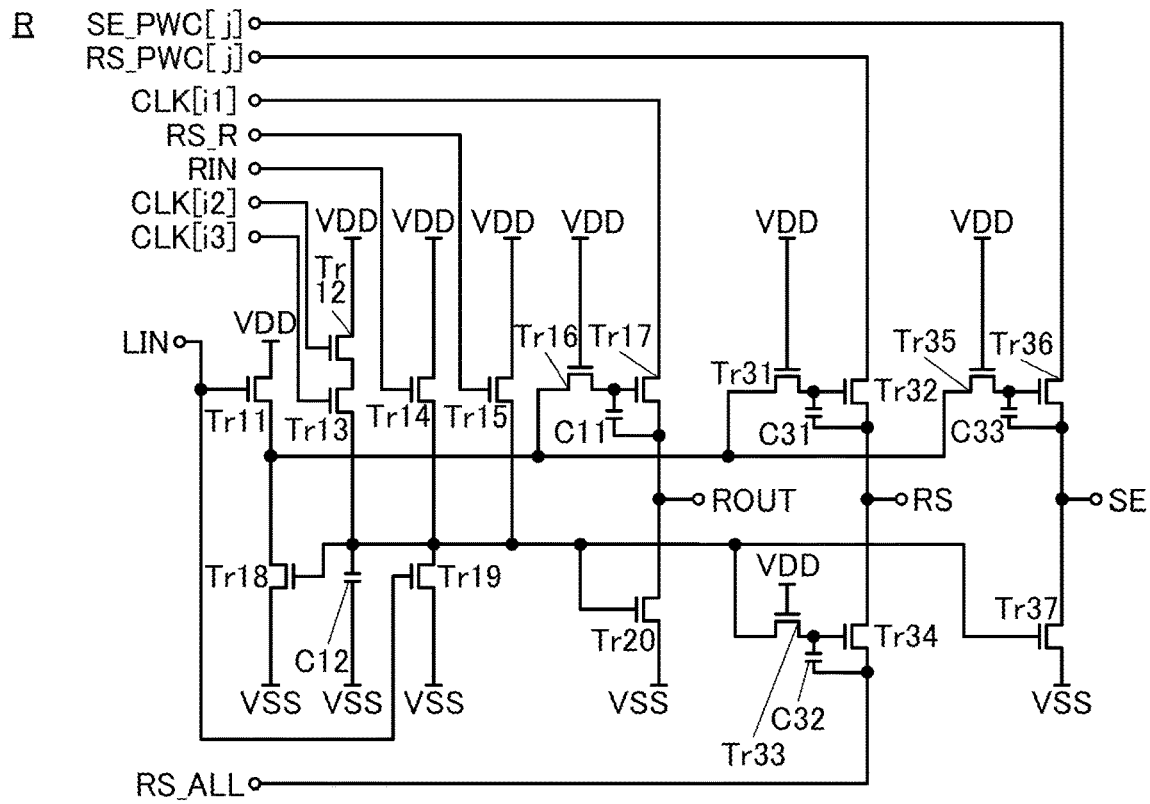
FIG. 9A and FIG. 9B are circuit diagrams each illustrating a structure example of a row driver circuit.

FIG. 9A is a circuit diagram illustrating a structure example of the register circuit R. The register circuit R includes a transistor Tr11, a transistor Tr12, a transistor Tr13, a transistor Tr14, a transistor Tr15, a transistor Tr16, a transistor Tr17, a transistor Tr18, a transistor Tr19, a transistor Tr20, a transistor Tr31, a transistor Tr32, a transistor Tr33, a transistor Tr34, a transistor Tr35, a transistor Tr36, a transistor Tr37, a capacitor C11, a capacitor C12, a capacitor C31, a capacitor C32, and a capacitor C33. Note that the register circuit R may have a structure not including at least one of the transistor Tr16, the transistor Tr31, the transistor Tr33, and the transistor Tr35.

In this specification and the like, a potential VDD refers to a high potential and a potential VSS refers to a low potential.

The terminal CLK[i1] is electrically connected to one of a source and a drain of the transistor Tr17. The terminal CLK[i2] is electrically connected to a gate of the transistor Tr12. The terminal CLK[i3] is electrically connected to a gate of the transistor Tr13. The terminal RS_R is electrically connected to a gate of the transistor Tr15. The terminal LIN is electrically connected to a gate of the transistor Tr11 and a gate of the transistor Tr19. The terminal RIN is electrically connected to a gate of the transistor Tr14. The terminal SE_PWC[j] is electrically connected to one of a source and a drain of the transistor Tr36. The terminal RS_PWC[j] is electrically connected to one of a source and a drain of the transistor Tr32. The terminal RS_ALL is electrically connected to one of a source and a drain of the transistor Tr34 and one electrode of a capacitor C32.

The terminal ROUT is electrically connected to the other of the source and the drain of the transistor Tr17, one electrode of the capacitor C11, and one of a source and a drain of the transistor Tr20. The terminal SE is electrically connected to the other of the source and the drain of the transistor Tr36, one of a source and a drain of the transistor Tr37, and one electrode of the capacitor C33. The terminal RS is electrically connected to the other of the source and the drain of the transistor Tr32, the other of the source and the drain of the transistor Tr34, and one electrode of the capacitor C31.

One of a source and a drain of the transistor Tr11 is electrically connected to one of a source and a drain of the transistor Tr16, one of a source and a drain of the transistor Tr18, one of a source and a drain of the transistor Tr31, and one of a source and a drain of the transistor Tr35. One of a source and a drain of the transistor Tr12 is electrically connected to one of a source and a drain of the transistor Tr13. The other of the source and the drain of the transistor Tr13 is electrically connected to one of a source and a drain of the transistor Tr14, one of a source and a drain of the transistor Tr15, a gate of the transistor Tr18, one of a source and a drain of the transistor Tr19, a gate of the transistor Tr20, one of a source and a drain of the transistor Tr33, a gate of the transistor Tr37, and one electrode of the capacitor C12. The other of the source and the drain of the transistor Tr16 is electrically connected to a gate of the transistor Tr17 and the other electrode of the capacitor C11. The other of the source and the drain of the transistor Tr31 is electrically connected to a gate of the transistor Tr32 and the other electrode of the capacitor C31. The other of the source and the drain of the transistor Tr33 is electrically connected to a gate of the transistor Tr34 and the other electrode of the capacitor C32. The other of the source and the drain of the transistor Tr35 is electrically connected to a gate of the transistor Tr36 and the other electrode of the capacitor C33.

The potential VDD can be supplied to the other of the source and the drain of the transistor Tr11, the other of the source and the drain of the transistor Tr12, the other of the source and the drain of the transistor Tr14, the other of the source and the drain of the transistor Tr15, a gate of the transistor Tr16, a gate of the transistor Tr31, and a gate of the transistor Tr35. Furthermore, the potential VSS can be supplied to the other of the source and the drain of the transistor Tr18, the other of the source and the drain of the transistor Tr19, the other of the source and the drain of the transistor Tr20, the other of the source and the drain of the transistor Tr37, and the other electrode of the capacitor C12.

When a high-potential signal is input to the terminal LIN, the transistor Tr11 and the transistor Tr19 are turned on. Thus, a high potential is supplied to the gate of the transistor Tr17, whereby the transistor Tr17 is turned on. Thus, the clock signal input to the terminal CLK[i1] can be output from the terminal ROUT. In addition, a high potential is supplied to the gate of the transistor Tr32, whereby the transistor Tr32 is turned on. Thus, a signal input to the terminal RS_PWC[j] can be output from the terminal RS. Furthermore, a high potential is supplied to the gate of the transistor Tr36, whereby the transistor Tr36 is turned on. Thus, a signal input to the terminal SE_PWC[j] can be output from the terminal SE.

When a high-potential signal is input to the terminal CLK[i2] and the terminal CLK[i3], the transistor Tr12 and the transistor Tr13 are turned on. Thus, a high potential is supplied to the gate of the transistor Tr18, the gate of the transistor Tr20, the gate of the transistor Tr34, and the gate of the transistor Tr37, whereby the transistor Tr18, the transistor Tr20, the transistor Tr34, and the transistor Tr37 are turned on. When the transistor Tr20 is turned on, the potential of the terminal ROUT becomes a low potential, and when the transistor Tr37 is turned on, the potential of the terminal SE becomes a low potential. When the transistor Tr34 is turned on, a signal input to the terminal RS_ALL can be output from the terminal RS.

In the case where a high-potential signal is input to the terminal RIN or even in a case where a high-potential signal is input to the terminal RS_R, the transistor Tr18, the transistor Tr20, the transistor Tr34, and the transistor Tr37 are turned on. Accordingly, as in the above-described case, the potential of each of the terminal ROUT and the terminal SE becomes a low potential, and a signal input to the terminal RS_ALL is output from the terminal RS.

For example, in the period from Time T21 to Time T22 and the period from Time T31 to Time T32 in FIG. 6, a high-potential signal is input to each of the terminal RS_R and the terminal RS_ALL, whereby a high-potential signal is output from the terminal RS. Thus, the reset operation can be performed on the pixels 30.

Figure 9B:
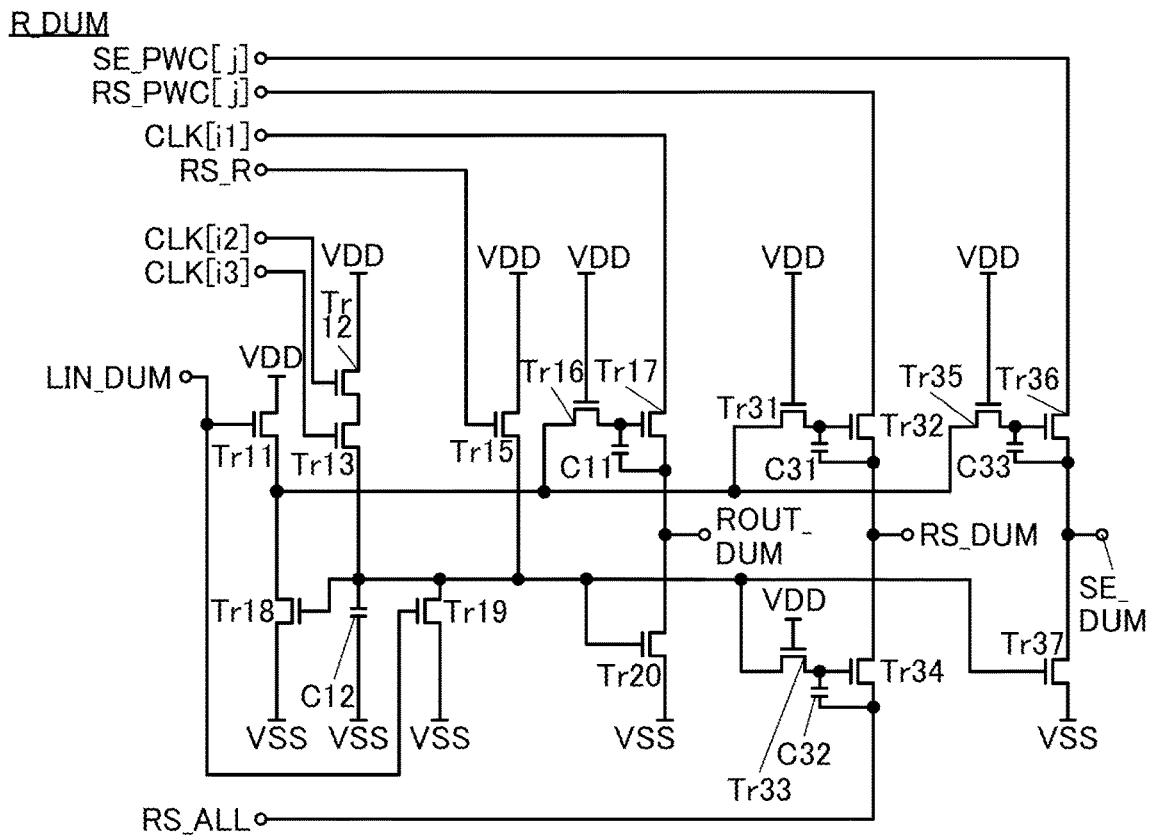

FIG. 9B is a diagram illustrating a structure example of the register circuit R_DUM. The register circuit R_DUM is different from the register circuit R illustrated in FIG. 9A in that the transistor Tr14 is not included and the terminal LIN_DUM, the terminal ROUT_DUM, the terminal SE_DUM, and the terminal RS_DUM are electrically connected instead of the terminal LIN, the terminal ROUT, the terminal SE, and the terminal RS.

Example of Driving Method of Row Driver Circuit

Figure 10:
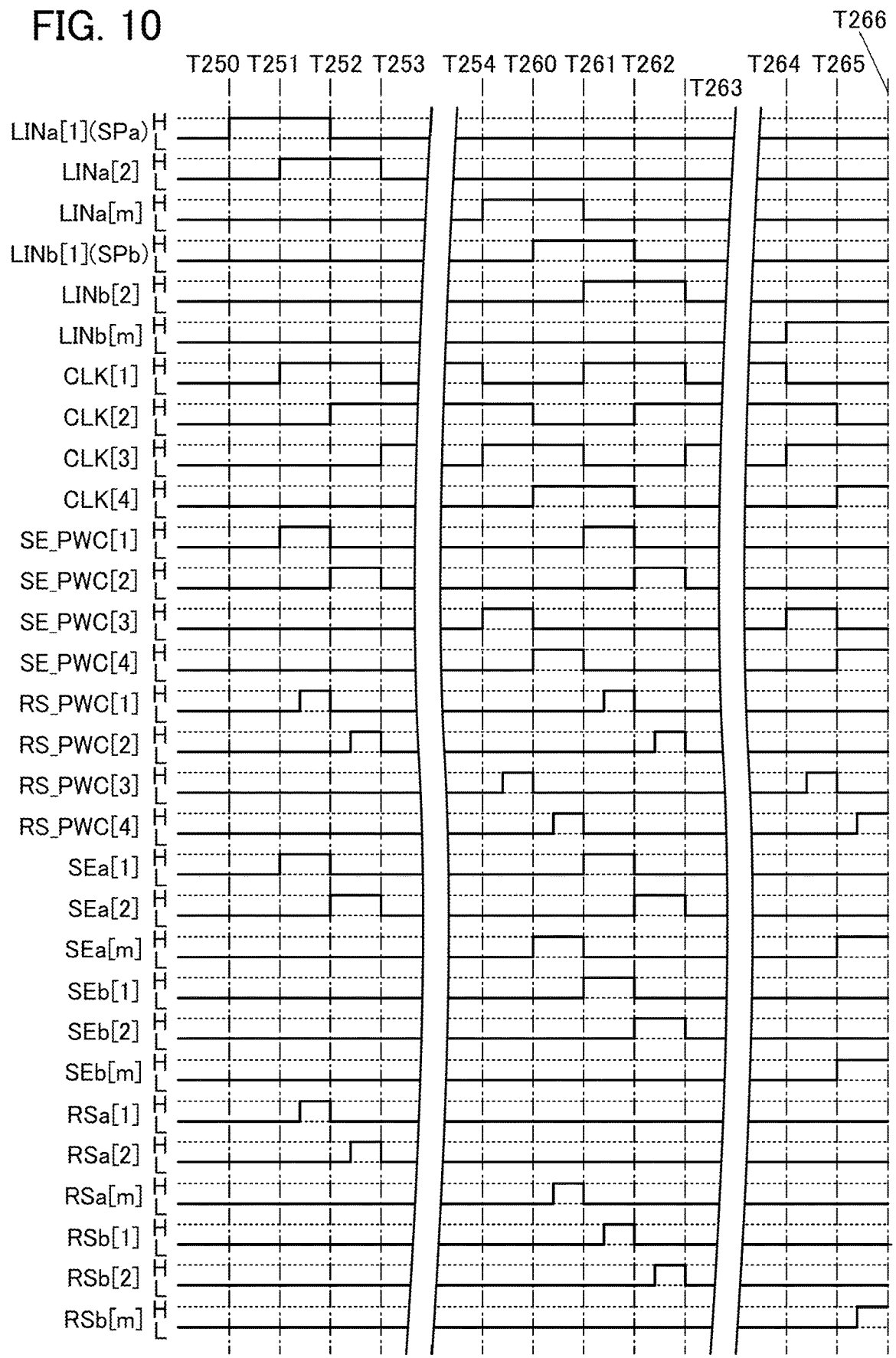
FIG. 10 is a timing chart showing an example of a method of driving a row driver circuit.

FIG. 10 is a timing chart showing an example of a method of driving the row driver circuit 14a and the row driver circuit 14b in the period from Time T25 to Time T27 shown in FIG. 6. Note that in FIG. 10, an increase in potential or the like due to bootstrap by the transistor Tr16, the transistor Tr31, the transistor Tr33, or the transistor Tr35 is not considered. The same applies to the other timing charts.

First, in Time T250, a high-potential signal is input as the start pulse signal to a terminal LINa[1].

Clock signals are sequentially input to the terminal CLK[1] to the terminal CLK[4] from Time T251. Accordingly, the potential of the terminal CLK[1] becomes a high potential, and the potentials of the terminal CLK[2] to the terminal CLK[4] become a low potential in Time T251. In addition, the potentials of the terminal CLK[1] and the terminal CLK[2] become a high potential, and the potentials of the terminal CLK[3] and the terminal CLK[4] become a low potential in Time T252. In addition, the potentials of the terminal CLK[2] and the terminal CLK[3] become a high potential, and the potentials of the terminal CLK[1] and the terminal CLK[4] become a low potential in Time T253. Furthermore, the potentials of the terminal CLK[2] and the terminal CLK[3] become a high potential, and the potentials of the terminal CLK[1] and the terminal CLK[4] become a low potential in Time T254. In this case, the potentials of the terminal CLK[3] and the terminal CLK[4] become a high potential, and the potentials of the terminal CLK[1] and the terminal CLK[2] become a low potential in Time T260.

In a period from Time T251 to Time T252, signals are input to the terminal SE_PWC[1] and the terminal RS_PWC[1]. Here, in the period from Time T251 to Time T252, a high-potential signal is input to the terminal LINa[1], so that the signal input to the terminal SE_PWC [1] is output from the terminal SEa[1]. The signal input to the terminal RS_PWC [1] is output from the terminal RSa[1]. Furthermore, a clock signal input to the terminal CLK[1] is output from the terminal ROUTa[1]. Since the potential of the terminal CLK[1] in the period from Time T251 to Time T252 is a high potential, a high-potential signal is output from the terminal ROUTa[1]. Thus, a high-potential signal is input to the terminal LINa[2] electrically connected to the terminal ROUTa[1].

In a period from Time T252 to Time T253, signals are input to the terminal SE_PWC[2] and the terminal RS_PWC[2]. Here, in the period from Time T252 to Time T253, a high-potential signal is input to the terminal LINa[2], so that the signal input to the terminal SE_PWC[2] is output from the terminal SEa[1]. The signal input to the terminal RS_PWC[2] is output from the terminal RSa[2]. Furthermore, a clock signal input to the terminal CLK[2] is output from a terminal ROUTa[2]. Since the potential of the terminal CLK[2] in the period from Time T252 to Time T253 is a high potential, a high-potential signal is output from the terminal ROUTa[2]. Thus, a high-potential signal is input to a terminal LINa[3] electrically connected to the terminal ROUTa[2].

In a period from Time T254 to Time T260, signals are input to the terminal SE_PWC[3] and the terminal RS_PWC[3]. Here, in the period from Time T254 to Time T260, a high-potential signal is input to the terminal LINa[m−1], so that the signal input to the terminal SE_PWC [3] is output from the terminal SEa[m−1]. The signal input to the terminal RS_PWC[3] is output from the terminal RSa[m−1]. Furthermore, a clock signal input to the terminal CLK[3] is output from the terminal ROUTa[m−1]. Since the potential of the terminal CLK[3] in the period from Time T254 to Time T260 is a high potential, a high-potential signal is output from the terminal ROUTa[m−1]. Thus, a high-potential signal is input to the terminal LINa[m] electrically connected to the terminal ROUTa[m−1].

In a period from Time T260 to Time T261, signals are input to the terminal SE_PWC[4] and the terminal RS_PWC[4]. Here, in the period from Time T260 to Time T261, a high-potential signal is input to the terminal LINa[m], so that the signal input to the terminal SE_PWC [4] is output from the terminal SEa[m]. The signal input to the terminal RS_PWC[4] is output from the terminal RSa[m]. Furthermore, a clock signal input to the terminal CLK[4] is output from the terminal ROUTa[m].

As described above, the start pulse signal input to the terminal LINa[1] in Time T250 is sequentially transmitted to the register circuit Ra[1] to the register circuit Ra[m] in the period from Time T251 to Time T261. In response to that, high-potential signals are output sequentially from the terminal SEa[1] to the terminal SEa[m] and the terminal RSa[1] to the terminal RSa[m]. Thus, Time T251 to Time T261 correspond to Time T25 to Time T26 in FIG. 6.

In Time T260, a high-potential signal is input to the terminal LINb[1] as the start pulse signal. Changes in potentials of the terminal LINb[1] to a terminal LINb[m], the terminal CLK[1] to the terminal CLK[4], the terminal SE_PWC[1] to the terminal SE_PWC[4], the terminal RS_PWC[1] to the terminal RS_PWC[4], the terminal SEb[1] to the terminal SEb[m], and the terminal RSb[1] to the terminal RSb[m] in a period from Time T260 to Time T266 can be the same as changes in potentials of the terminal LINa[1] to the terminal LINa[m], the terminal CLK[1] to the terminal CLK[4], the terminal SE_PWC[1] to the terminal SE_PWC[4], the terminal RS_PWC[1] to the terminal RS_PWC[4], the terminal SEa[1] to the terminal SEa[m], and the terminal RSa[1] to the terminal RSa[m] in a period from Time T250 to Time T261.

As described above, the start pulse signal input to the terminal LINb[1] is sequentially transmitted to the register circuit Rb[1] to the register circuit Rb[m] in the period from Time T261 to Time T266. In response to that, high-potential signals are output sequentially from the terminal SEb[1] to the terminal SEb[m] and the terminal RSb[1] to the terminal RSb[m]. Thus, Time T261 to Time T266 correspond to Time T26 to Time T27 in FIG. 6.

Figure 11:
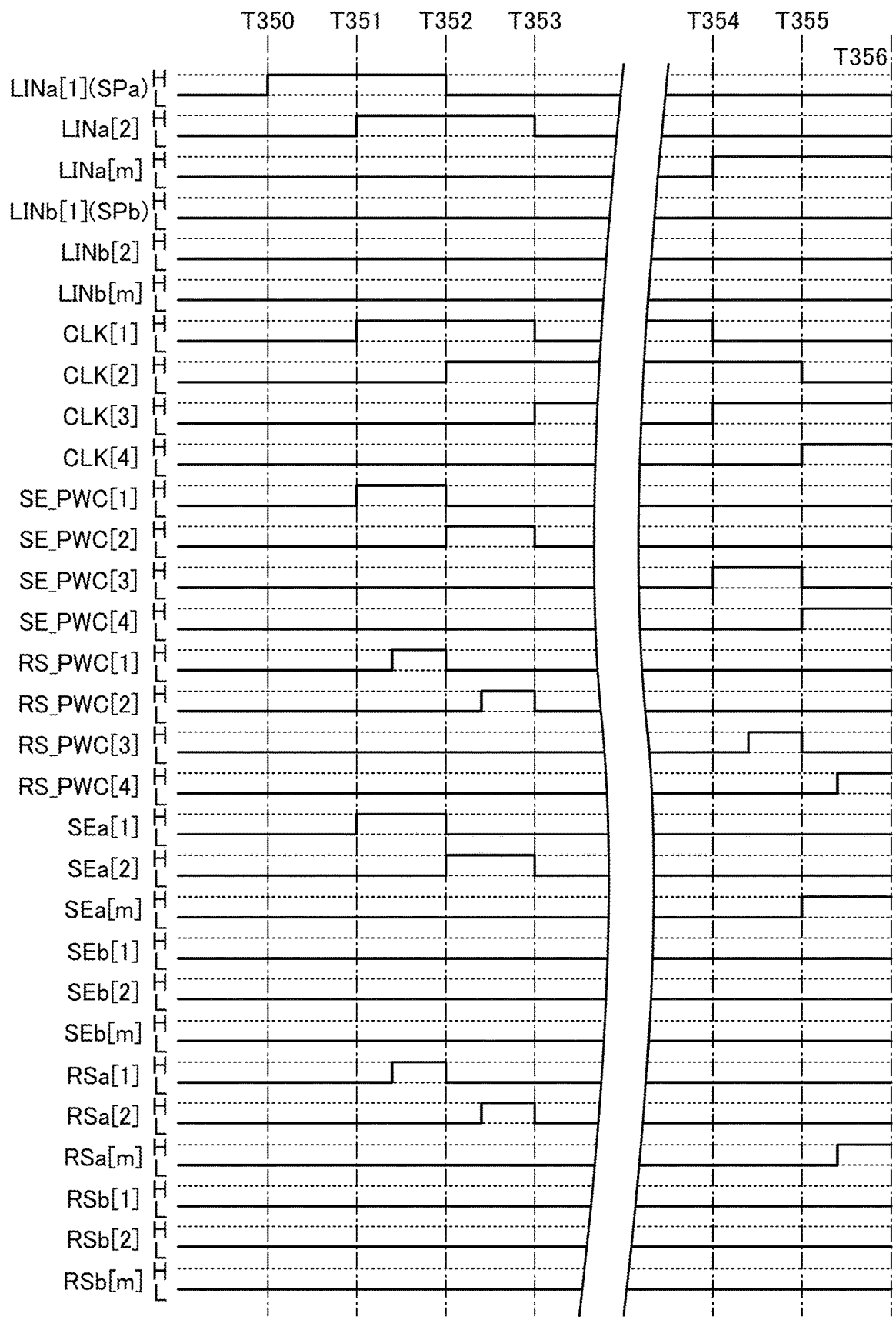
FIG. 11 is a timing chart showing an example of a method of driving a row driver circuit.

FIG. 11 is a timing chart showing an example of a method of driving the row driver circuit 14a and the row driver circuit 14b in the period from Time T35 to Time T36 shown in FIG. 6. In a period from Time T350 to Time T356 shown in FIG. 11, the start pulse signal is not input to the terminal LINb[1]. Except that, changes in potentials of the terminals in the period from Time T350 to Time T356 can be the same as the changes in potentials of the terminals in the period from Time T250 to Time T261 shown in FIG. 10.

As described above, the length from Time T35 to Time T36 shown in FIG. 6 is preferably longer than the length from Time T25 to Time T26. Thus, the length from Time T350 to Time T356 shown in FIG. 11 is preferably longer than the length from Time T250 to Time T261 shown in FIG. 10.

Structure Example of Reading Circuit

FIG. 12A is a block diagram illustrating a structure example of the reading circuit 15. Note that FIG. 12A also illustrates the column driver circuit 16 in order to show a connection relation between the reading circuit 15 and the column driver circuit 16.

The reading circuit 15 includes a shift register circuit 41, a switch circuit 42, a signal output circuit 43a, and a signal output circuit 43b.

The shift register circuit 41 is electrically connected to the switch circuit 42 through a terminal COUT<1> to a terminal COUT<p> (p is an integer greater than or equal to 2). The switch circuit 42 is electrically connected to the signal output circuit 43a through a terminal MUX_SEa<1> to a terminal MUX_SEa<p>, and is electrically connected to the signal output circuit 43b through a terminal MUX_SEb<1> to a terminal MUX_SEb<p>.

In this specification and the like, p terminals and the like are distinguished by reference numerals such as <1> and <p>. For example, in the case where <p:1> is added to a reference numeral representing a terminal, the reference numeral represents first to p-th terminals.

The switch circuit 42 is electrically connected to a terminal SW_SE<1> and a terminal SW_SE<2>. The signal output circuit 43a is electrically connected to a terminal WX[1] to a terminal WX[n/2] and terminals MUX_OUTa<1> to MUX_OUTa<n/2p>. The signal output circuit 43b is electrically connected to a terminal WX[n/2+1] to a terminal WX[n] and terminals MUX_OUTb<1> to MUX_OUTa<n/2p>.

Here, the terminal SW_SE<1> and the terminal SW_SE<2> are input terminals of the switch circuit 42. The terminal WX[1] to the terminal WX[n/2] are input terminals of the signal output circuit 43a, and the terminal MUX_OUTa<1> to the terminal MUX_OUTa<n/2p> are output terminals of the signal output circuit 43a. Furthermore, the terminal WX[n/2+1] to the terminal WX[n] are input terminals of the signal output circuit 43b, and the terminal MUX_OUTb<1> to a terminal MUX_OUTb<n/2p> are output terminals of the signal output circuit 43b.

The terminal COUT<1> to the terminal COUT<p> are output terminals for the shift register circuit 41 and input terminals for the switch circuit 42. The terminals MUX_SEa<1> to MUX_SEa<p> are output terminals for the switch circuit 42 and input terminals for the signal output circuit 43a. Furthermore, the terminals MUX_SEb<1> to MUX_SEb<p> are output terminals for the switch circuit 42, and input terminals for the signal output circuit 43b.

The shift register circuit 41 has a function of outputting a signal sequentially from the terminal COUT<1> to the terminal COUT<p>. The shift register circuit 41 can employ, for example, the structure of the row driver circuit 14 illustrated in FIG. 7 in such a manner that the terminal SE is replaced with the terminal COUT and the terminal RS is not provided.

The switch circuit 42 has a function of outputting a signal input from the terminal COUT<1> to the terminal COUT<p> to either the terminals MUX_SEa<1> to MUX_SEa<p> or the terminals MUX_SEb<1> to MUX_SEb<p>. Whether the terminals MUX_SEa<1> to MUX_SEa<p> or the terminals MUX_SEb<1> to MUX_SEb<p> the signal is output to can be determined on the basis of a signal input to the terminal SW_SE<1> and the terminal SW_SE<2>. For example, in the case where a high-potential signal is supplied to the terminal SW_SE<1> and a low-potential signal is supplied to the terminal SW_SE<2>, the switch circuit 42 can output signals input from the terminal COUT<1> to the terminal COUT<p> to the terminals MUX_SEa<1> to MUX_SEa<p>. In contrast, in the case where a low-potential signal is supplied to the terminal SW_SE<1> and a high-potential signal is supplied to the terminal SW_SE<2>, the switch circuit 42 can output signals input from the terminal COUT<1> to the terminal COUT<p>, to the terminals MUX_SEb<1> to MUX_SEb<p>.

The signal output circuit 43a has a function of outputting part of signals input from the terminal WX[1] to the terminal WX[n/2] from the terminal MUX_OUTa<1> to the terminal MUX_OUTa<n/2p>, on the basis of signals input from the terminal MUX_SEa<1> to the terminal MUX_SEa<p>. The signal output circuit 43b has a function of outputting part of signals input from the terminal WX[n/2+1] to the terminal WX[n] from the terminal MUX_OUTb<1> to the terminal MUX_OUTb<n/2p>, on the basis of signals input from the terminal MUX_SEb<1> to the terminal MUX_SEb<p>. Although details are described later, the signal output circuit 43a and the signal output circuit 43b can form a multiplexer circuit.

When the reading circuit 15 employs the structure illustrated in FIG. 12A, imaging data can be read out from either the pixels 30 in the first to n/2-th columns or the pixels 30 in the n/2+1 to n-th columns, on the basis of signals input to the switch circuit 42 from the terminal SW_SE<1> to the terminal SW_SE<2>. Thus, the display portion 11 can be divided not only in the row direction but also in the column direction. Specifically, the display portion 11 can be divided into two in the column direction.

Note that although two terminals SW_SE are electrically connected to the switch circuit 42 in the reading circuit 15 illustrated in FIG. 12A, three or more terminals SW_SE may be electrically connected to the switch circuit 42. For example, in the case where three terminals SW_SE are electrically connected to the switch circuit 42, the reading circuit 15 can include three signal output circuits 43 and the display portion 11 can be divided into three in the column direction.

FIG. 12B1 is a schematic diagram illustrating an example of operation of the display apparatus 10 in Step S2 in FIG. 5A or the like in the case where the reading circuit 15 has a structure illustrated in FIG. 12A. As illustrated in FIG. 12B1, the display portion 11 can be divided into two rows and two columns, for example. Here, the display portion 11 in the upper left is called a display portion 11aa, the display portion 11 in the upper right is called a display portion 11ab, the display portion 11 in the lower left is called a display portion 11ba, and the display portion 11 in the lower right is called a display portion 11bb. As illustrated in FIG. 12B1, in Step S2, scanning by the row driver circuit 14 is performed on all the pixels 30 provided in the display portion 11aa, the pixels 30 provided in the display portion 11ab, the pixels 30 provided in the display portion 11ba, and the pixels 30 provided in the display portion 11bb. In the example illustrated in FIG. 12B1, contact of the finger 31 with the display portion 11ab is detected in Step S2.

FIG. 12B2 is a schematic diagram illustrating an example of operation of the display apparatus 10 in Step S5 in the case where the reading circuit 15 has the structure illustrated in FIG. 12A. In the example illustrated in FIG. 12B2, the display portion 11ab with which the finger 31 is in contact is selected. In FIG. 12B2, the display portion 11ab is hatched and the display portion 11aa, the display portion 11ba, and the display portion 11bb are not hatched, which means that the display portion 11ab is selected. In the example illustrated in FIG. 12B2, for example, the start pulse signal is supplied to only the row driver circuit 14a, a low potential is supplied to the terminal SW_SE<1>, and a high potential is supplied to the terminal SW_SE<2>. Thus, only the imaging data ID2 acquired by the pixels 30 included in the display portion 11ab can be read out. Accordingly, power consumption of the display apparatus 10 can be reduced.

As described above, reading out the imaging data ID2 enables authentication such as fingerprint authentication. In the example illustrated in FIG. 12B2, the fingerprint 32 is detected, and authentication is performed by the display apparatus 10 on the basis of the fingerprint 32.

Figure 13:
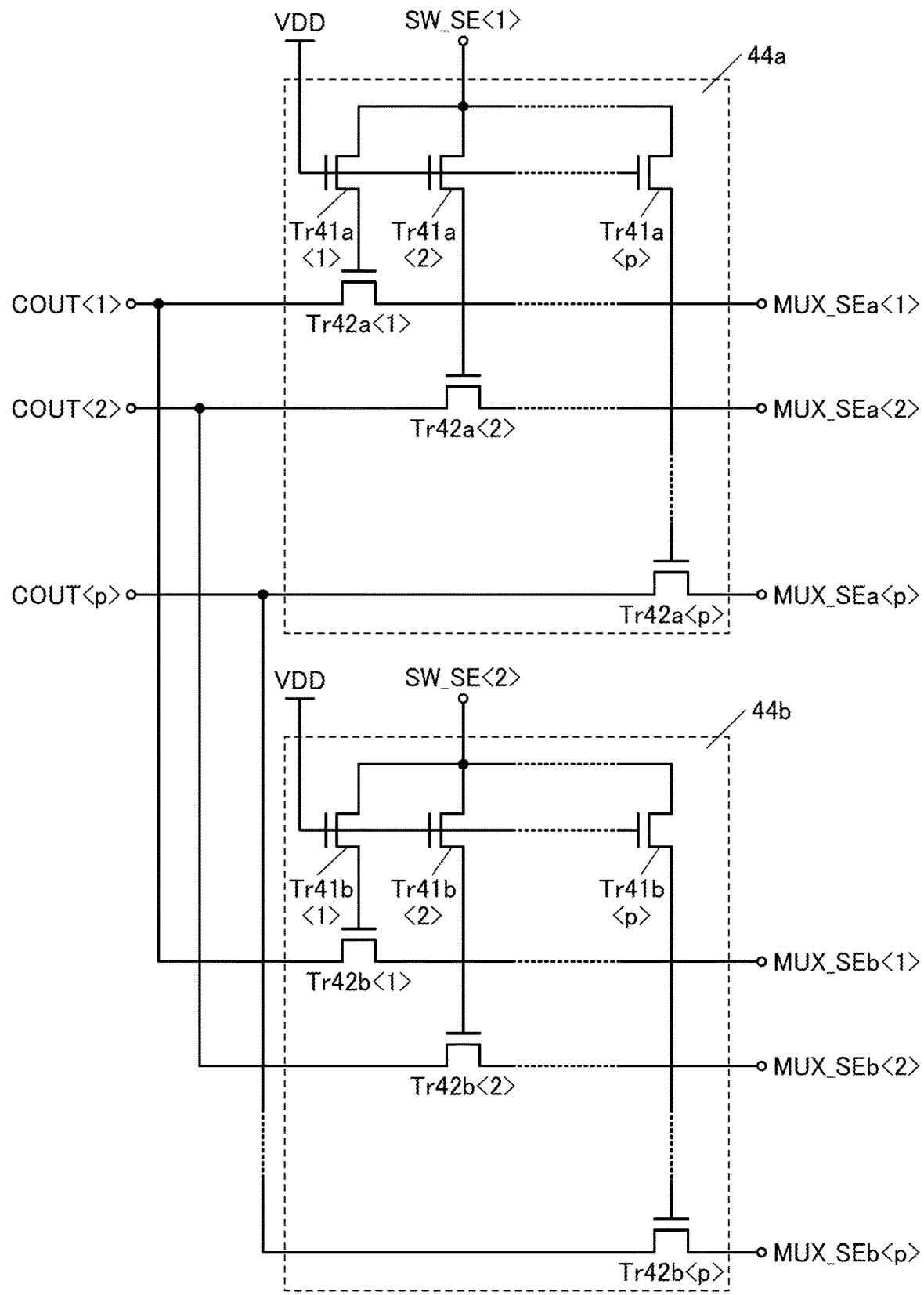
FIG. 13 is a circuit diagram illustrating a structure example of a reading circuit.

FIG. 13 is a circuit diagram illustrating a structure example of the switch circuit 42. As illustrated in FIG. 13, the switch circuit 42 includes a circuit 44a and a circuit 44b. The circuit 44a includes a transistor Tr41a<1> to a transistor Tr41a<p> and a transistor Tr42a<1> to a transistor Tr42a<p>. The circuit 44b includes a transistor Tr41b<1> to a transistor Tr41b<p> and a transistor Tr42b<1> to a transistor Tr42b<p>. Note that the switch circuit 42 does not necessarily include the transistor Tr41a<1> to the transistor Tr41a<p> and the transistor Tr41b<1> to the transistor Tr41b<p>.

The terminal SW_SE<1> is electrically connected to one of a source and a drain of each of the transistor Tr41a<1> to the transistor Tr41a<p>. Gates of the transistor Tr42a<1> to the transistor Tr42a<p> are electrically connected to the others of the sources and the drains of the transistor Tr41a<1> to the transistor Tr41a<p>, respectively. The terminal SW_SE<2> is electrically connected to one of a source and a drain of each of the transistor Tr41b<1> to the transistor Tr41b<p>. Gates of the transistor Tr42b<1> to the transistor Tr42b<p> are electrically connected to the others of the sources and the drains of the transistor Tr41b<1> to the transistor Tr41b<p>, respectively. Here, the potential VDD can be supplied to gates of the transistor Tr41a<1> to the transistor Tr41a<p> and gates of the transistor Tr41b<1> to the transistor Tr41b<p>.

To the terminal COUT<1> to the terminal COUT<p>, ones of sources and drains of the transistor Tr42a<1> to the transistor Tr42a<p> are electrically connected, respectively, and ones of sources and drains of the transistor Tr42b<1> to the transistor Tr42b<p> are electrically connected, respectively. The terminal MUX_SEa<1> to the terminal MUX_SEa<p> are electrically connected to the others of the sources and the drains of the transistor Tr42a<1> to the transistor Tr42a<p>, respectively. The terminal MUX_SEb<1> to the terminal MUX_SEb<p> are electrically connected to the others of the sources and the drains of the transistor Tr42b<1> to the transistor Tr42b<p>, respectively.

In the case where the switch circuit 42 has a structure illustrated in FIG. 13, when a high potential is supplied to the terminal SW_SE<1>, a high potential is supplied to the gates of the transistor Tr42a<1> to the transistor Tr42a<p>. As a result, the transistor Tr42a<1> to the transistor Tr42a<p> are turned on, and signals input to the switch circuit 42 from the terminal COUT<1> to the terminal COUT<p> are output from the terminal MUX_SEa<1> to the terminal MUX_SEa<p>. When a high potential is supplied to the terminal SW_SE<2>, a high potential is supplied to the gates of the transistor Tr42b<1> to the transistor Tr42b<p>. Thus, the transistor Tr42b<1> to the transistor Tr42b<p> are turned on, and signals input to the switch circuit 42 from the terminal COUT<1> to the terminal COUT<p> are output from the terminal MUX_SEb<1> to the terminal MUX_SEb<p>.

Note that in the case where three or more terminals SW_SE are electrically connected to the switch circuit 42, three or more circuits 44 are provided in the switch circuit 42. For example, in the case where three terminals SW_SE are electrically connected to the switch circuit 42, three circuits 44 can be provided in the switch circuit 42.

FIG. 14A1 is a block diagram illustrating a structure example of the signal output circuit 43a. The signal output circuit 43a includes a multiplexer circuit MUXa<1> to a multiplexer circuit MUXa<n/2p>.

The multiplexer circuits MUXa can each have a configuration including p selection signal input terminals, p input terminals, and one output terminal. The selection signal input terminals of the multiplexer circuit MUXa<1> to the multiplexer circuit MUXa<n/2p> can be the terminal MUX_SEa<1> to the terminal MUX_SEa<p>, respectively.

The input terminals of the multiplexer circuit MUXa can be p terminals WX. For example, input terminals of the multiplexer circuit MUXa<1> can be the terminal WX[1] to a terminal WX[p]. Input terminals of a multiplexer circuit MUXa<2> can be a terminal WX[p+1] to a terminal WX[2p]. Furthermore, input terminals of the multiplexer circuit MUXa<n/2p> can be a terminal WX[n/2−p+1] to the terminal WX[n/2].

An output terminal of the multiplexer circuit MUXa can be a terminal MUX_OUTa. For example, an output terminal of the multiplexer circuit MUXa<1> can be the terminal MUX_OUTa<1>. An output terminal of the multiplexer circuit MUXa<2> can be a terminal MUX_OUTa<2>. Furthermore, an output terminal of the multiplexer circuit MUXa<n/2p> can be the terminal MUX_OUTa<n/2p>.

FIG. 14A2 is a block diagram illustrating a structure example of the signal output circuit 43b. The signal output circuit 43b includes a multiplexer circuit MUXb<1> to a multiplexer circuit MUXb<n/2p>. The multiplexer circuit MUXb can have a structure similar to that of the multiplexer circuit MUXa.

The selection signal input terminals of the multiplexer circuit MUXb<1> to the multiplexer circuit MUXb<n/2p> can be the terminal MUX_SEb<1> to the terminal MUX_SEb<p>, respectively.

The input terminals of the multiplexer circuit MUXb can be p terminals WX. For example, input terminals of the multiplexer circuit MUXb<1> can be the terminal WX[n/2+1] to a terminal WX[n/2+p]. Input terminals of a multiplexer circuit MUXb<2> can be a terminal WX[n/2+p+1] to a terminal WX[n/2+2p]. Furthermore, input terminals of the multiplexer circuit MUXb<n/2p> can be a terminal WX[n−p+1] to the terminal WX[n], respectively.

An output terminal of the multiplexer circuit MUXb can be a terminal MUX_OUTb. For example, an output terminal of the multiplexer circuit MUXb<1> can be the terminal MUX_OUTb<1>. An output terminal of the multiplexer circuit MUXb<2> can be a terminal MUX_OUTb<2>. Furthermore, an output terminal of the multiplexer circuit MUXb<n/2p> can be the terminal MUX_OUTb<n/2p>.

FIG. 14B is a circuit diagram illustrating a structure example of the multiplexer circuit MUXa<1>. The multiplexer circuit MUXa<1> includes a transistor Tr43 [1] to a transistor Tr43 [p].

The terminal MUX_SEa<1> to the terminal MUX_SEa<p> are electrically connected to gates of the transistor Tr43 [1] to the transistor Tr43 [p], respectively. The terminal WX[1] to the terminal WX[p] are electrically connected to ones of sources and drains of the transistor Tr43[1] to the transistor Tr43 [p], respectively. The terminal MUX_OUTa<1> is electrically connected to the others of the sources and the drains of the transistor Tr43[1] to the transistor Tr43[p].

The multiplexer circuit MUXa<1> with the structure illustrated in FIG. 14B supplies a high potential to the terminal MUX_SEa<1> to the terminal MUX_SEa<p> sequentially, whereby signals input to the terminal WX[1] to the terminal WX[p] can be sequentially output from the terminal MUX_OUTa<1>.

Note that the multiplexer circuit MUXa<2> to the multiplexer circuit MUXa<n/2p> and the multiplexer circuit MUXb<1> to the multiplexer circuit MUXb<n/2p> can each have a structure similar to that of the multiplexer circuit MUXa<1> except that a terminal electrically connected to the multiplexer circuit is different.

Example of Authentication Method

Although an example in which fingerprint authentication is performed as authentication is described in the above description, one embodiment of the present invention is not limited to this. FIG. 15A to FIG. 15D are schematic diagrams illustrating examples in which an electronic device 50 performs authentication by a method other than fingerprint authentication. Here, the electronic device 50 includes the display portion 11. The electronic device 50 can be an information terminal device such as a smartphone or a tablet.

Figure 15A:
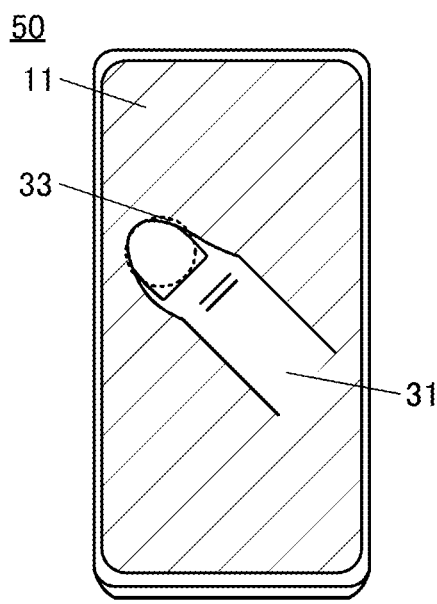
FIG. 15A to FIG. 15D are schematic diagrams illustrating examples of authentication.
Figure 15B:
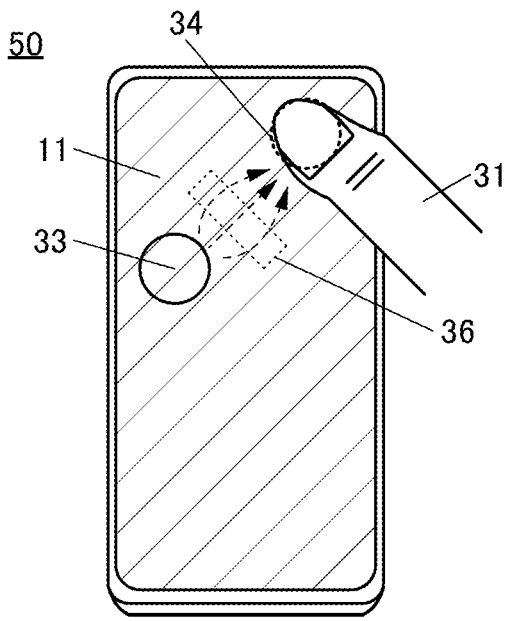

FIG. 15A illustrates a state in which the finger 31 is in contact with a point 33 on the display portion 11. FIG. 15B illustrates a state in which the finger 31 moves from the point 33 to a point 34. Here, a path 36 of the finger 31 from the point 33 to the point 34 varies between individuals as illustrated in FIG. 15B. Thus, the authentication can be performed using the path 36. For example, the electronic device 50 specifies the point 33 and the point 34 and makes the finger 31 move from the point 33 to the point 34, whereby the path 36 can be obtained. Note that, for example, the positions of the point 33 and the point 34 are not necessarily specified. In this case, for example, a point of the display portion 11 with which an object such as the finger 31 is in contact is called the point 33, and a point with which the object such as the finger 31 is in contact after a certain period of time has passed from the contact with the point 33 is called the point 34, whereby the electronic device 50 can obtain the path 36. Furthermore, the electronic device 50 may specify only one of the position of the point 33 and the position of the point 34.

Note that although the one finger 31 is in contact with the display portion 11 in FIG. 15A and FIG. 15B, two or more fingers 31 may be in contact with the display portion 11. In that case, two or more points 33 and two or more points 34 are provided in the display portion 11. For example, in the case where two fingers 31 are in contact with the display portion 11, two points 33 and two points 34 are provided in the display portion 11.

Figure 15C:
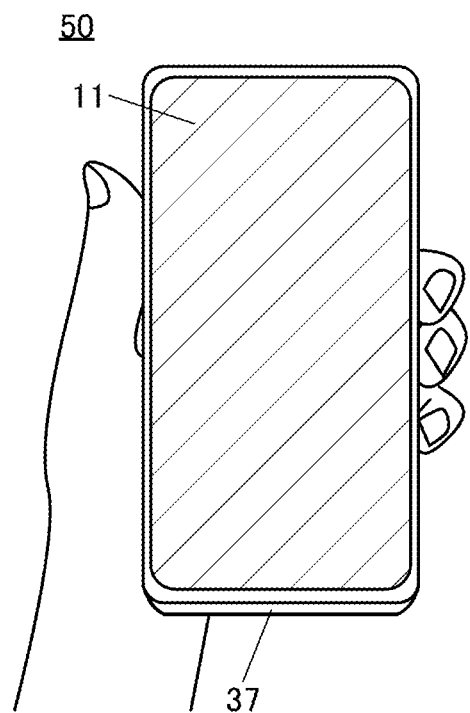
Figure 15D:
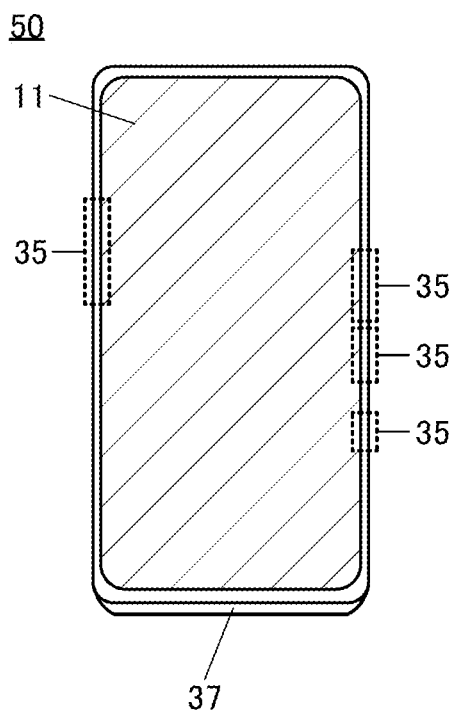

FIG. 15C illustrates a state in which a user of the electronic device 50 holds the electronic device 50. Here, the electronic device 50 includes a housing 37, and the user of the electronic device 50 can hold the housing 37. FIG. 15D illustrates a contact region 35 in the housing 37 when the user of the electronic device 50 holds the electronic device 50. The contact region 35 can be a region that the finger is in contact with, for example.

There are individual differences in the size of a human hand, the length of a finger, the way of holding things, and the like. Thus, the position, the range, and the like of the contact region 35 when the user holds the electronic device 50 vary between individuals. Accordingly, the electronic device 50 can perform authentication by using the contact region 35. For example, the electronic device 50 can perform authentication by using the position, the range, and the like of the contact region 35. In addition, in the case where a plurality of contact regions 35 which are apart from one another are included, the positional relation, the distance, and the like between the contact regions 35 can be used for the authentication.

Note that only a side surface of the electronic device 50 is regarded as the contact region 35 in FIG. 15D; however, for example, in the case where a hand of the user of the electronic device 50 is in contact with a rear surface of the electronic device 50, a region in the rear surface of the housing 37 with which the hand of the user is in contact may be regarded as the contact region 35 and used for authentication. Here, a surface of the electronic device 50 where the display portion 11 is provided is regarded as a front surface and a surface opposite to the surface where the display portion 11 is provided is regarded as a rear surface. Thus, the side surface and the rear surface of the electronic device 50 can be covered with the housing 37. Although not illustrated in FIG. 15C, FIG. 15D, and the like, an operation button or the like can be provided on the side surface of the electronic device 50, and the user who holds the electronic device 50 can operate the electronic device 50 by pressing the operation button.

Figure 16:
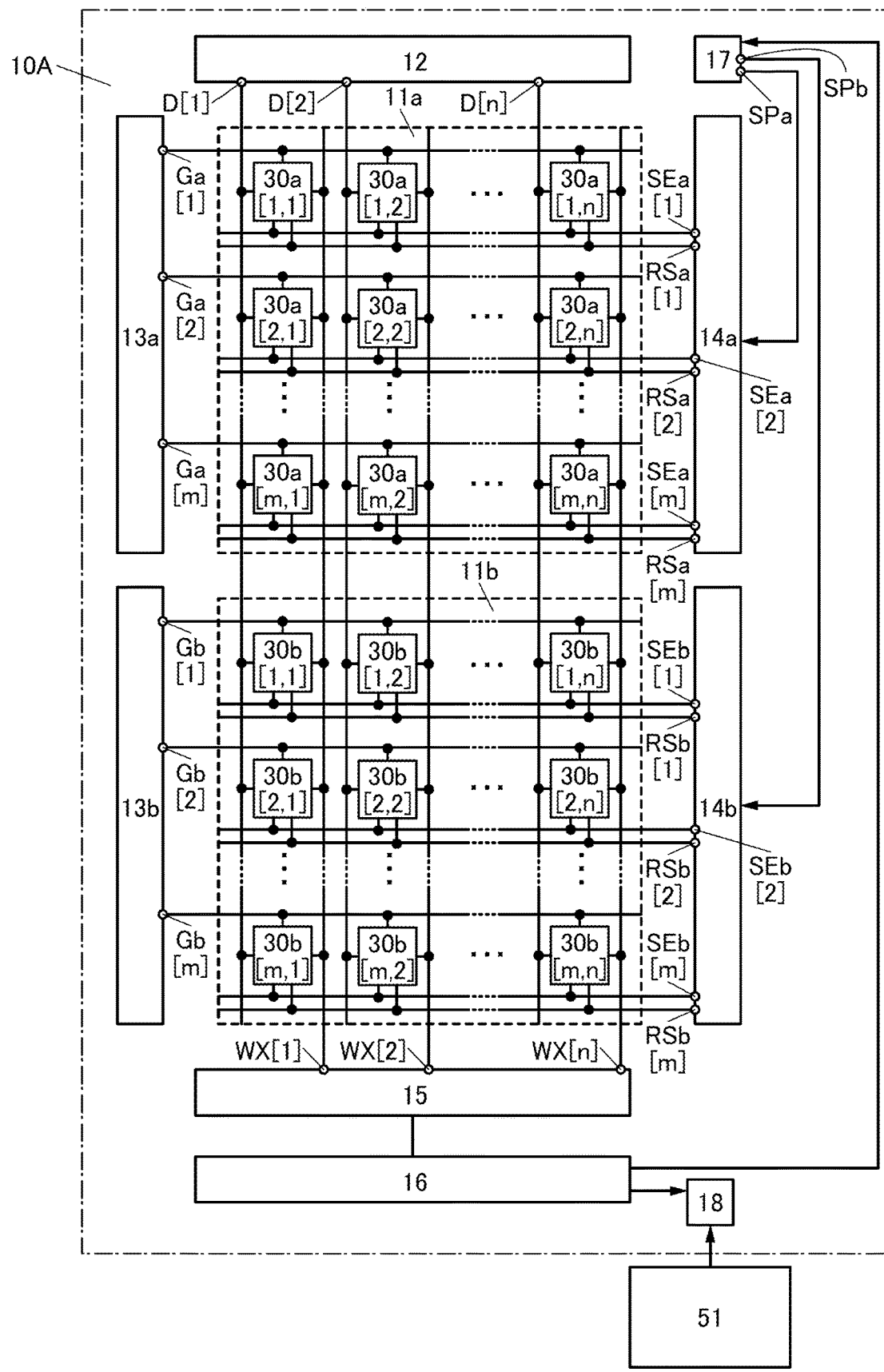
FIG. 16 is a block diagram illustrating a structure example of a display apparatus.

FIG. 16 is a block diagram illustrating a structure example of a display apparatus 10A, which is a display apparatus included in the electronic device 50. The display apparatus 10A includes a pixel, a circuit, and the like included in the display apparatus 10 illustrated in FIG. 1, and an arithmetic circuit 18. Furthermore, an arithmetic device 51 can be provided outside the display apparatus 10A. The arithmetic device 51 can be provided outside the electronic device 50. Note that the display apparatus 10A may have a structure including one display portion 11, one gate driver circuit 13, and one row driver circuit 14. That is, unlike the display apparatus 10 illustrated in FIG. 1, the display portion 11 is not necessarily divided.

The arithmetic circuit 18 has a function of performing authentication on the basis of, for example, the fingerprint 32, the path 36, the contact region 35, or the like. Specifically, the arithmetic circuit 18 has a function of determining whether the user of the electronic device 50 is a registered person on the basis of these information. Here, although the details are described later, the arithmetic circuit 18 has a function of performing authentication by using machine learning. Therefore, the arithmetic circuit 18 is a machine learning arithmetic circuit.

The arithmetic device 51 has a function of generating a machine learning model. The machine learning model generated by the arithmetic device 51 is supplied to the arithmetic circuit 18, and the arithmetic circuit 18 can perform arithmetic operation with the use of the machine learning model. As the machine learning model, a neural network model, a multilayer perceptron, a support vector machine, or the like can be used. In particular, a neural network model is preferably used, in which case authentication can be performed with high accuracy.

Here, the arithmetic device 51 is preferably provided in a device having a high arithmetic capacity such as a server. A machine learning model is generated by learning. Authentication using the machine learning model is performed by inference. The amount of arithmetic operation necessary for the learning is larger than the amount of arithmetic operation necessary for the inference. Accordingly, in the case where a machine learning model is generated by the arithmetic device 51 which is provided outside the display apparatus 10A and has a high arithmetic capacity, a load of the arithmetic circuit 18 can be small as compared with the case where a machine learning model is generated by the arithmetic circuit 18. Note that in the case where the arithmetic circuit 18 has an adequate high arithmetic capacity, the arithmetic circuit 18 may generate a machine learning model.

Figure 17A:
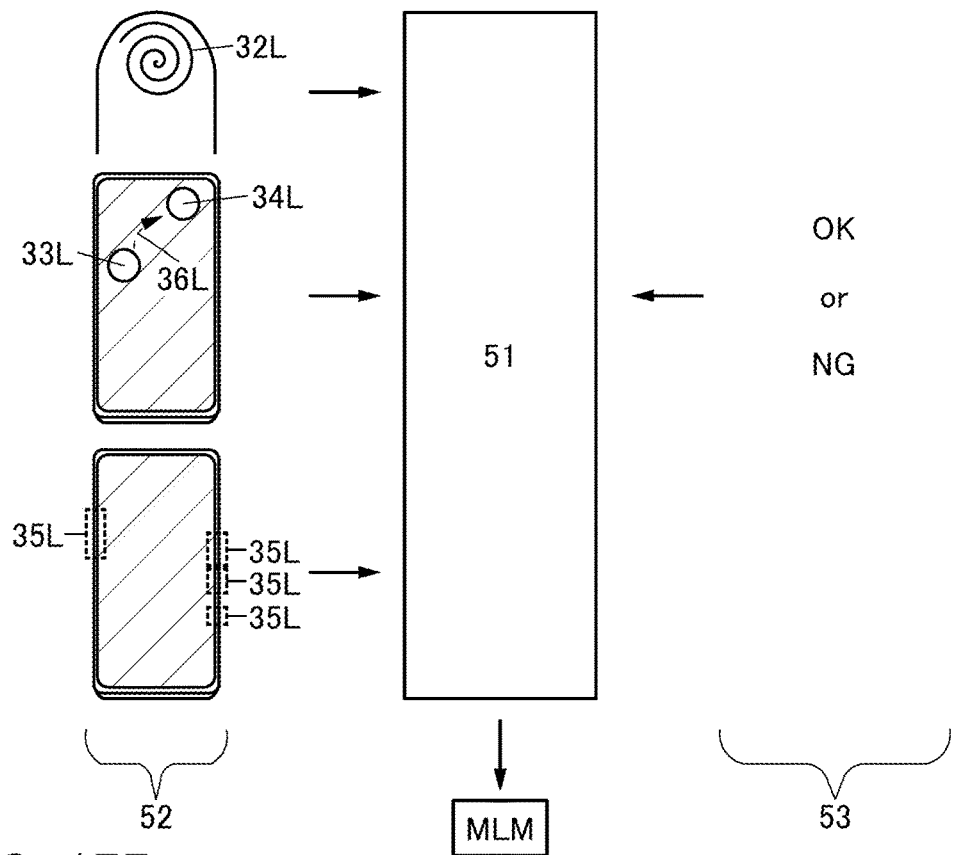
FIG. 17A and FIG. 17B are schematic diagrams illustrating examples of a method of driving a display apparatus.

FIG. 17A is a schematic diagram illustrating generation of a machine learning model MLM by the arithmetic device 51, that is, learning. The learning can be, for example, supervised learning.

For example, at least one of a fingerprint 32L, a path 36L of a finger or the like from a point 33L to a point 34L, and a contact region 35L is regarded as learning data 52. A correct label 53 is whether it is the user of the electronic device 50 where the display apparatus 10A is provided or not (OK or NG). The arithmetic device 51 performs learning by tying the correct label 53 to the learning data 52, whereby the machine learning model MLM can be generated. The machine learning model MLM includes information on a weight coefficient, for example.

Figure 17B:
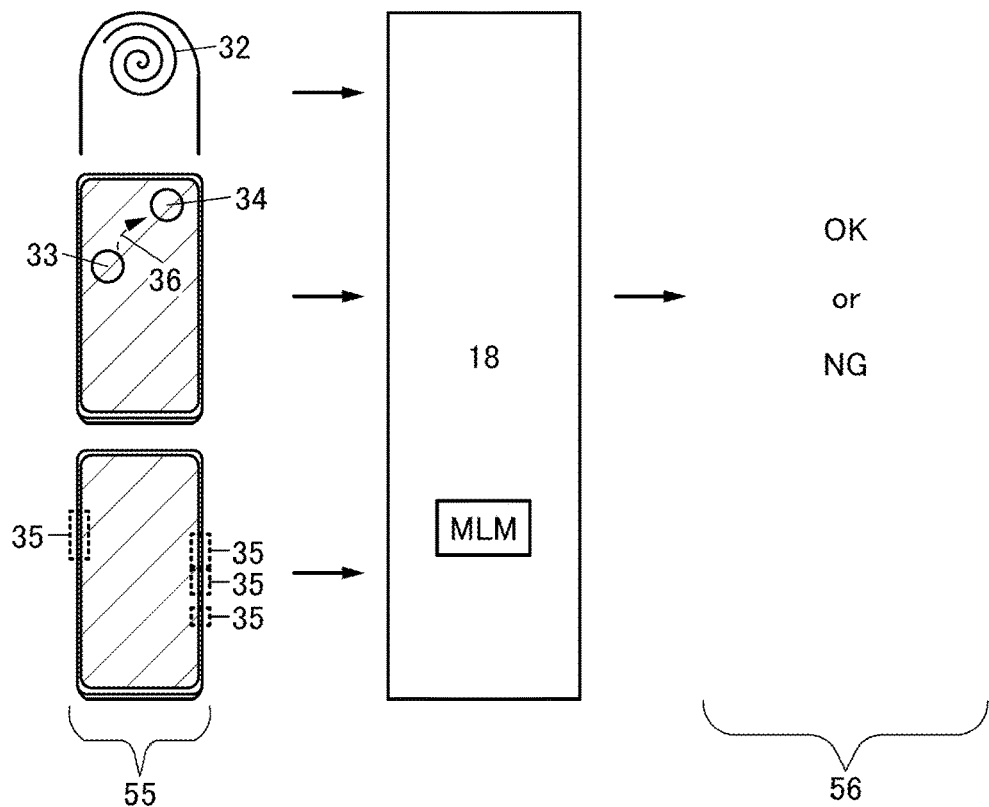

FIG. 17B is a schematic diagram illustrating authentication using the machine learning model MLM by the arithmetic circuit 18, that is, inference. At least one of the fingerprint 32, the path 36 of the finger or the like from the point 33 to the point 34, and the contact region 35 is input as input data 55 to the arithmetic circuit 18 where the machine learning model MLM is constructed. Thus, authentication of the user of the electronic device 50 can be conducted by inference using the machine learning model MLM. The arithmetic circuit 18 outputs output data 56 showing the results of user authentication.

The above is an example of the method of authentication using machine learning. Authentication is conducted by machine learning on the basis of not only the fingerprint 32 but also the path 36 or the contact region 35; accordingly, the authentication can be conducted with high accuracy. For this reason, even when imaging data used for detecting the fingerprint 32 is read out in a short time, the display apparatus 10A can perform authentication with high accuracy. For example, in the case where the display apparatus 10A is driven by the method shown in FIG. 5A, the display apparatus 10A can perform authentication with high accuracy even when the imaging data ID2 is read out in a short time.

At least part of the structure examples, the drawings corresponding thereto, and the like shown in this embodiment as examples can be combined with the other structure examples, the other drawings, and the like as appropriate.

At least part of this embodiment can be implemented in combination with the other embodiments described in this specification as appropriate.

Embodiment 2

In this embodiment, display apparatuses of embodiments of the present invention will be described.

Structure Example 2-1 of Display Apparatus

Figure 18A:
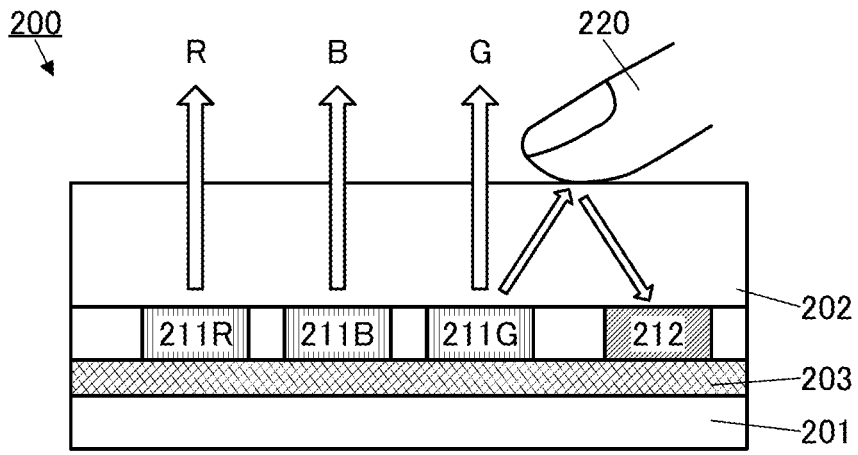
FIG. 18A, FIG. 18B, and FIG. 18D are cross-sectional diagrams illustrating a structure example of a display apparatus.

FIG. 18A is a schematic view of a display apparatus 200. The display apparatus 200 includes a substrate 201, a substrate 202, a light-receiving element 212, a light-emitting element 211R, a light-emitting element 211G, a light-emitting element 211B, a functional layer 203, and the like.

The light-emitting element 211R, the light-emitting element 211G, the light-emitting element 211B, the light-receiving element 212 are provided between the substrate 201 and the substrate 202. The light-emitting element 211R, the light-emitting element 211G, and the light-emitting element 211B emit red (R) light, green (G) light, and blue (B) light, respectively. Note that in the following description, the term "light-emitting element 211" may be used when the light-emitting element 211R, the light-emitting element 211G, and the light-emitting element 211B are not distinguished from each other.

The display apparatus 200 includes a plurality of pixels arranged in a matrix. One pixel includes one or more subpixels. One subpixel includes one light-emitting element. For example, the pixel can have a structure including three subpixels (e.g., three colors of R, G, and B or three colors of yellow (Y), cyan (C), and magenta (M)) or four subpixels (e.g., four colors of R, G, B, and white (W) or four colors of R, G, B, and Y). The pixel further includes the light-receiving element 212. The light-receiving element 212 may be provided in all the pixels or may be provided in some of the pixels. In addition, one pixel may include a plurality of light-receiving elements 212.

FIG. 18A illustrates a finger 220 touching a surface of the substrate 202. Part of light emitted by the light-emitting element 211G is reflected at a contact portion of the substrate 202 and the finger 220. In the case where part of the reflected light is incident on the light-receiving element 212, the contact of the finger 220 with the substrate 202 can be detected. That is, the display apparatus 200 can function as a touch panel.

The functional layer 203 includes a circuit for driving the light-emitting element 211R, the light-emitting element 211G, and the light-emitting element 211B and a circuit for driving the light-receiving element 212. The functional layer 203 is provided with a switch, a transistor, a capacitor, a wiring, and the like. Note that in the case where the light-emitting element 211R, the light-emitting element 211G, the light-emitting element 211B, and the light-receiving element 212 are driven by a passive-matrix method, a structure not provided with a switch, or a transistor may be employed.

Figure 18B:
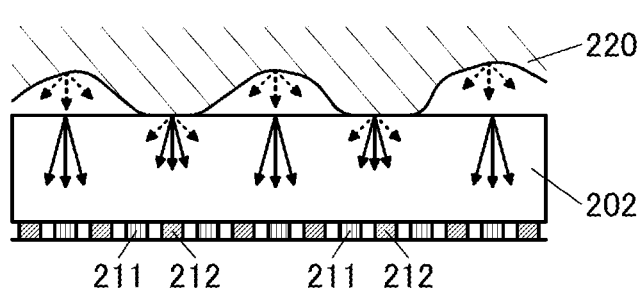

The display apparatus 200 preferably has a function of detecting a fingerprint of the finger 220. FIG. 18B schematically illustrates an enlarged view of the contact portion in a state where the finger 220 touches the substrate 202. FIG. 18B illustrates light-emitting elements 211 and the light-receiving elements 212 that are alternately arranged.

The fingerprint of the finger 220 is formed of depressions and projections. Therefore, as illustrated in FIG. 18B, the projections of the fingerprint touch the substrate 202.

Reflection of light from a surface or an interface is categorized into regular reflection and diffuse reflection. Regularly reflected light is highly directional light with an angle of reflection equal to the angle of incidence. Diffusely reflected light has low directionality and low angular dependence of intensity. As for regular reflection and diffuse reflection, diffuse reflection components are dominant in the light reflected from the surface of the finger 220. Meanwhile, regular reflection components are dominant in the light reflected from the interface between the substrate 202 and the air.

The intensity of light that is reflected from contact surfaces or non-contact surfaces between the finger 220 and the substrate 202 and is incident on the light-receiving elements 212 positioned directly below the contact surfaces or the non-contact surfaces is the sum of intensities of regularly reflected light and diffusely reflected light. As described above, regularly reflected light (indicated by solid arrows) is dominant near the depressions of the finger 220, where the finger 220 is not in contact with the substrate 202; whereas diffusely reflected light (indicated by dashed arrows) from the finger 220 is dominant near the projections of the finger 220, where the finger 220 is in contact with the substrate 202. Thus, the intensity of light received by the light-receiving element 212 positioned directly below the depression is higher than the intensity of light received by the light-receiving element 212 positioned directly below the projection. Accordingly, a fingerprint image of the finger 220 can be captured.

In the case where an arrangement interval between the light-receiving elements 212 is smaller than a distance between two projections of a fingerprint, preferably a distance between a depression and a projection adjacent to each other, a clear fingerprint image can be obtained. The distance between a depression and a projection of a human's fingerprint is generally within a range from 150 µm to 250 µm; thus, the arrangement interval between the light-receiving elements 212 is, for example, less than or equal to 400 µm, preferably less than or equal to 200 µm, further preferably less than or equal to 150 µm, still further preferably less than or equal to 120 µm, yet still further preferably less than or equal to 100 µm, even yet still further preferably less than or equal to 50 µm. The arrangement interval is preferably as small as possible, and can be greater than or equal to 1 µm, greater than or equal to 10 µm, or greater than or equal to 20 µm, for example.

Figure 18C:
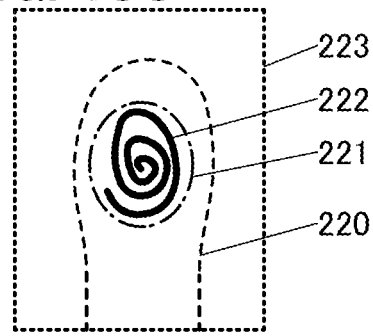
FIG. 18C and FIG. 18E are diagrams each illustrating an example of an image captured by a display apparatus.

FIG. 18C illustrates an example of a fingerprint image captured by the display apparatus 200. In an image-capturing range 223 in FIG. 18C, the outline of the finger 220 is indicated by a dashed line and the outline of a contact portion 221 is indicated by a dashed-dotted line. In the contact portion 221, a high-contrast image of a fingerprint 222 can be captured owing to a difference in the amount of light incident on the light-receiving elements 212.

Figure 18D:
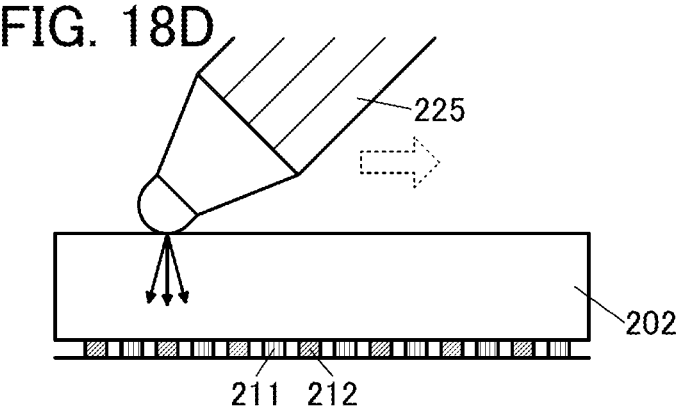

The display apparatus 200 can also function as a touch panel or a pen tablet. FIG. 18D illustrates a state where a tip of a stylus 225 slides in a direction indicated with a dashed arrow while the tip of the stylus 225 touches the substrate 202.

As illustrated in FIG. 18D, when diffusely reflected light that is diffused at the contact surface of the tip of the stylus 225 and the substrate 202 is incident on the light-receiving element 212 that overlaps with the contact surface, the position of the tip of the stylus 225 can be detected with high accuracy.

Figure 18E:
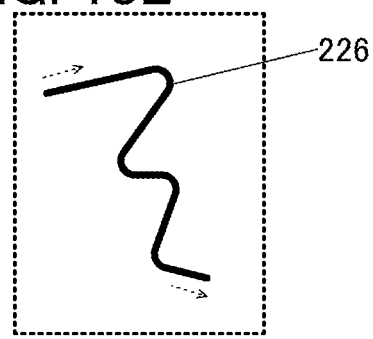

FIG. 18E illustrates an example of a path 226 of the stylus 225 that is detected by the display apparatus 200. The display apparatus 200 can detect the position of a detection target, such as the stylus 225, with high position accuracy, so that high-definition drawing can be performed using a drawing application or the like. Unlike the case of using a capacitive touch sensor, an electromagnetic induction touch pen, or the like, the display apparatus 200 can detect even the position of a highly insulating object to be detected, the material of a tip portion of the stylus 225 is not limited, and a variety of writing materials (e.g., a brush, a glass pen, a quill pen, and the like) can be used.

Figure 18F:
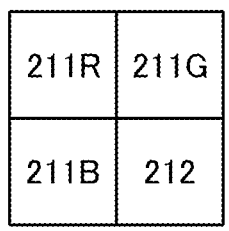
FIG. 18F to FIG. 18H are top views illustrating structure examples of a pixel.
Figure 18G:
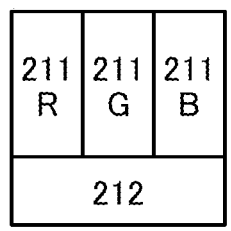
Figure 18H:
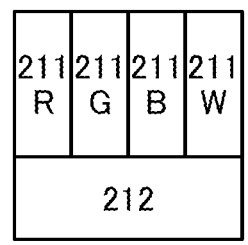

Here, FIG. 18F to FIG. 18H illustrate examples of a pixel that can be used in the display apparatus 200.

The pixels illustrated in FIG. 18F and FIG. 18G each include the light-emitting element 211R for red (R), the light-emitting element 211G for green (G), the light-emitting element 211B for blue (B), and the light-receiving element 212. The pixels each include a pixel circuit for driving the light-emitting element 211R, the light-emitting element 211G, the light-emitting element 211B, and the light-receiving element 212.

FIG. 18F illustrates an example in which three light-emitting elements and one light-receiving element are provided in a matrix of 2×2. FIG. 18G illustrates an example in which three light-emitting elements are arranged in one line and one laterally long light-receiving element 212 is provided below the three light-emitting elements.

The pixel illustrated in FIG. 18H is an example including a light-emitting element 211W for white (W). Here, four light-emitting elements are arranged in one line and the light-receiving element 212 is provided below the four light-emitting elements.

Note that the pixel structure is not limited to the above structure, and a variety of arrangement methods can be employed.

An example of a structure including light-emitting elements emitting visible light, a light-emitting element emitting infrared light, and a light-receiving element is described below.

Figure 19A:
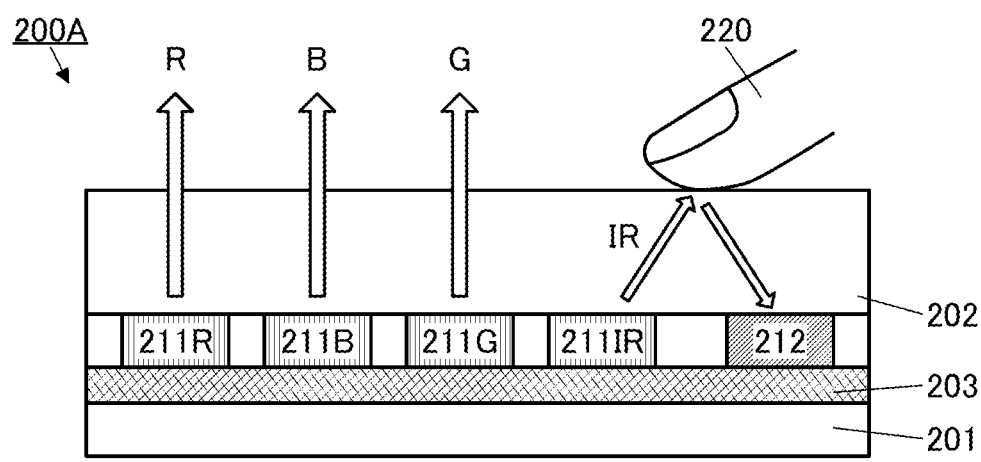
FIG. 19A is a cross-sectional diagram illustrating a structure example of a display apparatus.

A display apparatus 200A illustrated in FIG. 19A includes a light-emitting element 211IR in addition to the components illustrated in FIG. 18A as an example. The light-emitting element 211IR is a light-emitting element emitting infrared light IR. Moreover, in that case, an element capable of receiving at least the infrared light IR emitted by the light-emitting element 211IR is preferably used as the light-receiving element 212. As the light-receiving element 212, an element capable of receiving visible light and infrared light is further preferably used.

As illustrated in FIG. 19A, when the finger 220 touches the substrate 202, the infrared light IR emitted from the light-emitting element 211IR is reflected by the finger 220 and part of reflected light is incident on the light-receiving element 212, so that the display apparatus 200A can obtain the positional information of the finger 220.

Figure 19B:
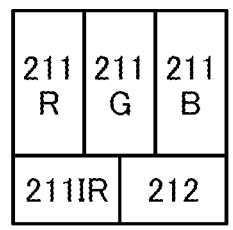
FIG. 19B to FIG. 19D are top views illustrating structure examples of a pixel.
Figure 19C:
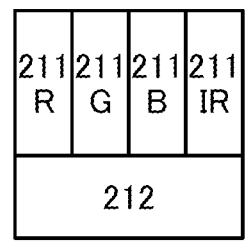
Figure 19D:
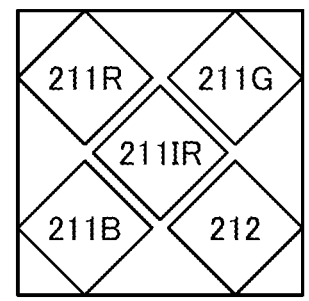

FIG. 19B to FIG. 19D illustrate examples of a pixel that can be used in the display apparatus 200A.

FIG. 19B illustrates an example in which three light-emitting elements are arranged in one line and the light-emitting element 211IR and the light-receiving element 212 are arranged below the three light-emitting elements in a horizontal direction. FIG. 19C illustrates an example in which four light-emitting elements including the light-emitting element 211IR are arranged in one line and the light-receiving element 212 is provided below the four light-emitting elements.

FIG. 19D shows an example in which three light-emitting elements and the light-receiving element 212 are arranged in all directions with the light-emitting element 211IR as the center.

Note that in the pixels illustrated in FIG. 19B to FIG. 19D, the positions of the light-emitting elements can be interchangeable, or the positions of the light-emitting element and the light-receiving element can be interchangeable.

An example of a structure including a light-emitting element emitting visible light and a light-emitting and light-receiving element emitting and receiving visible light is described below.

A display apparatus 200B illustrated in FIG. 20A includes the light-emitting element 211B, the light-emitting element 211G, and a light-emitting and light-receiving element 213R. The light-emitting and light-receiving element 213R has a function of a light-emitting element that emits red (R) light, and a function of a photoelectric conversion element that receives visible light. FIG. 20A illustrates an example in which the light-emitting and light-receiving element 213R receives green (G) light emitted by the light-emitting element 211G. Note that the light-emitting and light-receiving element 213R may receive blue (B) light emitted by the light-emitting element 211B. Alternatively, the light-emitting and light-receiving element 213R may receive both green light and blue light.

For example, the light-emitting and light-receiving element 213R preferably receives light having a shorter wavelength than light emitted from itself. Alternatively, the light-emitting and light-receiving element 213R may receive light (e.g., infrared light) having a longer wavelength than light emitted from itself. The light-emitting and light-receiving element 213R may receive light having approximately the same wavelength as light emitted from itself; however, in that case, the light-emitting and light-receiving element 213R also receives light emitted from itself, whereby its emission efficiency might be decreased. Therefore, the peak of the emission spectrum and the peak of the absorption spectrum of the light-emitting and light-receiving element 213R preferably overlap as little as possible.

Here, light emitted by the light-emitting and light-receiving element is not limited to red light. Furthermore, the light emitted by the light-emitting elements is not limited to the combination of green light and blue light. For example, the light-emitting and light-receiving element can be an element that emits green or blue light and receives light having a different wavelength from light emitted from itself.

The light-emitting and light-receiving element 213R serves as both a light-emitting element and a light-receiving element as described above, whereby the number of elements provided in one pixel can be reduced. Thus, higher definition, a higher aperture ratio, higher resolution, and the like can be easily achieved.

FIG. 20B to FIG. 20I illustrate examples of a pixel that can be used in the display apparatus 200B.

FIG. 20B illustrates an example in which the light-emitting and light-receiving element 213R, the light-emitting element 211G, and the light-emitting element 211B are arranged in one column. FIG. 20C illustrates an example in which the light-emitting element 211G and the light-emitting element 211B are alternately arranged in the vertical direction and the light-emitting and light-receiving element 213R is provided alongside the light-emitting elements.

FIG. 20D illustrates an example in which three light-emitting elements (the light-emitting element 211G, the light-emitting element 211B, and a light-emitting element 211X) and one light-emitting and light-receiving element are arranged in matrix of 2×2. The light-emitting element 211X is an element that emits light of a color other than R, G, and B. The light of a color other than R, G, and B can be white (W) light, yellow (Y) light, cyan (C) light, magenta (M) light, infrared light (IR), ultraviolet light (UV), or the like. In the case where the light-emitting element 211X emits infrared light, the light-emitting and light-receiving element preferably has a function of detecting infrared light or a function of detecting both visible light and infrared light. The wavelength of light detected by the light-emitting and light-receiving element can be determined depending on the application of a sensor.

FIG. 20E illustrates two pixels. A region that includes three elements and is enclosed by a dotted line corresponds to one pixel. Each of the pixels includes the light-emitting element 211G, the light-emitting element 211B, and the light-emitting and light-receiving element 213R. In the left pixel in FIG. 20E, the light-emitting element 211G is provided in the same row as the light-emitting and light-receiving element 213R, and the light-emitting element 211B is provided in the same column as the light-emitting and light-receiving element 213R. In the right pixel in FIG. 20E, the light-emitting element 211G is provided in the same row as the light-emitting and light-receiving element 213R, and the light-emitting element 211B is provided in the same column as the light-emitting element 211G. In the pixel layout in FIG. 20E, the light-emitting and light-receiving element 213R, the light-emitting element 211G, and the light-emitting element 211B are repeatedly arranged in both the odd-numbered row and the even-numbered row, and in each column, the light-emitting elements or the light-emitting element and the light-emitting and the receiving elements arranged in the odd-numbered row and the even-numbered row emit light of different colors.

FIG. 20F illustrates four pixels which employ PenTile arrangement; adjacent two pixels have different combinations of light-emitting elements or light-emitting and light-receiving elements that emit light of two different colors. FIG. 20F illustrates the top-surface shapes of the light-emitting elements or light-emitting and light-receiving elements.

The upper left pixel and the lower right pixel in FIG. 20F each include the light-emitting and light-receiving element 213R and the light-emitting element 211G. The upper right pixel and the lower left pixel each include the light-emitting element 211G and the light-emitting element 211B. That is, in the example illustrated in FIG. 20F, the light-emitting element 211G is provided in each pixel.

The top surface shape of the light-emitting elements and the light-emitting and light-receiving elements is not particularly limited and can be a circular shape, an elliptical shape, a polygonal shape, a polygonal shape with rounded corners, or the like. FIG. 20F and the like illustrate examples in which the top surface shapes of the light-emitting elements and the light-emitting and light-receiving elements are each a square tilted at approximately 45° (a diamond shape). Note that the top surface shape of the light-emitting elements and the light-emitting and light-receiving elements may vary depending on the color thereof, or the light-emitting elements and the light-emitting and light-receiving elements of some colors or every color may have the same top surface shape.

The sizes of light-emitting regions (or light-emitting and light-receiving regions) of the light-emitting elements and the light-emitting and light-receiving elements may vary depending on the color thereof, or the light-emitting elements and the light-emitting and light-receiving elements of some colors or every color may have light-emitting regions of the same size. For example, in FIG. 20F, the light-emitting region of the light-emitting element 211G provided in each pixel may have a smaller area than the light-emitting region (or the light-emitting and light-receiving region) of the other elements.

FIG. 20G is a modification example of the pixel arrangement of FIG. 20F. Specifically, the structure of FIG. 20G is obtained by rotating the structure of FIG. 20F by 45°. Although one pixel is regarded as including two elements in FIG. 20F, one pixel can be regarded as being formed of four elements as shown in FIG. 20G.

FIG. 20H is a modification example of the pixel arrangement of FIG. 20F. The upper left pixel and the lower right pixel in FIG. 20H each include the light-emitting and light-receiving element 213R and the light-emitting element 211G. The upper right pixel and the lower left pixel each include the light-emitting and light-receiving element 213R and the light-emitting element 211B. That is, in the example illustrated in FIG. 20H, the light-emitting and light-receiving element 213R is provided in each pixel. The structure illustrated in FIG. 20H achieves higher-resolution image capturing than the structure illustrated in FIG. 20F because of having the light-emitting and light-receiving element 213R in each pixel. Thus, the accuracy of authentication can be increased, for example.

FIG. 20I shows a modification example of the pixel arrangement in FIG. 20H, obtained by rotating the pixel arrangement in FIG. 20H by 45°.

In FIG. 20I, one pixel is described as being formed of four elements (two light-emitting elements and two light-emitting and light-receiving elements). One pixel including a plurality of light-emitting and light-receiving elements having a light-receiving function allows high-resolution image capturing. Accordingly, the accuracy of biometric authentication can be increased. For example, the resolution of image capturing can be the square root of 2 times the resolution of display.

A display apparatus that employs the structure shown in FIG. 20H or FIG. 20I includes p (p is an integer greater than or equal to 2) first light-emitting elements, q (q is an integer greater than or equal to 2) second light-emitting elements, and r (r is an integer greater than p and q) light-emitting and light-receiving elements. As for p and r, r=2p is satisfied. As for p, q, and r, r=p+q is satisfied. Either the first light-emitting elements or the second light-emitting elements emit green light, and the other light-emitting elements emit blue light. The light-emitting and light-receiving elements emit red light and have a light-receiving function.

In the case where touch operation is detected with the light-emitting and light-receiving elements, for example, it is preferable that light emitted from a light source be hard for a user to recognize. Since blue light has lower visibility than green light, light-emitting elements that emit blue light are preferably used as a light source. Accordingly, the light-emitting and light-receiving elements preferably have a function of receiving blue light. Note that without limitation to the above, light-emitting elements used as a light source can be selected as appropriate depending on the sensitivity of the light-emitting and light-receiving elements.

As described above, the display apparatus of this embodiment can employ any of various types of pixel arrangements.

<Device Structure>

Next, detailed structure examples of the light-emitting element, the light-receiving element, and the light-emitting and light-receiving element which can be used in the display apparatus of one embodiment of the present invention are described.

The display apparatus of one embodiment of the present invention can have any of the following structures: a top-emission structure in which light is emitted in a direction opposite to the substrate where the light-emitting elements are formed, a bottom-emission structure in which light is emitted toward the substrate where the light-emitting elements are formed, and a dual-emission structure in which light is emitted toward both surfaces.

In this embodiment, a top-emission display apparatus is described as an example.

In this specification and the like, unless otherwise specified, in describing a structure including a plurality of components (e.g., light-emitting elements or light-emitting layers), alphabets are not added when a common part for the components is described. For example, when a common part of a light-emitting layer 283R, a light-emitting layer 283G, and the like is described, the light-emitting layers are simply referred to as a light-emitting layer 283, in some cases.

Figure 21A:
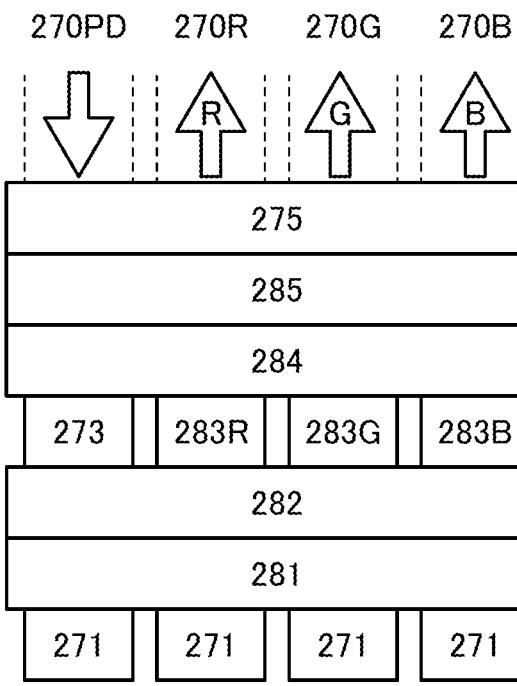
FIG. 21A and FIG. 21B are diagrams each illustrating a structure example of a display apparatus.

A display apparatus 280A illustrated in FIG. 21A includes a light-receiving element 270PD, a light-emitting element 270R that emits red (R) light, a light-emitting element 270G that emits green (G) light, and a light-emitting element 270B that emits blue (B) light.

Each of the light-emitting elements includes a pixel electrode 271, a hole-injection layer 281, a hole-transport layer 282, the light-emitting layer 283, an electron-transport layer 284, an electron-injection layer 285, and a common electrode 275, which are stacked in this order. The light-emitting element 270R includes the light-emitting layer 283R, the light-emitting element 270G includes the light-emitting layer 283G, and the light-emitting element 270B includes a light-emitting layer 283B. The light-emitting layer 283R includes a light-emitting substance that emits red light, the light-emitting layer 283G includes a light-emitting substance that emits green light, and the light-emitting layer 283B includes a light-emitting substance that emits blue light.

The light-emitting elements are electroluminescent elements that emit light to the common electrode 275 side by voltage application between the pixel electrodes 271 and the common electrode 275.

The light-receiving element 270PD includes the pixel electrode 271, the hole-injection layer 281, the hole-transport layer 282, an active layer 273, the electron-transport layer 284, the electron-injection layer 285, and the common electrode 275, which are stacked in this order.

The light-receiving element 270PD is a photoelectric conversion element that receives light entering from the outside of the display apparatus 280A and converts it into an electric signal.

In the description made in this embodiment, the pixel electrode 271 functions as an anode and the common electrode 275 functions as a cathode in both of the light-emitting element and the light-receiving element. In other words, when the light-receiving element is driven by application of reverse bias between the pixel electrode 271 and the common electrode 275, light incident on the light-receiving element can be detected and charge can be generated and extracted as current.

In the display apparatus of this embodiment, an organic compound is used for the active layer 273 of the light-receiving element 270PD. In the light-receiving element 270PD, the layers other than the active layer 273 can have structures in common with the layers in the light-emitting elements. Therefore, the light-receiving element 270PD can be formed concurrently with the formation of the light-emitting elements only by adding a step of depositing the active layer 273 in the manufacturing process of the light-emitting elements. The light-emitting elements and the light-receiving element 270PD can be formed over one substrate. Accordingly, the light-receiving element 270PD can be incorporated into the display apparatus without a significant increase in the number of manufacturing steps.

The display apparatus 280A is an example in which the light-receiving element 270PD and the light-emitting elements have a common structure except that the active layer 273 of the light-receiving element 270PD and the light-emitting layers 283 of the light-emitting elements are separately formed. Note that the structures of the light-receiving element 270PD and the light-emitting elements are not limited thereto. The light-receiving element 270PD and the light-emitting elements may include separately formed layers other than the active layer 273 and the light-emitting layers 283. The light-receiving element 270PD and the light-emitting elements preferably include at least one layer used in common (common layer). Thus, the light-receiving element 270PD can be incorporated into the display apparatus without a significant increase in the number of manufacturing steps.

A conductive film that transmits visible light is used as the electrode through which light is extracted, which is either the pixel electrode 271 or the common electrode 275. A conductive film that reflects visible light is preferably used as the electrode through which light is not extracted.

The light-emitting elements included in the display apparatus of this embodiment preferably employs a micro optical resonator (microcavity) structure. Thus, one of the pair of electrodes of the light-emitting elements is preferably an electrode having properties of transmitting and reflecting visible light (a semi-transmissive and semi-reflective electrode), and the other is preferably an electrode having a property of reflecting visible light (a reflective electrode). When the light-emitting elements have a microcavity structure, light obtained from the light-emitting layers can be resonated between both of the electrodes, whereby light emitted from the light-emitting elements can be intensified.

Note that the semi-transmissive and semi-reflective electrode can have a stacked-layer structure of a reflective electrode and an electrode having a property of transmitting visible light (also referred to as a transparent electrode).

The transparent electrode has a light transmittance higher than or equal to 40%. For example, an electrode having a visible light (light with a wavelength greater than or equal to 400 nm and less than 750 nm) transmittance higher than or equal to 40% is preferably used in the light-emitting elements. The semi-transmissive and semi-reflective electrode has a visible light reflectance of higher than or equal to 10% and lower than or equal to 95%, preferably higher than or equal to 30% and lower than or equal to 80%. The reflective electrode has a visible light reflectance of higher than or equal to 40% and lower than or equal to 100%, preferably higher than or equal to 70% and lower than or equal to 100%. These electrodes preferably have a resistivity of $1\times10^{-2}$ Ωcm or lower. Note that in the case where any of the light-emitting elements emits near-infrared light (light with a wavelength greater than or equal to 750 nm and less than or equal to 1300 nm), the near-infrared light transmittance and reflectance of these electrodes preferably satisfy the above-described numerical ranges of the visible light transmittance and reflectance.

The light-emitting element includes at least the light-emitting layer 283. The light-emitting element may further include, as a layer other than the light-emitting layer 283, a layer containing a substance with a high hole-injection property, a substance with a high hole-transport property, a hole-blocking material, a substance with a high electron-transport property, a substance with a high electron-injection property, a substance with a bipolar property (a substance with a high electron- and hole-transport property), or the like.

For example, the light-emitting elements and the light-receiving element can share at least one of the hole-injection layer, the hole-transport layer, the electron-transport layer, and the electron-injection layer. Furthermore, at least one of the hole-injection layer, the hole-transport layer, the electron-transport layer, and the electron-injection layer can be separately formed for the light-emitting elements and the light-receiving element.

The hole-injection layer is a layer injecting holes from an anode to the light-emitting element, and a layer containing a material with a high hole-injection property. As the material with a high hole-injection property, it is possible to use, for example, an aromatic amine compound or a composite material containing a hole-transport material and an acceptor material (electron-accepting material).

In the light-emitting element, the hole-transport layer is a layer transporting holes, which are injected from the anode by the hole-injection layer, to the light-emitting layer. In the light-receiving element, the hole-transport layer is a layer transporting holes, which are generated in the active layer on the basis of incident light, to the anode. The hole-transport layer is a layer containing a hole-transport material. As the hole-transport material, a substance having a hole mobility greater than or equal to $10^{-6}$ cm$^2$/Vs is preferable. Note that other substances can also be used as long as they have a property of transporting more holes than electrons. As the hole-transport material, materials having a high hole-transport property, such as a π-electron rich heteroaromatic compound (e.g., a carbazole derivative, a thiophene derivative, and a furan derivative) and an aromatic amine (a compound having an aromatic amine skeleton), are preferable.

In the light-emitting element, the electron-transport layer is a layer transporting electrons, which are injected from the cathode by the electron-injection layer, to the light-emitting layer. In the light-receiving element, the electron-transport layer is a layer transporting electrons, which are generated in the active layer on the basis of incident light, to the cathode. The electron-transport layer is a layer containing an electron-transport material. As the electron-transport material, a substance having an electron mobility greater than or equal to $1 \times 10^{-6}$ cm$^2$/Vs is preferable. Note that other substances can also be used as long as they have a property of transporting more electrons than holes. As the electron-transport material, it is possible to use a material having a high electron-transport property, such as a metal complex having a quinoline skeleton, a metal complex having a benzoquinoline skeleton, a metal complex having an oxazole skeleton, a metal complex having a thiazole skeleton, an oxadiazole derivative, a triazole derivative, an imidazole derivative, an oxazole derivative, a thiazole derivative, a phenanthroline derivative, a quinoline derivative having a quinoline ligand, a benzoquinoline derivative, a quinoxaline derivative, a dibenzoquinoxaline derivative, a pyridine derivative, a bipyridine derivative, a pyrimidine derivative, or a π-electron deficient heteroaromatic compound such as a nitrogen-containing heteroaromatic compound.

The electron-injection layer is a layer injecting electrons from a cathode to the light-emitting element, and a layer containing a material with a high electron-injection property. As the material with a high electron-injection property, an alkali metal, an alkaline earth metal, or a compound thereof can be used. As the material with a high electron-injection property, a composite material containing an electron-transport material and a donor material (electron-donating material) can also be used.

The light-emitting layer 283 is a layer including a light-emitting substance. The light-emitting layer 283 can include one or more kinds of light-emitting substances. As the light-emitting substance, a substance that exhibits an emission color of blue, purple, bluish purple, green, yellowish green, yellow, orange, red, or the like is appropriately used. As the light-emitting substance, a substance that emits near-infrared light can also be used.

Examples of the light-emitting substance include a fluorescent material, a phosphorescent material, a TADF material, and a quantum dot material.

Examples of the fluorescent material include a pyrene derivative, an anthracene derivative, a triphenylene derivative, a fluorene derivative, a carbazole derivative, a dibenzothiophene derivative, a dibenzofuran derivative, a dibenzoquinoxaline derivative, a quinoxaline derivative, a pyridine derivative, a pyrimidine derivative, a phenanthrene derivative, and a naphthalene derivative.

Examples of the phosphorescent material include an organometallic complex (particularly an iridium complex) having a 4H-triazole skeleton, a 1H-triazole skeleton, an imidazole skeleton, a pyrimidine skeleton, a pyrazine skeleton, or a pyridine skeleton; an organometallic complex (particularly an iridium complex) having a phenylpyridine derivative including an electron-withdrawing group as a ligand; a platinum complex; and a rare earth metal complex.

The light-emitting layer 283 may include one or more kinds of organic compounds (e.g., a host material and an assist material) in addition to the light-emitting substance (a guest material). As one or more kinds of organic compounds, one or both of the hole-transport material and the electron-transport material can be used. Alternatively, as one or more kinds of organic compounds, a bipolar material or a TADF material may be used.

The light-emitting layer 283 preferably includes a phosphorescent material and a combination of a hole-transport material and an electron-transport material that easily forms an exciplex. With such a structure, light emission can be efficiently obtained by ExTET (Exciplex-Triplet Energy Transfer), which is energy transfer from an exciplex to a light-emitting substance (a phosphorescent material). When a combination of materials is selected so as to form an exciplex that exhibits light emission whose wavelength overlaps the wavelength of a lowest-energy-side absorption band of the light-emitting substance, energy can be transferred smoothly and light emission can be obtained efficiently. With this structure, high efficiency, low-voltage driving, and a long lifetime of the light-emitting element can be achieved at the same time.

In the combination of materials for forming an exciplex, the HOMO level (highest occupied molecular orbital level) of the hole-transport material is preferably higher than or equal to the HOMO level of the electron-transport material. The LUMO level (lowest unoccupied molecular orbital level) of the hole-transport material is preferably higher than or equal to the LUMO level of the electron-transport material. The LUMO levels and the HOMO levels of the materials can be derived from the electrochemical characteristics (reduction potentials and oxidation potentials) of the materials that are measured by cyclic voltammetry (CV).

Note that the formation of an exciplex can be confirmed by a phenomenon in which the emission spectrum of a mixed film in which the hole-transport material and the electron-transport material are mixed is shifted to the longer wavelength side than the emission spectrum of each of the materials (or has another peak on the longer wavelength side), observed by comparison of the emission spectra of the hole-transport material, the electron-transport material, and the mixed film of these materials, for example. Alternatively, the formation of an exciplex can be confirmed by a difference in transient response, such as a phenomenon in which the transient photoluminescence (PL) lifetime of the mixed film has longer lifetime components or has a larger proportion of delayed components than that of each of the materials, observed by comparison of the transient PL of the hole-transport material, the transient PL of the electron-transport material, and the transient PL of the mixed film of these materials. The transient PL can be rephrased as transient electroluminescence (EL). That is, the formation of an exciplex can also be confirmed by a difference in transient response observed by comparison of the transient EL of the hole-transport material, the transient EL of the electron-transport material, and the transient EL of the mixed film of these materials.

The active layer 273 includes a semiconductor. Examples of the semiconductor include an inorganic semiconductor such as silicon and an organic semiconductor including an organic compound. This embodiment shows an example in which an organic semiconductor is used as the semiconductor included in the active layer 273. The use of an organic semiconductor is preferable because the light-emitting layer 283 and the active layer 273 can be formed by the same method (e.g., a vacuum evaporation method) and thus the same manufacturing apparatus can be used.

Examples of an n-type semiconductor material contained in the active layer 273 are electron-accepting organic semiconductor materials such as fullerene (e.g., $C_{60}$ and $C_{70}$) and a fullerene derivative. Fullerene has a soccer ball-like shape, which is energetically stable. Both the HOMO level and the LUMO level of fullerene are deep (low). Having a deep LUMO level, fullerene has an extremely high electron-accepting property (acceptor property). When π-electron conjugation (resonance) spreads in a plane as in benzene, the electron-donating property (donor property) usually increases. Although π-electrons widely spread in fullerene having a spherical shape, its electron-accepting property is high. The high electron-accepting property efficiently causes rapid charge separation and is useful for a light-receiving element. Both $C_{60}$ and $C_{70}$ have a wide absorption band in the visible light region, and $C_{70}$ is especially preferable because of having a larger π-electron conjugation system and a wider absorption band in the long wavelength region than $C_{60}$.

Examples of the n-type semiconductor material include a metal complex having a quinoline skeleton, a metal complex having a benzoquinoline skeleton, a metal complex having an oxazole skeleton, a metal complex having a thiazole skeleton, an oxadiazole derivative, a triazole derivative, an imidazole derivative, an oxazole derivative, a thiazole derivative, a phenanthroline derivative, a quinoline derivative, a benzoquinoline derivative, a quinoxaline derivative, a dibenzoquinoxaline derivative, a pyridine derivative, a bipyridine derivative, a pyrimidine derivative, a naphthalene derivative, an anthracene derivative, a coumarin derivative, a rhodamine derivative, a triazine derivative, and a quinone derivative.

Examples of a p-type semiconductor material contained in the active layer 273 include electron-donating organic semiconductor materials such as copper(II) phthalocyanine (CuPc), tetraphenyldibenzoperiflanthene (DBP), zinc phthalocyanine (ZnPc), tin phthalocyanine (SnPc), and quinacridone.

Examples of a p-type semiconductor material include a carbazole derivative, a thiophene derivative, a furan derivative, and a compound having an aromatic amine skeleton. Other examples of the p-type semiconductor material include a naphthalene derivative, an anthracene derivative, a pyrene derivative, a triphenylene derivative, a fluorene derivative, a pyrrole derivative, a benzofuran derivative, a benzothiophene derivative, an indole derivative, a dibenzofuran derivative, a dibenzothiophene derivative, an indolocarbazole derivative, a porphyrin derivative, a phthalocyanine derivative, a naphthalocyanine derivative, a quinacridone derivative, a polyphenylene vinylene derivative, a polyparaphenylene derivative, a polyfluorene derivative, a polyvinylcarbazole derivative, and a polythiophene derivative.

The HOMO level of the electron-donating organic semiconductor material is preferably shallower (higher) than the HOMO level of the electron-accepting organic semiconductor material. The LUMO level of the electron-donating organic semiconductor material is preferably shallower (higher) than the LUMO level of the electron-accepting organic semiconductor material.

Fullerene having a spherical shape is preferably used as the electron-accepting organic semiconductor material, and an organic semiconductor material having a substantially planar shape is preferably used as the electron-donating organic semiconductor material. Molecules of similar shapes tend to aggregate, and aggregated molecules of similar kinds, which have molecular orbital energy levels close to each other, can improve the carrier-transport property.

For example, the active layer 273 is preferably formed by co-evaporation of an n-type semiconductor and a p-type semiconductor. Alternatively, the active layer 273 may be formed by stacking an n-type semiconductor and a p-type semiconductor.

Either a low molecular compound or a high molecular compound can be used for the light-emitting element and the light-receiving element, and an inorganic compound may also be contained. Each of the layers included in the light-emitting element and the light-receiving element can be formed by an evaporation method (including a vacuum evaporation method), a transfer method, a printing method, an inkjet method, a coating method, or the like.

Figure 21B:
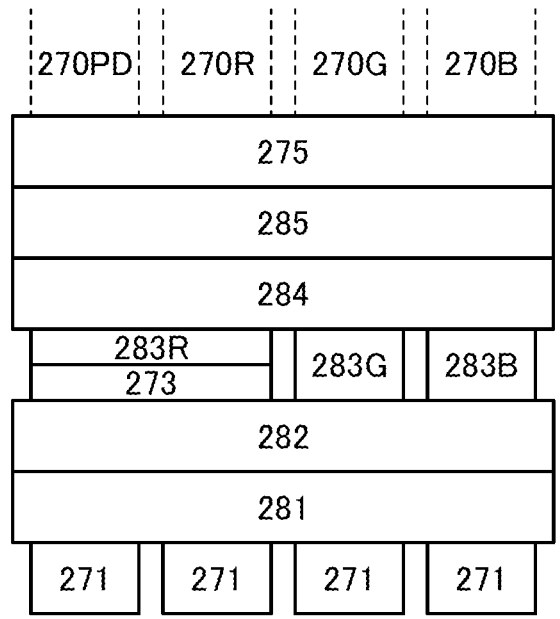

A display apparatus 280B illustrated in FIG. 21B is different from the display apparatus 280A in that the light-receiving element 270PD and the light-emitting element 270R have the same structure.

The light-receiving element 270PD and the light-emitting element 270R share the active layer 273 and the light-emitting layer 283R.

Here, it is preferable that the light-receiving element 270PD have a structure in common with the light-emitting element that emits light with a wavelength longer than that of the light desired to be detected. For example, the light-receiving element 270PD having a structure in which blue light is detected can have a structure which is similar to that of one or both of the light-emitting element 270R and the light-emitting element 270G. For example, the light-receiving element 270PD having a structure in which green light is detected can have a structure similar to that of the light-emitting element 270R.

When the light-receiving element 270PD and the light-emitting element 270R have a common structure, the number of deposition steps and the number of masks can be smaller than those for the structure in which the light-receiving element 270PD and the light-emitting element 270R include separately formed layers. As a result, the number of manufacturing steps and the manufacturing cost of the display apparatus can be reduced.

When the light-receiving element 270PD and the light-emitting element 270R have a common structure, a margin for misalignment can be narrower than that for the structure in which the light-receiving element 270PD and the light-emitting element 270R include separately formed layers. Accordingly, the aperture ratio of a pixel can be increased, so that the light extraction efficiency of the display apparatus can be increased. This can extend the life of the light-emitting element. Furthermore, the display apparatus can exhibit a high luminance. Moreover, the resolution of the display apparatus can also be increased.

The light-emitting layer 283R includes a light-emitting material that emits red light. The active layer 273 includes an organic compound that absorbs light with a wavelength shorter than that of red light (e.g., one or both of green light and blue light). The active layer 273 preferably includes an organic compound that does not easily absorb red light and that absorbs light with a wavelength shorter than that of red light. In this way, red light can be efficiently extracted from the light-emitting element 270R, and the light-receiving element 270PD can detect light with a wavelength shorter than that of red light at high accuracy.

Although the light-emitting element 270R and the light-receiving element 270PD have the same structure in an example of the display apparatus 280B, the light-emitting element 270R and the light-receiving element 270PD may include optical adjustment layers with different thicknesses.

A display apparatus 280C shown in FIG. 22A and FIG. 22B includes a light-emitting and light-receiving element 270SR that emits red (R) light and has a light-receiving function, the light-emitting element 270G that emits green (G) light, and the light-emitting element 270B that emits blue (B) light. The above description of the display apparatus 280A and the like can be referred to for the structures of the light-emitting element 270G and the light-emitting element 270B.

The light-emitting and light-receiving element 270SR includes the pixel electrode 271, the hole-injection layer 281, the hole-transport layer 282, the active layer 273, the light-emitting layer 283R, the electron-transport layer 284, the electron-injection layer 285, and the common electrode 275, which are stacked in this order. The light-emitting and light-receiving element 270SR has the same structure as the light-emitting element 270R and the light-receiving element 270PD in the display apparatus 280B.

FIG. 22A shows a case where the light-emitting and light-receiving element 270SR functions as a light-emitting element. In the example of FIG. 22A, the light-emitting element 270B emits blue light, the light-emitting element 270G emits green light, and the light-emitting and light-receiving element 270SR emits red light.

FIG. 22B illustrates a case where the light-emitting and light-receiving element 270SR functions as a light-receiving element. In FIG. 22B, the light-emitting and light-receiving element 270SR detects blue light emitted by the light-emitting element 270B and green light emitted by the light-emitting element 270G.

The light-emitting element 270B, the light-emitting element 270G, and the light-emitting and light-receiving element 270SR each include the pixel electrode 271 and the common electrode 275. In this embodiment, the case where the pixel electrode 271 functions as an anode and the common electrode 275 functions as a cathode is described as an example. When the light-emitting and light-receiving element 270SR is driven by application of reverse bias between the pixel electrode 271 and the common electrode 275, light incident on the light-emitting and light-receiving element 270SR can be detected and charge can be generated and extracted as current.

Note that it can be said that the light-emitting and light-receiving element 270SR has a structure in which the active layer 273 is added to the light-emitting element. That is, the light-emitting and light-receiving element 270SR can be formed concurrently with the formation of the light-emitting element only by adding a step of depositing the active layer 273 in the manufacturing process of the light-emitting element. The light-emitting element and the light-emitting and light-receiving element can be formed over one substrate. Thus, the display portion can be provided with an image capturing function without a significant increase in the number of manufacturing steps.

The stacking order of the light-emitting layer 283R and the active layer 273 is not limited. FIG. 22A and FIG. 22B each show an example in which the active layer 273 is provided over the hole-transport layer 282, and the light-emitting layer 283R is provided over the active layer 273. The stacking order of the light-emitting layer 283R and the active layer 273 may be reversed.

The light-emitting and light-receiving element may exclude at least one layer of the hole-injection layer 281, the hole-transport layer 282, the electron-transport layer 284, and the electron-injection layer 285. Furthermore, the light-emitting and light-receiving element may include another functional layer such as a hole-blocking layer or an electron-blocking layer.

In the light-emitting and light-receiving element, a conductive film that transmits visible light is used as the electrode through which light is extracted. A conductive film that reflects visible light is preferably used as the electrode through which light is not extracted.

The functions and materials of the layers constituting the light-emitting and light-receiving element are similar to those of the layers constituting the light-emitting elements and the light-receiving element and are not described in detail.

FIG. 22C to FIG. 22G illustrate examples of layered structures of light-emitting and light-receiving elements.

The light-emitting and light-receiving element illustrated in FIG. 22C includes a first electrode 277, the hole-injection layer 281, the hole-transport layer 282, the light-emitting layer 283R, the active layer 273, the electron-transport layer 284, the electron-injection layer 285, and a second electrode 278.

FIG. 22C illustrates an example in which the light-emitting layer 283R is provided over the hole-transport layer 282, and the active layer 273 is stacked over the light-emitting layer 283R.

As illustrated in FIG. 22A to FIG. 22C, the active layer 273 and the light-emitting layer 283R may be in contact with each other.

A buffer layer is preferably provided between the active layer 273 and the light-emitting layer 283R. In this case, the buffer layer preferably has a hole-transport property and an electron-transport property. For example, a substance with a bipolar property is preferably used for the buffer layer. Alternatively, as the buffer layer, at least one layer of a hole-injection layer, a hole-transport layer, an electron-transport layer, an electron-injection layer, a hole-blocking layer, an electron-blocking layer, and the like can be used. FIG. 22D illustrates an example in which the hole-transport layer 282 is used as the buffer layer.

The buffer layer provided between the active layer 273 and the light-emitting layer 283R can inhibit transfer of excitation energy from the light-emitting layer 283R to the active layer 273. Furthermore, the buffer layer can also be used to adjust the optical path length (cavity length) of the microcavity structure. Thus, high emission efficiency can be obtained from a light-emitting and light-receiving element including the buffer layer between the active layer 273 and the light-emitting layer 283R.

FIG. 22E illustrates an example of a stacked-layer structure in which a hole-transport layer 282-1, the active layer 273, a hole-transport layer 282-2, and the light-emitting layer 283R are stacked in this order over the hole-injection layer 281. The hole-transport layer 282-2 functions as a buffer layer. The hole-transport layer 282-1 and a hole-transport layer 281-2 may include the same material or different materials. Instead of the hole-transport layer 281-2, any of the above layers that can be used as the buffer layer may be used. The positions of the active layer 273 and the light-emitting layer 283R may be interchanged.

The light-emitting and light-receiving element illustrated in FIG. 22F is different from the light-emitting and light-receiving element illustrated in FIG. 22A in not including the hole-transport layer 282. In this manner, the light-emitting and light-receiving element may exclude at least one layer of the hole-injection layer 281, the hole-transport layer 282, the electron-transport layer 284, and the electron-injection layer 285. Furthermore, the light-emitting and light-receiving element may include another functional layer such as a hole-blocking layer or an electron-blocking layer.

The light-emitting and light-receiving element illustrated in FIG. 22G is different from the light-emitting and light-receiving element illustrated in FIG. 22A in including a layer 289 serving as both a light-emitting layer and an active layer instead of including the active layer 273 and the light-emitting layer 283R.

As the layer serving as both a light-emitting layer and an active layer, a layer containing three materials which are an n-type semiconductor that can be used for the active layer 273, a p-type semiconductor that can be used for the active layer 273, and a light-emitting substance that can be used for the light-emitting layer 283R can be used, for example.

Note that an absorption band on the lowest energy side of an absorption spectrum of a mixed material of the n-type semiconductor and the p-type semiconductor and a maximum peak of an emission spectrum (PL spectrum) of the light-emitting substance preferably do not overlap each other and are further preferably positioned fully apart from each other.

Structure Example 2-2 of Light-Emitting Device

A detailed structure of the display apparatus of one embodiment of the present invention will be described below. Here, in particular, an example of the display apparatus including light-receiving elements and light-emitting elements will be described.

Figure 23A:
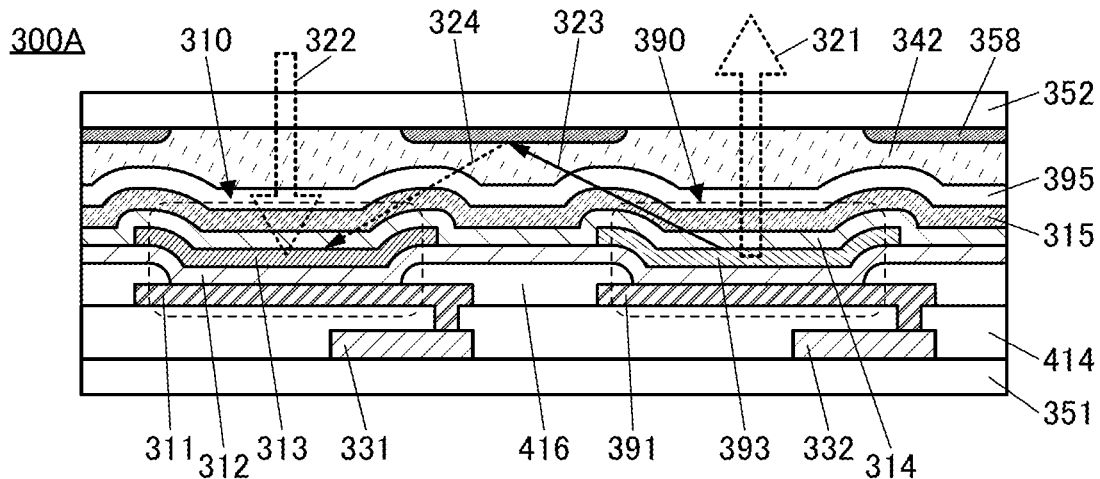
FIG. 23A to FIG. 23C are diagrams illustrating a structure example of a display apparatus.

FIG. 23A illustrates a cross-sectional view of a display apparatus 300A. The display apparatus 300A includes a substrate 351, a substrate 352, a light-receiving element 310, and a light-emitting element 390.

The light-emitting element 390 includes a pixel electrode 391, a buffer layer 312, a light-emitting layer 393, a buffer layer 314, and a common electrode 315, which are stacked in this order. The buffer layer 312 can include one or both of a hole-injection layer and a hole-transport layer. The light-emitting layer 393 includes an organic compound. The buffer layer 314 can include one or both of an electron-injection layer and an electron-transport layer. The light-emitting element 390 has a function of emitting visible light 321. Note that the display apparatus 300A may also include a light-emitting element having a function of emitting infrared light.

The light-receiving element 310 includes a pixel electrode 311, the buffer layer 312, an active layer 313, the buffer layer 314, and the common electrode 315, which are stacked in this order. The active layer 313 includes an organic compound. The light-receiving element 310 has a function of detecting visible light. Note that the light-receiving element 310 may also have a function of detecting infrared light.

The buffer layer 312, the buffer layer 314, and the common electrode 315 are common layers shared by the light-emitting element 390 and the light-receiving element 310 and provided across them. The buffer layer 312, the buffer layer 314, and the common electrode 315 each include a portion overlapping with the active layer 313 and the pixel electrode 311, a portion overlapping with the light-emitting layer 393 and the pixel electrode 391, and a portion overlapping with none of them.

This embodiment is described assuming that the pixel electrode functions as an anode and the common electrode 315 functions as a cathode in both of the light-emitting element 390 and the light-receiving element 310. In other words, the light-receiving element 310 is driven by application of reverse bias between the pixel electrode 311 and the common electrode 315, so that light incident on the light-receiving element 310 can be detected and charge can be generated and extracted as current in the display apparatus 300A.

The pixel electrode 311, the pixel electrode 391, the buffer layer 312, the active layer 313, the light-emitting layer 393, the buffer layer 314, and the common electrode 315 may each have a single-layer structure or a stacked-layer structure.

The pixel electrode 311 and the pixel electrode 391 are each positioned over an insulating layer 414. The pixel electrodes can be formed using the same material in the same step. An end portion of the pixel electrode 311 and an end portion of the pixel electrode 391 are covered with a partition 416. Two adjacent pixel electrodes are electrically insulated (electrically isolated) from each other by the partition 416.

An organic insulating film is suitable for the partition 416. Examples of materials that can be used for the organic insulating film include an acrylic resin, a polyimide resin, an epoxy resin, a polyamide resin, a polyimide-amide resin, a siloxane resin, a benzocyclobutene-based resin, a phenol resin, and precursors of these resins. The partition 416 is a layer that transmits visible light. A partition that blocks visible light may be provided instead of the partition 416.

The common electrode 315 is a layer shared by the light-receiving element 310 and the light-emitting element 390.

The material, thickness, and the like of the pair of electrodes can be the same between the light-receiving element 310 and the light-emitting element 390. Accordingly, the manufacturing cost of the display apparatus can be reduced, and the manufacturing process of the display apparatus can be simplified.

The display apparatus 300A includes the light-receiving element 310, the light-emitting element 390, a transistor 331, a transistor 332, and the like between a pair of substrates (the substrate 351 and the substrate 352).

In the light-receiving element 310, the buffer layer 312, the active layer 313, and the buffer layer 314, which are positioned between the pixel electrode 311 and the common electrode 315, can each be referred to as an organic layer (a layer including an organic compound). The pixel electrode 311 preferably has a function of reflecting visible light. The common electrode 315 has a function of transmitting visible light. Note that in the case where the light-receiving element 310 is configured to detect infrared light, the common electrode 315 has a function of transmitting infrared light. Furthermore, the pixel electrode 311 preferably has a function of reflecting infrared light.

The light-receiving element 310 has a function of detecting light. Specifically, the light-receiving element 310 is a photoelectric conversion element that receives light 322 incident from the outside of the display apparatus 300A and converts it into an electric signal. The light 322 can also be expressed as light that is emitted from the light-emitting element 390 and then reflected by an object. The light 322 may be incident on the light-receiving element 310 through a lens or the like provided in the display apparatus 300A.

In the light-emitting element 390, the buffer layer 312, the light-emitting layer 393, and the buffer layer 314, which are positioned between the pixel electrode 391 and the common electrode 315, can be collectively referred to as an EL layer. The EL layer includes at least the light-emitting layer 393. As described above, the pixel electrode 391 preferably has a function of reflecting visible light. The common electrode 315 has a function of transmitting visible light. Note that in the case where the display apparatus 300A includes a light-emitting element that emits infrared light, the common electrode 315 has a function of transmitting infrared light. Furthermore, the pixel electrode 391 preferably has a function of reflecting infrared light.

The light-emitting elements included in the display apparatus of this embodiment preferably employ a micro optical resonator (microcavity) structure. The light-emitting element 390 may include an optical adjustment layer between the pixel electrode 391 and the common electrode 315. The use of the micro resonator structure enables light of a specific color to be intensified and extracted from each of the light-emitting elements.

The light-emitting element 390 has a function of emitting visible light. Specifically, the light-emitting element 390 is an electroluminescent element that emits light (here, the visible light 321) to the substrate 352 side when voltage is applied between the pixel electrode 391 and the common electrode 315.

The pixel electrode 311 included in the light-receiving element 310 is electrically connected to a source or a drain of the transistor 331 through an opening provided in the insulating layer 414. The pixel electrode 391 included in the light-emitting element 390 is electrically connected to a source or a drain of the transistor 332 through an opening provided in the insulating layer 414.

The transistor 331 and the transistor 332 are on and in contact with the same layer (the substrate 351 in FIG. 23A).

At least part of a circuit electrically connected to the light-receiving element 310 and a circuit electrically connected to the light-emitting element 390 are preferably formed using the same material in the same step. In that case, the thickness of the display apparatus can be reduced compared with the case where the two circuits are separately formed, resulting in simplification of the manufacturing process.

The light-receiving element 310 and the light-emitting element 390 are each preferably covered with a protective layer 395. In FIG. 23A and the like, the protective layer 395 is provided on and in contact with the common electrode 315. Providing the protective layer 395 can inhibit entry of impurities such as water into the light-receiving element 310 and the light-emitting element 390, so that the reliability of the light-receiving element 310 and the light-emitting element 390 can be increased. The protective layer 395 and the substrate 352 are bonded to each other with an adhesive layer 342.

A light-blocking layer 358 is provided on the surface of the substrate 352 on the substrate 351 side. The light-blocking layer 358 has openings in a position overlapping with the light-emitting element 390 and in a position overlapping with the light-receiving element 310.

Here, the light-receiving element 310 detects light that is emitted from the light-emitting element 390 and then reflected by an object. However, in some cases, light emitted from the light-emitting element 390 is reflected inside the display apparatus 300A and is incident on the light-receiving element 310 without through an object. The light-blocking layer 358 can reduce the influence of such stray light. For example, in the case where the light shielding layer 358 is not provided, light 323 emitted from the light-emitting element 390 is reflected by the substrate 352 and reflected light 324 is incident on the light-receiving element 310 in some cases. Providing the light-blocking layer 358 can inhibit the reflected light 324 to be incident on the light-receiving element 310. Consequently, noise can be reduced, and the sensitivity of a sensor using the light-receiving element 310 can be increased.

For the light-blocking layer 358, a material that blocks light emitted from the light-emitting element can be used. The light shielding layer 358 preferably absorbs visible light. As the light-blocking layer 358, a black matrix can be formed using a metal material or a resin material containing pigment (e.g., carbon black) or dye, for example. The light-blocking layer 358 may have a stacked-layer structure of a red color filter, a green color filter, and a blue color filter.

Figure 23B:
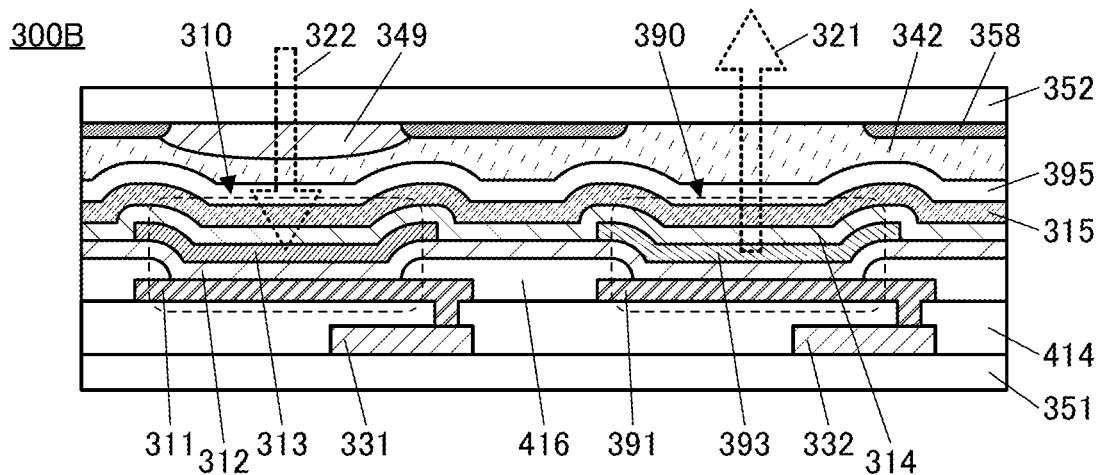

A display apparatus 300B illustrated in FIG. 23B differs from the display apparatus 300A mainly in including a lens 349.

The lens 349 is provided on a surface of the substrate 352 on the substrate 351 side. The light 322 from the outside is incident on the light-receiving element 310 through the lens 349. For each of the lens 349 and the substrate 352, a material that has high visible-light-transmitting property is preferably used.

When light is incident on the light-receiving element 310 through the lens 349, the range of light incident on the light-receiving element 310 can be narrowed. Thus, overlap of imaging ranges between a plurality of light-receiving elements 310 can be inhibited, whereby a clear image with little blurring can be captured.

In addition, the lens 349 can condense incident light. Accordingly, the amount of light to be incident on the light-receiving element 310 can be increased. This can increase the photoelectric conversion efficiency of the light-receiving element 310.

Figure 23C:
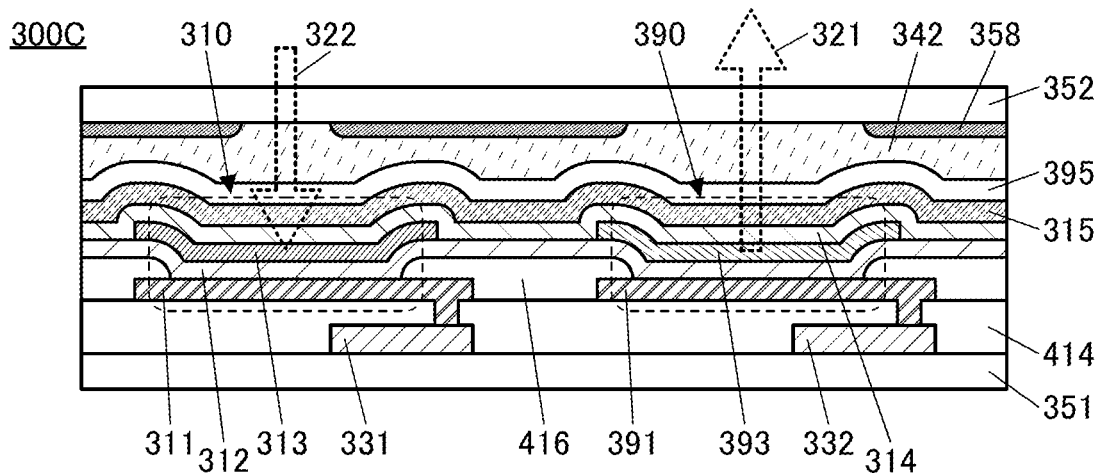

A display apparatus 300C illustrated in FIG. 23C differs from the display apparatus 300A in the shape of the light-blocking layer 358.

The light-blocking layer 358 is provided so that an opening portion overlapping with the light-receiving element 310 is positioned on an inner side of the light-receiving region of the light-receiving element 310 in a plan view. The smaller the diameter of the opening portion overlapping with the light-receiving element 310 of the light-blocking layer 358 is, the narrower the range of light incident on the light-receiving element 310 becomes. Thus, overlap of imaging ranges between a plurality of light-receiving elements 310 can be inhibited, whereby a clear image with little blurring can be captured.

For example, the area of the opening portion of the light-blocking layer 358 can be less than or equal to 80%, less than or equal to 70%, less than or equal to 60%, less than or equal to 50%, or less than or equal to 40% and greater than or equal to 1%, greater than or equal to 5%, or greater than or equal to 10% of the area of the light-receiving region of the light-receiving element 310. An clearer image can be obtained as the area of the opening portion of the light-blocking layer 358 becomes smaller. In contrast, when the area of the opening portion is too small, the amount of light reaching the light-receiving element 310 might be reduced to reduce light sensitivity. Therefore, the area of the opening is preferably set within the above-described range. The above upper limits and lower limits can be combined freely. Furthermore, the light-receiving region of the light-receiving element 310 can be referred to as the opening portion of the partition 416.

Note that the center of the opening portion of the light-blocking layer 358 overlapping with the light-receiving element 310 may be shifted from the center of the light-receiving region of the light-receiving element 310 in a plan view. Moreover, a structure in which the opening portion of the light-blocking layer 358 does not overlap with the light-receiving region of the light-receiving element 310 in a plan view may be employed. Thus, only oblique light that has passed through the opening portion of the light-blocking layer 358 can be received by the light-receiving element 310. Accordingly, the range of light incident on the light-receiving element 310 can be limited more effectively, so that a clear image can be captured.

Figure 24A:
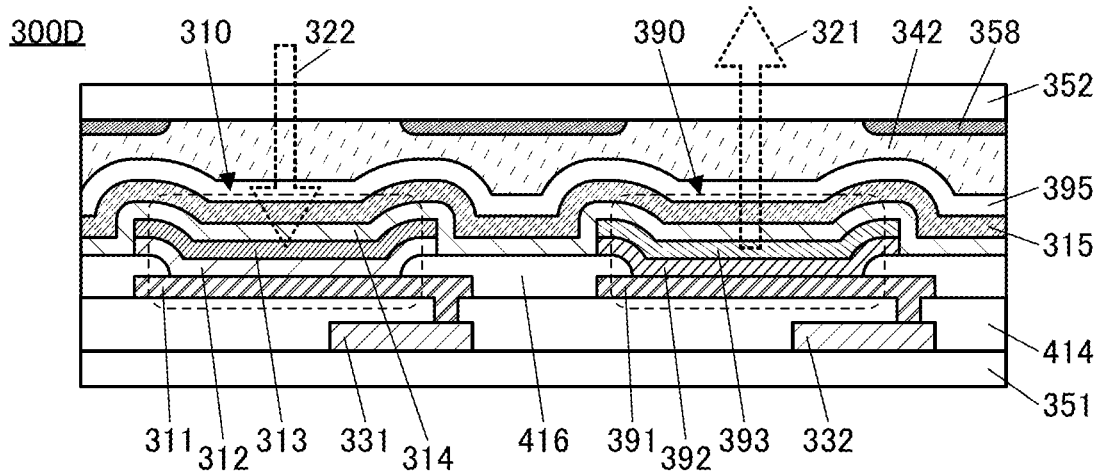
FIG. 24A to FIG. 24C are diagrams illustrating structure examples of a display apparatus.

A display apparatus 300D illustrated in FIG. 24A differs from the display apparatus 300A mainly in that the buffer layer 312 is not a common layer.

The light-receiving element 310 includes the pixel electrode 311, the buffer layer 312, the active layer 313, the buffer layer 314, and the common electrode 315. The light-emitting element 390 includes the pixel electrode 391, a buffer layer 392, the light-emitting layer 393, the buffer layer 314, and the common electrode 315. Each of the active layer 313, the buffer layer 312, the light-emitting layer 393, and the buffer layer 392 has an island-shaped top surface.

The buffer layer 312 and the buffer layer 392 may include different materials or the same material.

As described above, when the buffer layers are formed separately in the light-emitting element 390 and the light-receiving element 310, the degree of freedom for selecting materials of the buffer layers included in the light-emitting element 390 and the light-receiving element 310 can be increased, which facilitates optimization. In addition, the buffer layer 314 and the common electrode 315 are common layers, whereby the manufacturing process can be simplified and manufacturing cost can be reduced as compared to the case where the light-emitting element 390 and the light-receiving element 310 are manufactured separately.

Figure 24B:
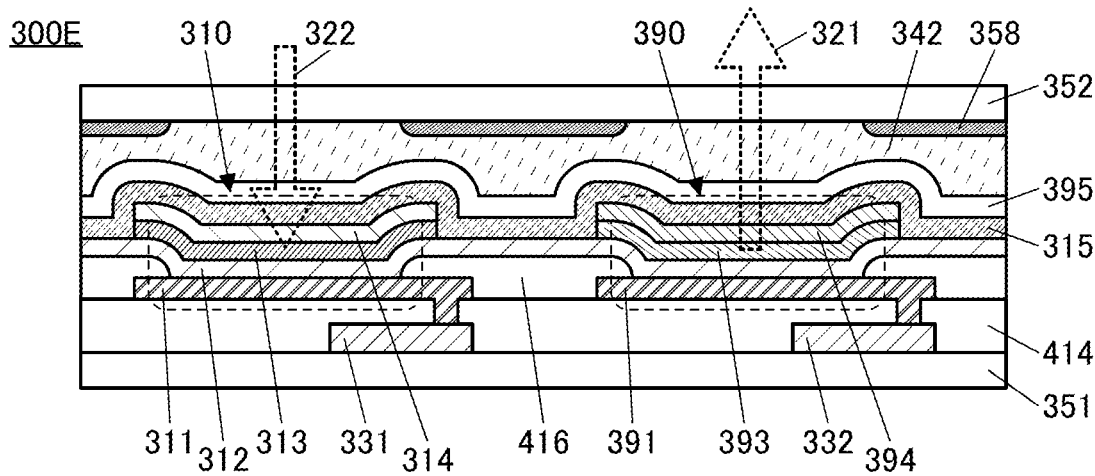

A display apparatus 300E illustrated in FIG. 24B differs from the display apparatus 300A mainly in that the buffer layer 314 is not a common layer.

The light-receiving element 310 includes the pixel electrode 311, the buffer layer 312, the active layer 313, the buffer layer 314, and the common electrode 315. The light-emitting element 390 includes the pixel electrode 391, the buffer layer 312, the light-emitting layer 393, a buffer layer 394, and the common electrode 315. Each of the active layer 313, the buffer layer 314, the light-emitting layer 393, and the buffer layer 394 has an island-shaped top surface.

The buffer layer 314 and the buffer layer 394 may include different materials or the same material.

As described above, when the buffer layers are formed separately in the light-emitting element 390 and the light-receiving element 310, the degree of freedom for selecting materials of the buffer layers included in the light-emitting element 390 and the light-receiving element 310 can be increased, which facilitates optimization. In addition, the buffer layer 312 and the common electrode 315 are common layers, whereby the manufacturing process can be simplified and manufacturing cost can be reduced as compared to the case where the light-emitting element 390 and the light-receiving element 310 are manufactured separately.

Figure 24C:
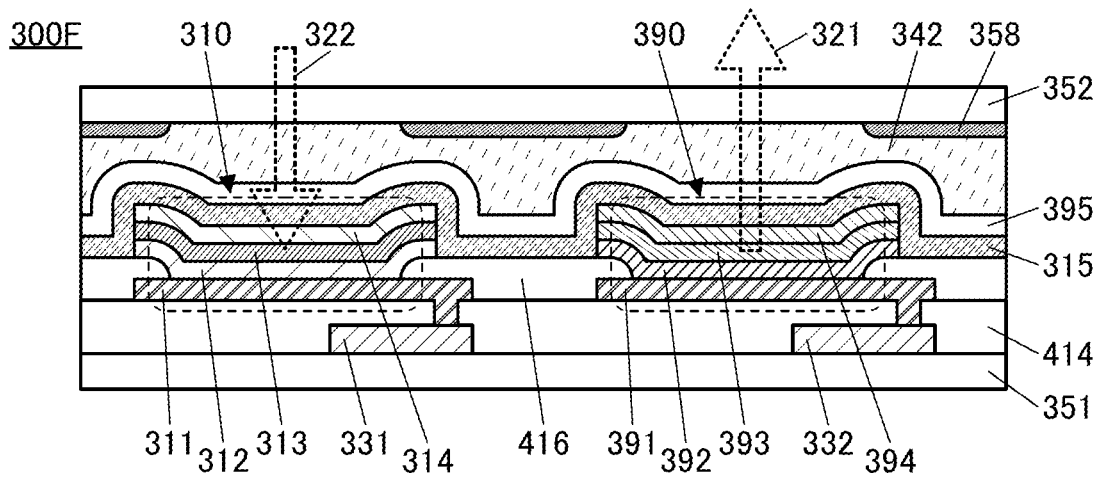

A display apparatus 300F illustrated in FIG. 24C differs from the display apparatus 300A mainly in that the buffer layer 312 and the buffer layer 314 are not common layers.

The light-receiving element 310 includes the pixel electrode 311, the buffer layer 312, the active layer 313, the buffer layer 314, and the common electrode 315. The light-emitting element 390 includes the pixel electrode 391, the buffer layer 392, the light-emitting layer 393, the buffer layer 394, and the common electrode 315. Each of the buffer layer 312, the active layer 313, the buffer layer 314, the buffer layer 392, the light-emitting layer 393, and the buffer layer 394 has an island-shaped top surface.

As described above, when the buffer layers are formed separately in the light-emitting element 390 and the light-receiving element 310, the degree of freedom for selecting materials of the buffer layers included in the light-emitting element 390 and the light-receiving element 310 can be increased, which facilitates optimization. In addition, the common electrode 315 is a common layer, whereby the manufacturing process can be simplified and manufacturing cost can be reduced as compared to the case where the light-emitting element 390 and the light-receiving element 310 are manufactured separately.

Structure Example 2-3 of Display Apparatus

A more detailed structure of the display apparatus of one embodiment of the present invention will be described below. Here, in particular, an example of the display apparatus including light-receiving elements and light-emitting elements will be described.

Note that in the description below, the above description is referred to for portions similar to those described above and the description of the portions is omitted in some cases.

Figure 25A:
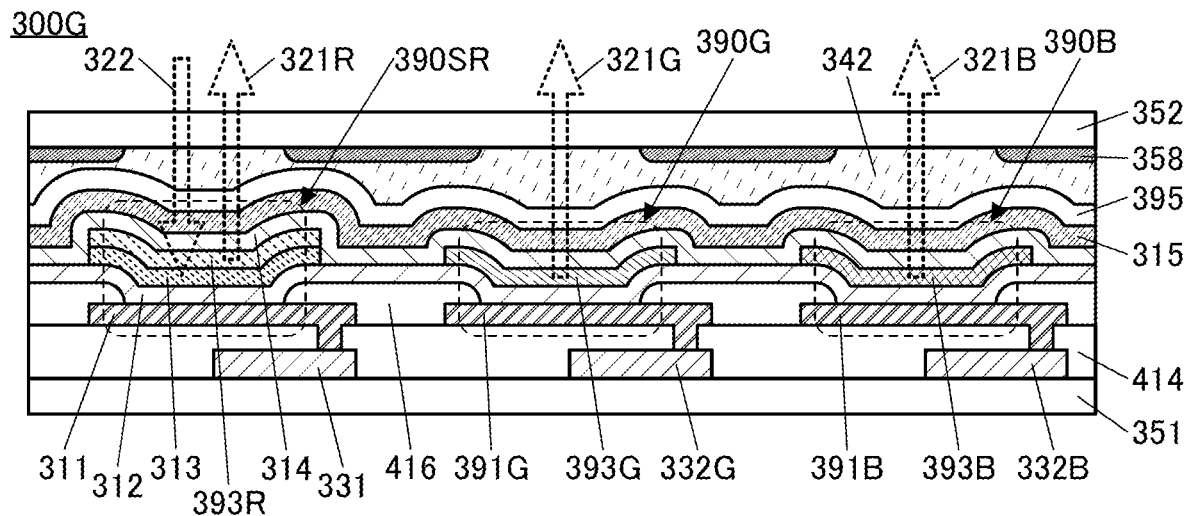
FIG. 25A and FIG. 25B are diagrams illustrating structure examples of a display apparatus.

FIG. 25A illustrates a cross-sectional view of a display apparatus 300G. The display apparatus 300G includes a light-emitting and light-receiving element 390SR, a light-emitting element 390G, and a light-emitting element 390B.

The light-emitting and light-receiving element 390SR has a function of a light-emitting element that emits red light 321R, and a function of a photoelectric conversion element that receives the light 322. The light-emitting element 390G can emit green light 321G. The light-emitting element 390B can emit blue light 321B.

The light-emitting and light-receiving element 390SR includes the pixel electrode 311, the buffer layer 312, the active layer 313, a light-emitting layer 393R, the buffer layer 314, and the common electrode 315. The light-emitting element 390G includes a pixel electrode 391G, the buffer layer 312, a light-emitting layer 393G, the buffer layer 314, and the common electrode 315. The light-emitting element 390B includes a pixel electrode 391B, the buffer layer 312, a light-emitting layer 393B, the buffer layer 314, and the common electrode 315.

The buffer layer 312, the buffer layer 314, and the common electrode 315 are common layers shared by the light-emitting and light-receiving element 390SR, the light-emitting element 390G, and the light-emitting element 390B and provided across them. Each of the active layer 313, the light-emitting layer 393R, the light-emitting layer 393G, and the light-emitting layer 393B has an island-shaped top surface. Note that although the stack body including the active layer 313 and the light-emitting layer 393R, the light-emitting layer 393G, and the light-emitting layer 393B are provided separately from one another in the example illustrated in FIG. 25A, and adjacent two of them may include a region where the two overlaps each other.

Note that as in the case of the display apparatus 300D, the display apparatus 300E, or the display apparatus 300F, a structure in which one or both of the buffer layer 312 and the buffer layer 314 are not used as common layers can be employed.

The pixel electrode 311 is electrically connected to one of the source and the drain of the transistor 331. The pixel electrode 391G is electrically connected to one of a source and a drain of a transistor 332G. The pixel electrode 391B is electrically connected to one of a source and a drain of a transistor 332B.

With such a structure, a display apparatus with higher resolution can be achieved.

Figure 25B:
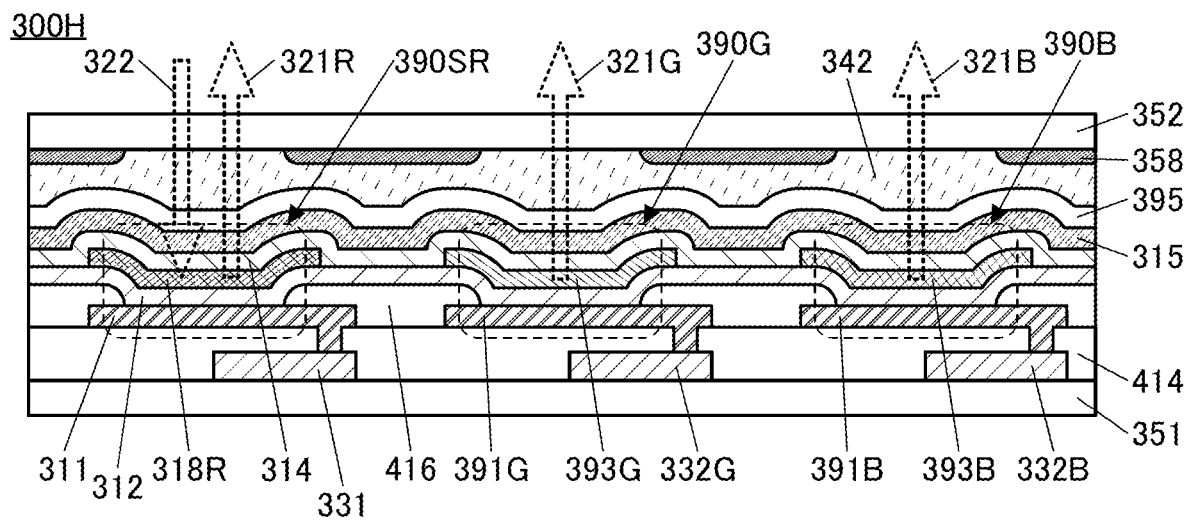

A display apparatus 300H illustrated in FIG. 25B differs from the display apparatus 300G mainly in the structure of the light-emitting and light-receiving element 390SR.

The light-emitting and light-receiving element 390SR includes a light-emitting and light-receiving layer 318R instead of the active layer 313 and the light-emitting layer 393R.

The light-emitting and light-receiving layer 318R is a layer that has both a function of a light-emitting layer and a function of an active layer. For example, a layer including the above-described light-emitting substance, an n-type semiconductor, and a p-type semiconductor can be used.

With such a structure, the manufacturing process can be simplified, facilitating cost reduction.

Structure Example 2-4 of Display Apparatus

A more specific structure of the display apparatus of one embodiment of the present invention will be described below.

Figure 26:
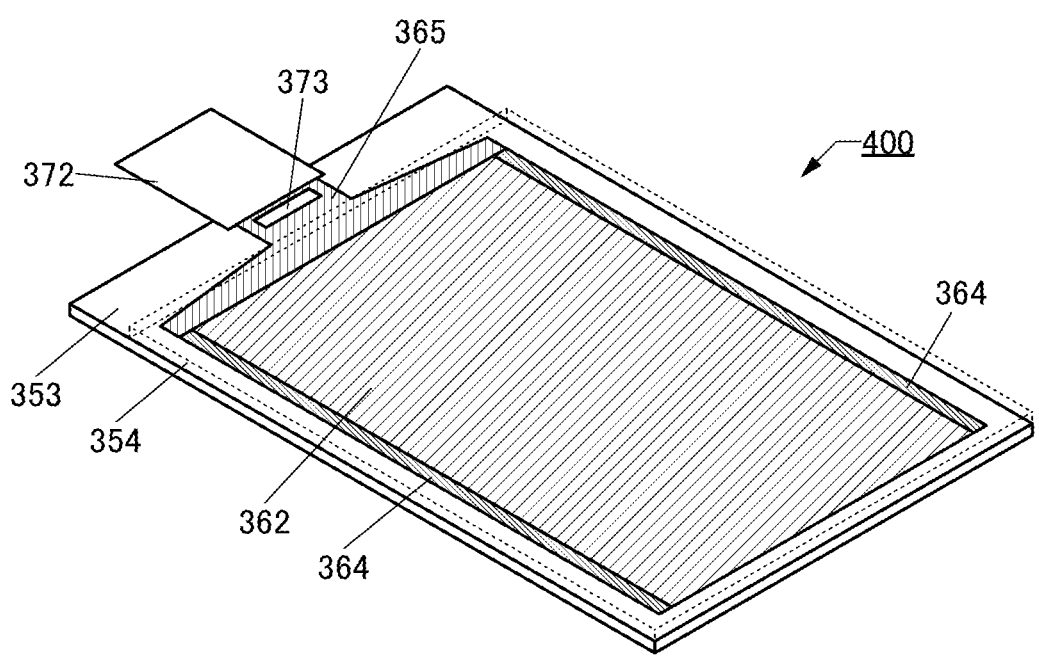
FIG. 26 is a diagram illustrating a structure example of a display apparatus.

FIG. 26 is a perspective view illustrating a structure example of a display apparatus 400. FIG. 27A is a cross-sectional view illustrating a structure example of the display apparatus 400.

In the display apparatus 400, a substrate 353 and a substrate 354 are bonded to each other. In FIG. 26, the substrate 354 is denoted by a dashed line.

The display apparatus 400 includes a display portion 362, a circuit 364, a wiring 365, and the like. FIG. 26 illustrates an example in which the display apparatus 400 is provided with an IC (integrated circuit) 373 and an FPC 372.

As the circuit 364, a gate driver circuit or a row driver circuit can be used, for example.

The wiring 365 has a function of supplying a signal and power to the display portion 362 and the circuit 364. The signal and power are input to the wiring 365 from the outside through the FPC 372 or input to the wiring 365 from the IC 373.

FIG. 26 illustrates an example in which the IC 373 is provided over the substrate 353 by a COG (Chip On Glass) method, a COF (Chip On Film) method, or the like. As the IC 373, an IC including a gate driver circuit, a row driver circuit, a data driver circuit, a reading circuit, a column driver circuit, or the like can be used, for example. Note that the display apparatus 400 is not necessarily provided with an IC. The IC may be mounted on the FPC by a COF method or the like.

FIG. 27A illustrates an example of cross-sections of part of a region including the FPC 372, part of a region including the circuit 364, part of a region including the display portion 362, and part of a region including an end portion of the display apparatus 400 illustrated in FIG. 26.

The display apparatus 400 illustrated in FIG. 27A includes a transistor 408, a transistor 409, a transistor 410, the light-emitting element 390, the light-receiving element 310, and the like between the substrate 353 and the substrate 354.

The substrate 354 and the protective layer 395 are bonded to each other with the adhesive layer 342, and a solid sealing structure is used for the display apparatus 400.

The substrate 353 and an insulating layer 412 are bonded to each other with an adhesive layer 355.

In a method for manufacturing the display apparatus 400, first, a formation substrate provided with the insulating layer 412, the transistors, the light-receiving element 310, the light-emitting element 390, and the like is bonded to the substrate 354 provided with the light-blocking layer 358 and the like with the adhesive layer 342. Then, with the use of the adhesive layer 355, the substrate 353 is attached to a surface exposed by separation of the formation substrate, whereby the components formed over the formation substrate are transferred onto the substrate 353. The substrate 353 and the substrate 354 preferably have flexibility. This can increase the flexibility of the display apparatus 400.

The light-emitting element 390 has a stacked-layer structure in which the pixel electrode 391, the buffer layer 312, the light-emitting layer 393, the buffer layer 314, and the common electrode 315 are stacked in this order from the insulating layer 414 side. The pixel electrode 391 is electrically connected to one of a source and a drain of in the transistor 408 through an opening provided in the insulating layer 414. The transistor 408 has a function of controlling a current flowing through the light-emitting element 390.

The light-receiving element 310 has a stacked-layer structure in which the pixel electrode 311, the buffer layer 312, the active layer 313, the buffer layer 314, and the common electrode 315 are stacked in this order from the insulating layer 414 side. The pixel electrode 311 is connected to one of a source and a drain of the transistor 409 through an opening provided in the insulating layer 414. The transistor 409 has a function of controlling transfer of charge accumulated in the light-receiving element 310.

Light emitted by the light-emitting element 390 is emitted toward the substrate 354 side. Light is incident on the light-receiving element 310 through the substrate 354 and the adhesive layer 342. For the substrate 354, a material having a high visible-light-transmitting property is preferably used.

The pixel electrode 311 and the pixel electrode 391 can be formed using the same material in the same step. The buffer layer 312, the buffer layer 314, and the common electrode 315 are shared by the light-receiving element 310 and the light-emitting element 390. The light-receiving element 310 and the light-emitting element 390 can have common components except the active layer 313 and the light-emitting layer 393. Thus, the light-receiving element 310 can be incorporated in the display apparatus 400 without a significant increase in the number of manufacturing steps.

The light-blocking layer 358 is provided on a surface of the substrate 354 on the substrate 353 side. The light-blocking layer 358 includes openings in a position overlapping with the light-emitting element 390 and in a position overlapping with the light-receiving element 310. Providing the light-blocking layer 358 can control the range where the light-receiving element 310 detects light. As described above, it is preferable to control light to be incident on the light-receiving element 310 by adjusting the position and area of the opening of the light-blocking layer provided in the position overlapping with the light-receiving element 310. Furthermore, with the light-blocking layer 358, light can be inhibited from being incident on the light-receiving element 310 directly from the light-emitting element 390 without through an object. Hence, a sensor with less noise and high sensitivity can be obtained.

An end portion of the pixel electrode 311 and an end portion of the pixel electrode 391 are each covered with the partition 416. The pixel electrode 311 and the pixel electrode 391 each include a material that reflects visible light, and the common electrode 315 includes a material that transmits visible light.

A region where part of the active layer 313 overlaps with part of the light-emitting layer 393 is included in the example illustrated in FIG. 27A. The portion where the active layer 313 overlaps with the light-emitting layer 393 preferably overlaps with the light-blocking layer 358 and the partition 416.

The transistor 408, the transistor 409, and the transistor 410 are formed over the substrate 353. These transistors can be formed using the same materials in the same steps.

The insulating layer 412, an insulating layer 411, an insulating layer 425, an insulating layer 415, an insulating layer 418, and the insulating layer 414 are provided in this order over the substrate 353 with the adhesive layer 355 therebetween. Each of the insulating layer 411 and the insulating layer 425 partially functions as a gate insulating layer for the transistors. The insulating layer 415 and the insulating layer 418 are provided to cover the transistors. The insulating layer 414 is provided to cover the transistors and has a function of a planarization layer. Note that there is no limitation on the number of gate insulating layers and the number of insulating layers covering the transistors, and each insulating layer may have either a single layer or two or more layers.

A material into which impurities such as water or hydrogen do not easily diffuse is preferably used for at least one of the insulating layers that cover the transistors. This allows the insulating layer to serve as a barrier layer. Such a structure can effectively inhibit diffusion of impurities into the transistors from the outside and increase the reliability of the display apparatus.

An inorganic insulating film is preferably used as each of the insulating layer 412, the insulating layer 411, the insulating layer 425, the insulating layer 415, and the insulating layer 418. As the inorganic insulating film, a silicon nitride film, a silicon oxynitride film, a silicon oxide film, a silicon nitride oxide film, an aluminum oxide film, or an aluminum nitride film can be used, for example. A hafnium oxide film, a hafnium oxynitride film, a hafnium nitride oxide film, an yttrium oxide film, a zirconium oxide film, a gallium oxide film, a tantalum oxide film, a magnesium oxide film, a lanthanum oxide film, a cerium oxide film, a neodymium oxide film, or the like may be used. A stack including two or more of the above insulating films may also be used.

Here, an organic insulating film often has a lower barrier property than an inorganic insulating film. Therefore, the organic insulating film preferably has an opening in the vicinity of an end portion of the display apparatus 400. In a region 428 illustrated in FIG. 27A, an opening is formed in the insulating layer 414. This can inhibit entry of impurities from the end portion of the display apparatus 400 through the organic insulating film. Alternatively, the organic insulating film may be formed so that an end portion of the organic insulating film is positioned on the inner side compared to the end portion of the display apparatus 400, to prevent the organic insulating film from being exposed at the end portion of the display apparatus 400.

In the region 428 in the vicinity of the end portion of the display apparatus 400, the insulating layer 418 and the protective layer 395 are preferably in contact with each other through the opening in the insulating layer 414. In particular, the inorganic insulating film included in the insulating layer 418 and the inorganic insulating film included in the protective layer 395 are preferably in contact with each other. Thus, entry of impurities into the display portion 362 from the outside through an organic insulating film can be inhibited. Thus, the reliability of the display apparatus 400 can be increased.

An organic insulating film is suitable for the insulating layer 414 functioning as a planarization layer. Examples of materials that can be used for the organic insulating film include an acrylic resin, a polyimide resin, an epoxy resin, a polyamide resin, a polyimide-amide resin, a siloxane resin, a benzocyclobutene-based resin, a phenol resin, and precursors of these resins.

Providing the protective layer 395 covering the light-emitting element 390 and the light-receiving element 310 can inhibit impurities such as water from entering the light-emitting element 390 and the light-receiving element 310 and increase the reliability of the light-emitting element 390 and the light-receiving element 310.

The protective layer 395 may have a single-layer structure or a stacked-layer structure. For example, the protective layer 395 may have a stacked-layer structure of an organic insulating film and an inorganic insulating film. In that case, an end portion of the inorganic insulating film preferably extends beyond an end portion of the organic insulating film.

FIG. 27B is a cross-sectional view of a transistor 401a that can be used as the transistor 408, the transistor 409, and the transistor 410.

The transistor 401a is provided over the insulating layer 412 (not illustrated) and includes a conductive layer 421 functioning as a first gate, the insulating layer 411 functioning as a first gate insulating layer, a semiconductor layer 431, the insulating layer 425 functioning as a second gate insulating layer, and a conductive layer 423 functioning as a second gate. The insulating layer 411 is positioned between the conductive layer 421 and the semiconductor layer 431. The insulating layer 425 is positioned between the conductive layer 423 and the semiconductor layer 431.

The semiconductor layer 431 includes a region 431$i$ and a pair of regions 431$n$. The region 431$i$ functions as a channel formation region. One of the pair of regions 431$n$ serves as a source and the other thereof serves as a drain. The regions 431$n$ have higher carrier concentration and higher conductivity than the region 431$i$. The conductive layer 422$a$ and the conductive layer 422$b$ are connected to the regions 431$n$ through openings provided in the insulating layer 418 and the insulating layer 415.

FIG. 27C is a cross-sectional view of a transistor 401$b$ that can be used as the transistor 408, the transistor 409, and the transistor 410. Furthermore, in the example illustrated in FIG. 27, the insulating layer 415 is not provided. In the transistor 401$b$, the insulating layer 425 is processed in the same manner as the conductive layer 423, and the insulating layer 418 is in contact with the regions 431$n$.

Note that there is no particular limitation on the structure of the transistors included in the display apparatus of this embodiment. For example, a planar transistor, a staggered transistor, or an inverted staggered transistor can be used. A top-gate or a bottom-gate transistor structure may be employed. Alternatively, gates may be provided above and below a semiconductor layer in which a channel is formed.

The structure in which the semiconductor layer where a channel is formed is provided between two gates is used for the transistor 408, the transistor 409, and the transistor 410. The two gates may be connected to each other and supplied with the same signal to drive the transistor. Alternatively, a potential for controlling the threshold voltage may be supplied to one of the two gates and a potential for driving may be supplied to the other to control the threshold voltage of the transistor.

There is no particular limitation on the crystallinity of a semiconductor material used for the transistors; any of an amorphous semiconductor, a single crystal semiconductor, and a semiconductor having crystallinity (a microcrystalline semiconductor, a polycrystalline semiconductor, or a semiconductor partly including crystal regions) may be used. A semiconductor having crystallinity is preferably used, in which case deterioration of the transistor characteristics can be suppressed.

The semiconductor layer of the transistor preferably includes a metal oxide (also referred to as an oxide semiconductor). Alternatively, the semiconductor layer of the transistor may include silicon. Examples of silicon include amorphous silicon and crystalline silicon (e.g., low-temperature polysilicon or single crystal silicon).

The semiconductor layer preferably includes indium, M (M is one or more kinds selected from gallium, aluminum, silicon, boron, yttrium, tin, copper, vanadium, beryllium, titanium, iron, nickel, germanium, zirconium, molybdenum, lanthanum, cerium, neodymium, hafnium, tantalum, tungsten, and magnesium), and zinc, for example. In particular, M is preferably one or more kinds selected from aluminum, gallium, yttrium, and tin.

It is particularly preferable to use an oxide containing indium (In), gallium (Ga), and zinc (Zn) (also referred to as IGZO) for the semiconductor layer.

When the semiconductor layer is an In-M-Zn oxide, the atomic ratio of In is preferably greater than or equal to the atomic ratio of M in the In-M-Zn oxide. Examples of the atomic ratio of the metal elements in such an In-M-Zn oxide include In:M:Zn=1:1:1 or a composition in the neighborhood thereof, In:M:Zn=1:1:1.2 or a composition in the neighborhood thereof, In:M:Zn=2:1:3 or a composition in the neighborhood thereof, In:M:Zn=3:1:2 or a composition in the neighborhood thereof, In:M:Zn=4:2:3 or a composition in the neighborhood thereof, In:M:Zn=4:2:4.1 or a composition in the neighborhood thereof, In:M:Zn=5:1:3 or a composition in the neighborhood thereof, In:M:Zn=5:1:6 or a composition in the neighborhood thereof, In:M:Zn=5:1:7 or a composition in the neighborhood thereof, In:M:Zn=5:1:8 or a composition in the neighborhood thereof, In:M:Zn=6:1:6 or a composition in the neighborhood thereof, and In:M:Zn=5:2:5 or a composition in the neighborhood thereof. Note that a composition in the neighborhood includes the range of ±30% of a desired atomic ratio.

For example, when the atomic ratio is described as In:Ga:Zn=4:2:3 or a composition in the neighborhood thereof, the case is included where the atomic ratio of Ga is greater than or equal to 1 and less than or equal to 3 and the atomic ratio of Zn is greater than or equal to 2 and less than or equal to 4 with the atomic ratio of In being 4. When the atomic ratio is described as In:Ga:Zn=5:1:6 or a composition in the neighborhood thereof, the case is included where the atomic ratio of Ga is greater than 0.1 and less than or equal to 2 and the atomic ratio of Zn is greater than or equal to 5 and less than or equal to 7 with the atomic ratio of In being 5. When the atomic ratio is described as In:Ga:Zn=1:1:1 or a composition in the neighborhood thereof, the case is included where the atomic ratio of Ga is greater than 0.1 and less than or equal to 2 and the atomic ratio of Zn is greater than 0.1 and less than or equal to 2 with the atomic ratio of In being 1.

The transistor 410 included in the circuit 364 and the transistor 408 and the transistor 409 included in the display portion 362 may have the same structure or different structures. A plurality of transistors included in the circuit 364 may have the same structure or two or more kinds of structures. Similarly, a plurality of transistors included in the display portion 362 may have the same structure or two or more kinds of structures.

A connection portion 404 is provided in a region of the substrate 353 that does not overlap with the substrate 354. In the connection portion 404, the wiring 365 is electrically connected to the FPC 372 through a conductive layer 366 and a connection layer 442. The conductive layer 366 obtained by processing the same conductive film as the pixel electrode 311 and the pixel electrode 391 is exposed on a top surface of the connection portion 404. Thus, the connection portion 404 and the FPC 372 can be electrically connected to each other through the connection layer 442.

A variety of optical members can be arranged on the outer side of the substrate 354. Examples of the optical members include a polarizing plate, a retardation plate, a light diffusion layer (a diffusion film or the like), an anti-reflective layer, and a light-condensing film. Furthermore, an antistatic film preventing the attachment of dust, a water repellent film inhibiting the attachment of stain, a hard coat film inhibiting generation of a scratch caused by the use, a shock absorption layer, or the like may be placed on the outer side of the substrate 354.

When a flexible material is used for the substrate 353 and the substrate 354, the flexibility of the display apparatus can be increased. The material is not limited thereto, and glass, quartz, ceramic, sapphire, resin, or the like can be used for each of the substrate 353 and the substrate 354.

As the adhesive layer, a variety of curable adhesives, e.g., a photocurable adhesive such as an ultraviolet curable adhesive, a reactive curable adhesive, a thermosetting adhesive, and an anaerobic adhesive can be used. Examples of these adhesives include an epoxy resin, an acrylic resin, a silicone resin, a phenol resin, a polyimide resin, an imide resin, a PVC (polyvinyl chloride) resin, a PVB (polyvinyl butyral) resin, and an EVA (ethylene vinyl acetate) resin. In particular, a material with low moisture permeability, such as an epoxy resin, is preferred. Alternatively, a two-component resin may be used. An adhesive sheet or the like may be used.

As the connection layer, an anisotropic conductive film (ACF), an anisotropic conductive paste (ACP), or the like can be used.

Examples of materials that can be used for a gate, a source, and a drain of a transistor and conductive layers such as a variety of wirings and electrodes included in a display apparatus include metals such as aluminum, titanium, chromium, nickel, copper, yttrium, zirconium, molybdenum, silver, tantalum, or tungsten, and an alloy containing any of these metals as its main component. A film containing any of these materials can be used in a single layer or as a stacked-layer structure.

As a light-transmitting conductive material, a conductive oxide such as indium oxide, indium tin oxide, indium zinc oxide, zinc oxide, or zinc oxide containing gallium, or graphene can be used. Alternatively, a metal material such as gold, silver, platinum, magnesium, nickel, tungsten, chromium, molybdenum, iron, cobalt, copper, palladium, or titanium, or an alloy material containing the metal material can be used. Further alternatively, a nitride of the metal material (e.g., titanium nitride) or the like may be used. Note that in the case of using the metal material or the alloy material (or the nitride thereof), the thickness is preferably set small enough to be able to transmit light. A stacked-layer film of any of the above materials can be used as a conductive layer. For example, a stacked-layer film of indium tin oxide and an alloy of silver and magnesium, or the like is preferably used for increased conductivity. These materials can also be used for conductive layers such as a variety of wirings and electrodes that constitute a display apparatus, and conductive layers (conductive layers functioning as a pixel electrode or a common electrode) and the like included in a light-emitting element and a light-receiving element (or a light-emitting and light-receiving element).

As an insulating material that can be used for each insulating layer, for example, a resin such as an acrylic resin or an epoxy resin, and an inorganic insulating material such as silicon oxide, silicon oxynitride, silicon nitride oxide, silicon nitride, or aluminum oxide can be given.

At least part of this embodiment can be implemented in combination with the other embodiments described in this specification as appropriate.

Embodiment 3

Described in this embodiment is a metal oxide (also referred to as an oxide semiconductor) that can be used in an OS transistor described in the above embodiment.

The metal oxide preferably contains at least indium or zinc. In particular, indium and zinc are preferably contained. In addition, aluminum, gallium, yttrium, tin, or the like is preferably contained. Furthermore, one or more kinds selected from boron, silicon, titanium, iron, nickel, germanium, zirconium, molybdenum, lanthanum, cerium, neodymium, hafnium, tantalum, tungsten, magnesium, cobalt, and the like may be contained.

The metal oxide can be formed by a sputtering method, a chemical vapor deposition (CVD) method such as a metal organic chemical vapor deposition (MOCVD) method, an atomic layer deposition (ALD) method, or the like.

<Classification of Crystal Structures>

Amorphous (including a completely amorphous structure), CAAC (c-axis-aligned crystalline), nc (nanocrystalline), CAC (cloud-aligned composite), single crystal, and polycrystalline (poly crystal) structures can be given as examples of a crystal structure of an oxide semiconductor.

A crystal structure of a film or a substrate can be analyzed with an X-ray diffraction (XRD) spectrum. For example, evaluation is possible using an XRD spectrum obtained by GIXD (Grazing-Incidence XRD) measurement. Note that a GIXD method is also referred to as a thin film method or a Seemann-Bohlin method.

For example, the XRD spectrum of a quartz glass substrate shows a peak with a substantially bilaterally symmetrical shape. On the other hand, the peak of the XRD spectrum of an IGZO film having a crystal structure has a bilaterally asymmetrical shape. The asymmetrical peak of the XRD spectrum clearly shows the existence of crystal in the film or the substrate. In other words, the crystal structure of the film or the substrate cannot be regarded as "amorphous" unless it has a bilaterally symmetrical peak in the XRD spectrum.

A crystal structure of a film or a substrate can also be evaluated with a diffraction pattern obtained by a nanobeam electron diffraction method (NBED) (such a pattern is also referred to as a nanobeam electron diffraction pattern). For example, a halo pattern is observed in the diffraction pattern of the quartz glass substrate, which indicates that the quartz glass substrate is in an amorphous state. Furthermore, not a halo pattern but a spot-like pattern is observed in the diffraction pattern of the IGZO film deposited at room temperature. Thus, it is suggested that the IGZO film deposited at room temperature is in an intermediate state, which is neither a crystal state nor an amorphous state, and it cannot be concluded that the IGZO film is in an amorphous state.

<<Structure of Oxide Semiconductor>>

Oxide semiconductors might be classified in a manner different from the above-described one when classified in terms of the structure. Oxide semiconductors are classified into a single crystal oxide semiconductor and a non-single-crystal oxide semiconductor, for example. Examples of the non-single-crystal oxide semiconductor include the above-described CAAC-OS and nc-OS. Other examples of the non-single-crystal oxide semiconductor include a polycrystalline oxide semiconductor, an amorphous-like oxide semiconductor (a-like OS), and an amorphous oxide semiconductor.

Here, the above-described CAAC-OS, nc-OS, and a-like OS are described in detail.

[CAAC-OS]

The CAAC-OS is an oxide semiconductor that has a plurality of crystal regions each of which has c-axis alignment in a particular direction. Note that the particular direction refers to the film thickness direction of a CAAC-OS film, the normal direction of the surface where the CAAC-OS film is formed, or the normal direction of the surface of the CAAC-OS film. The crystal region refers to a region having a periodic atomic arrangement. When an atomic arrangement is regarded as a lattice arrangement, the crystal region also refers to a region with a uniform lattice arrangement. The CAAC-OS has a region where a plurality of crystal regions are connected in the a-b plane direction, and the region has distortion in some cases. Note that the distortion refers to a portion where the direction of a lattice arrangement changes between a region with a uniform lattice arrangement and another region with a uniform lattice arrangement in a region where a plurality of crystal regions are connected. That is, the CAAC-OS is an oxide semiconductor having c-axis alignment and having no clear alignment in the a-b plane direction.

Note that each of the plurality of crystal regions is formed of one or more fine crystals (crystals each of which has a maximum diameter of less than 10 nm). In the case where the crystal region is formed of one fine crystal, the maximum diameter of the crystal region is less than 10 nm. In the case where the crystal region is formed of a large number of fine crystals, the size of the crystal region may be approximately several tens of nanometers.

In the case of an In-M-Zn oxide (the element M is one or more kinds selected from aluminum, gallium, yttrium, tin, titanium, and the like), the CAAC-OS tends to have a layered crystal structure (also referred to as a layered structure) in which a layer containing indium (In) and oxygen (hereinafter, an In layer) and a layer containing the element M, zinc (Zn), and oxygen (hereinafter, an (M,Zn) layer) are stacked. Indium and the element M can be replaced with each other. Therefore, indium may be contained in the (M,Zn) layer. In addition, the element M may be contained in the In layer. Note that Zn may be contained in the In layer. Such a layered structure is observed as a lattice image in a high-resolution TEM (Transmission Electron Microscope) image, for example.

When the CAAC-OS film is subjected to structural analysis by out-of-plane XRD measurement with an XRD apparatus using θ/2θ scanning, for example, a peak indicating c-axis alignment is detected at 2θ of 31° or around 31°. Note that the position of the peak indicating c-axis alignment (the value of 2θ) may change depending on the kind, composition, or the like of the metal element contained in the CAAC-OS.

For example, a plurality of bright spots are observed in the electron diffraction pattern of the CAAC-OS film. Note that one spot and another spot are observed point-symmetrically with a spot of the incident electron beam passing through a sample (also referred to as a direct spot) as the symmetric center.

When the crystal region is observed from the particular direction, a lattice arrangement in the crystal region is basically a hexagonal lattice arrangement; however, a unit lattice is not always a regular hexagon and is a non-regular hexagon in some cases. A pentagonal lattice arrangement, a heptagonal lattice arrangement, and the like are included in the distortion in some cases. Note that a clear grain boundary cannot be observed even in the vicinity of the distortion in the CAAC-OS. That is, formation of a grain boundary is inhibited by the distortion of lattice arrangement. This is probably because the CAAC-OS can tolerate distortion owing to a low density of arrangement of oxygen atoms in the a-b plane direction, an interatomic bond distance changed by substitution of a metal atom, or the like.

A crystal structure in which a clear grain boundary is observed is what is called polycrystal. It is highly probable that the grain boundary becomes a recombination center and captures carriers and thus decreases the on-state current and field-effect mobility of a transistor, for example. Thus, the CAAC-OS in which no clear grain boundary is observed is one of crystalline oxides having a crystal structure suitable for a semiconductor layer of a transistor. Note that Zn is preferably contained to form the CAAC-OS. For example, an In—Zn oxide and an In—Ga—Zn oxide are suitable because they can inhibit generation of a grain boundary as compared with an In oxide.

The CAAC-OS is an oxide semiconductor with high crystallinity in which no clear grain boundary is observed. Thus, in the CAAC-OS, a reduction in electron mobility due to the grain boundary is unlikely to occur. Moreover, since the crystallinity of an oxide semiconductor might be decreased by entry of impurities, formation of defects, or the like, the CAAC-OS can be regarded as an oxide semiconductor that has a small amount of impurities and defects (e.g., oxygen vacancies). Hence, an oxide semiconductor including the CAAC-OS is physically stable. Therefore, the oxide semiconductor including the CAAC-OS is resistant to heat and has high reliability. In addition, the CAAC-OS is stable with respect to high temperature in the manufacturing process (what is called thermal budget). Accordingly, the use of the CAAC-OS for the OS transistor can extend the degree of freedom of the manufacturing process.

[nc-OS]

In the nc-OS, a microscopic region (e.g., a region with a size greater than or equal to 1 nm and less than or equal to 10 nm, in particular, a region with a size greater than or equal to 1 nm and less than or equal to 3 nm) has a periodic atomic arrangement. In other words, the nc-OS includes a fine crystal. Note that the size of the fine crystal is, for example, greater than or equal to 1 nm and less than or equal to 10 nm, particularly greater than or equal to 1 nm and less than or equal to 3 nm; thus, the fine crystal is also referred to as a nanocrystal. Furthermore, there is no regularity of crystal orientation between different nanocrystals in the nc-OS. Hence, the orientation in the whole film is not observed. Accordingly, the nc-OS cannot be distinguished from an a-like OS or an amorphous oxide semiconductor by some analysis methods. For example, when an nc-OS film is subjected to structural analysis using out-of-plane XRD measurement with an XRD apparatus using θ/2θ scanning, a peak indicating crystallinity is not detected. Furthermore, a diffraction pattern like a halo pattern is observed when the nc-OS film is subjected to electron diffraction (also referred to as selected-area electron diffraction) using an electron beam with a probe diameter larger than the diameter of a nanocrystal (e.g., larger than or equal to 50 nm). Meanwhile, in some cases, a plurality of spots in a ring-like region with a direct spot as the center are observed in the obtained electron diffraction pattern when the nc-OS film is subjected to electron diffraction (also referred to as nanobeam electron diffraction) using an electron beam with a probe diameter nearly equal to or smaller than the diameter of a nanocrystal (e.g., greater than or equal to 1 nm and less than or equal to 30 nm).

[a-like OS]

The a-like OS is an oxide semiconductor having a structure between those of the nc-OS and the amorphous oxide semiconductor. The a-like OS includes a void or a low-density region. That is, the a-like OS has lower crystallinity than the nc-OS and the CAAC-OS. Moreover, the a-like OS has higher hydrogen concentration in the film than the nc-OS and the CAAC-OS.

<<Composition of Oxide Semiconductor>>

Next, the above-described CAC-OS is described in detail. Note that the CAC-OS relates to the material composition.

[CAC-OS]

The CAC-OS refers to one composition of a material in which elements constituting a metal oxide are unevenly distributed with a size greater than or equal to 0.5 nm and less than or equal to 10 nm, preferably greater than or equal to 1 nm and less than or equal to 3 nm, or a similar size, for example. Note that a state in which one or more metal elements are unevenly distributed and regions including the metal element(s) are mixed with a size greater than or equal to 0.5 nm and less than or equal to 10 nm, preferably greater than or equal to 1 nm and less than or equal to 3 nm, or a similar size in a metal oxide is hereinafter referred to as a mosaic pattern or a patch-like pattern.

In addition, the CAC-OS has a composition in which materials are separated into a first region and a second region to form a mosaic pattern, and the first regions are distributed in the film (this composition is hereinafter also referred to as a cloud-like composition). That is, the CAC-OS is a composite metal oxide having a composition in which the first regions and the second regions are mixed.

Note that the atomic ratios of In, Ga, and Zn to the metal elements contained in the CAC-OS in an In—Ga—Zn oxide are denoted with [In], [Ga], and [Zn], respectively. For example, the first region in the CAC-OS in the In—Ga—Zn oxide has [In] higher than [In] in the composition of the CAC-OS film. Moreover, the second region has [Ga] higher than [Ga] in the composition of the CAC-OS film. For example, the first region has higher [In] and lower [Ga] than the second region. Moreover, the second region has higher [Ga] and lower [In] than the first region.

Specifically, the first region includes indium oxide, indium zinc oxide, or the like as its main component. The second region includes gallium oxide, gallium zinc oxide, or the like as its main component. That is, the first region can be referred to as a region containing In as its main component. The second region can be referred to as a region containing Ga as its main component.

Note that a clear boundary between the first region and the second region cannot be observed in some cases.

In a material composition of a CAC-OS in an In—Ga—Zn oxide that contains In, Ga, Zn, and O, regions containing Ga as a main component are observed in part of the CAC-OS and regions containing In as a main component are observed in part thereof. These regions randomly exist to form a mosaic pattern. Thus, it is suggested that the CAC-OS has a structure in which metal elements are unevenly distributed.

The CAC-OS can be formed by a sputtering method under a condition where a substrate is not heated, for example. Moreover, in the case of forming the CAC-OS by a sputtering method, any one or more selected from an inert gas (typically, argon), an oxygen gas, and a nitrogen gas are used as a deposition gas. The ratio of the flow rate of the oxygen gas to the total flow rate of the deposition gas in deposition is preferably as low as possible; for example, the ratio of the flow rate of the oxygen gas to the total flow rate of the deposition gas in deposition is higher than or equal to 0% and lower than 30%, preferably higher than or equal to 0% and lower than or equal to 10%.

For example, energy dispersive X-ray spectroscopy (EDX) is used to obtain EDX mapping, and according to the EDX mapping, the CAC-OS in the In—Ga—Zn oxide has a structure in which the region containing In as its main component (the first region) and the region containing Ga as its main component (the second region) are unevenly distributed and mixed.

Here, the first region has a higher conductivity than the second region. In other words, when carriers flow through the first region, the conductivity of a metal oxide is exhibited. Accordingly, when the first regions are distributed in a metal oxide as a cloud, high field-effect mobility ($\mu$) can be achieved.

The second region has a higher insulating property than the first region. In other words, when the second regions are distributed in a metal oxide, a leakage current can be inhibited.

Thus, in the case where the CAC-OS is used for a transistor, a switching function (On/Off switching function) can be given to the CAC-OS owing to the complementary action of the conductivity derived from the first region and the insulating property derived from the second region. A CAC-OS has a conducting function in part of the material and has an insulating function in another part of the material; as a whole, the CAC-OS has a function of a semiconductor. Separation of the conducting function and the insulating function can maximize each function. Accordingly, when the CAC-OS is used for a transistor, high on-state current ($I_{on}$), high field-effect mobility ($\mu$), and excellent switching operation can be achieved.

A transistor using a CAC-OS has high reliability. Thus, the CAC-OS is most suitable for a variety of semiconductor devices such as display apparatuses.

An oxide semiconductor has various structures with different properties. Two or more kinds among the amorphous oxide semiconductor, the polycrystalline oxide semiconductor, the a-like OS, the CAC-OS, the nc-OS, and the CAAC-OS may be included in an oxide semiconductor of one embodiment of the present invention.

<Transistor Including Oxide Semiconductor>

Next, the case where the above oxide semiconductor is used for a transistor is described.

When the above oxide semiconductor is used for a transistor, a transistor with high field-effect mobility can be achieved. In addition, a transistor having high reliability can be achieved.

An oxide semiconductor with a low carrier concentration is preferably used for the transistor. For example, the carrier concentration of an oxide semiconductor is lower than or equal to $1\times10^{17}$ cm$^{-3}$, preferably lower than or equal to $1\times10^{15}$ cm$^{-3}$, further preferably lower than or equal to $1\times10^{13}$ cm$^{-3}$, still further preferably lower than or equal to $1\times10^{11}$ cm$^{-3}$, yet further preferably lower than $1\times10^{10}$ cm$^{-3}$, and higher than or equal to $1\times10^{-9}$ cm$^{-3}$. In order to reduce the carrier concentration of an oxide semiconductor film, the impurity concentration in the oxide semiconductor film is reduced so that the density of defect states can be reduced. In this specification and the like, a state with a low impurity concentration and a low density of defect states is referred to as a highly purified intrinsic or substantially highly purified intrinsic state. Note that an oxide semiconductor having a low carrier concentration may be referred to as a highly purified intrinsic or substantially highly purified intrinsic oxide semiconductor.

A highly purified intrinsic or substantially highly purified intrinsic oxide semiconductor film has a low density of defect states and accordingly has a low density of trap states in some cases.

Charge trapped by the trap states in the oxide semiconductor takes a long time to disappear and might behave like fixed electric charge. Thus, a transistor whose channel formation region is formed in an oxide semiconductor with a high density of trap states has unstable electrical characteristics in some cases.

Accordingly, in order to obtain stable electrical characteristics of a transistor, reducing the impurity concentration in an oxide semiconductor is effective. In order to reduce the impurity concentration in the oxide semiconductor, it is preferable that the impurity concentration in an adjacent film be also reduced. Examples of impurities include hydrogen, nitrogen, an alkali metal, an alkaline earth metal, iron, nickel, and silicon.

<Impurities>

Here, the influence of each impurity in the oxide semiconductor is described.

When silicon or carbon, which is one of Group 14 elements, is contained in the oxide semiconductor, defect states are formed in the oxide semiconductor. Thus, the concentration of silicon or carbon in the oxide semiconductor and the concentration of silicon or carbon in the vicinity of an interface with the oxide semiconductor (the concentration measured by secondary ion mass spectrometry (SIMS)) are lower than or equal to $2\times10^{18}$ atoms/cm$^3$, preferably lower than or equal to $2\times10^{17}$ atoms/cm$^3$.

When the oxide semiconductor contains an alkali metal or an alkaline earth metal, defect states are formed and carriers are generated in some cases. Accordingly, a transistor including an oxide semiconductor that contains an alkali metal or an alkaline earth metal tends to have normally-on characteristics. Thus, the concentration of an alkali metal or an alkaline earth metal in the oxide semiconductor, which is obtained by SIMS, is lower than or equal to $1\times10^{18}$ atoms/cm$^3$, preferably lower than or equal to $2\times10^{16}$ atoms/cm$^3$.

When the oxide semiconductor contains nitrogen, the oxide semiconductor easily becomes n-type by generation of electrons serving as carriers and an increase in carrier concentration. As a result, a transistor using an oxide semiconductor containing nitrogen as a semiconductor is likely to have normally-on characteristics. When nitrogen is contained in the oxide semiconductor, a trap state is sometimes formed. This might make the electrical characteristics of the transistor unstable. Therefore, the concentration of nitrogen in the oxide semiconductor, which is obtained by SIMS, is lower than $5\times10^{19}$ atoms/cm$^3$, preferably lower than or equal to $5\times10^{18}$ atoms/cm$^3$, further preferably lower than or equal to $1\times10^{18}$ atoms/cm$^3$, still further preferably lower than or equal to $5\times10^{17}$ atoms/cm$^3$.

Hydrogen contained in the oxide semiconductor reacts with oxygen bonded to a metal atom to be water, and thus forms an oxygen vacancy in some cases. Entry of hydrogen into the oxygen vacancy generates an electron serving as a carrier in some cases. Furthermore, bonding of part of hydrogen to oxygen bonded to a metal atom causes generation of an electron serving as a carrier in some cases. Thus, a transistor using an oxide semiconductor containing hydrogen is likely to have normally-on characteristics. Accordingly, hydrogen in the oxide semiconductor is preferably reduced as much as possible. Specifically, the hydrogen concentration in the oxide semiconductor, which is obtained by SIMS, is lower than $1\times10^{20}$ atoms/cm$^3$, preferably lower than $1\times10^{19}$ atoms/cm$^3$, further preferably lower than $5\times10^{18}$ atoms/cm$^3$, still further preferably lower than $1\times10^{18}$ atoms/cm$^3$.

When an oxide semiconductor with sufficiently reduced impurities is used for the channel formation region of the transistor, stable electrical characteristics can be given.

At least part of this embodiment can be implemented in combination with the other embodiments described in this specification as appropriate.

Embodiment 4

In this embodiment, electronic devices of embodiments of the present invention will be described.

Electronic devices of one embodiment of the present invention can capture images in their display portions and perform authentication such as fingerprint authentication. Consequently, the electronic devices can have improved functionality, convenience, and the like.

Figure 28A:
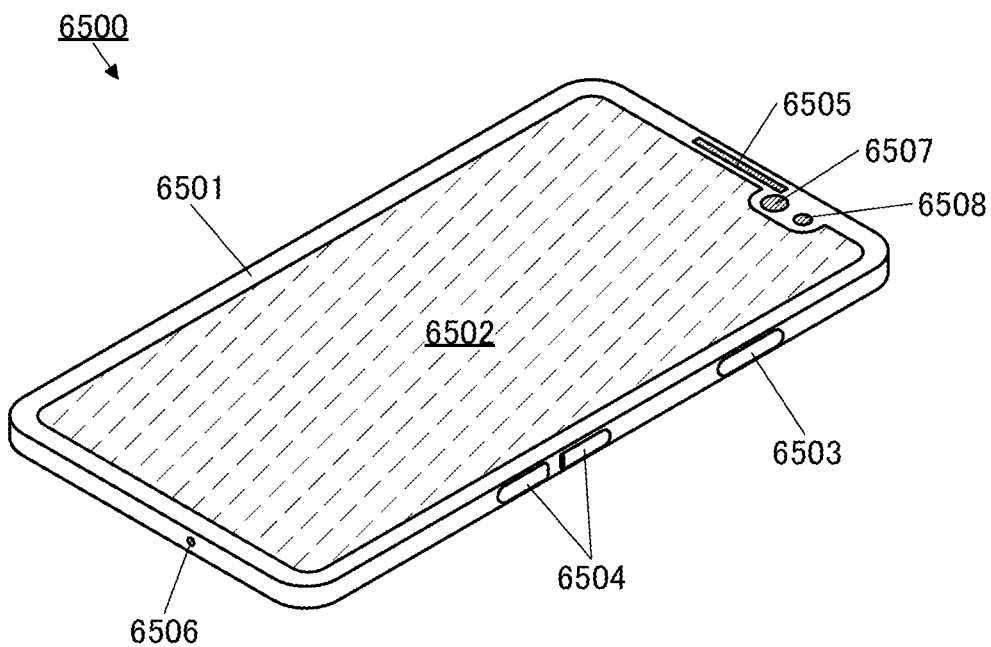
FIG. 28A and FIG. 28B are diagrams illustrating a structure example of an electronic device.

An electronic device 6500 illustrated in FIG. 28A is a portable information terminal that can be used as a smartphone.

The electronic device 6500 includes a housing 6501, a display portion 6502, an operation button 6503, operation buttons 6504, a speaker 6505, a microphone 6506, a camera 6507, a light source 6508, and the like. The display portion 6502 has a touch panel function.

The display apparatus described in the above embodiments can be used in the display portion 6502.

Figure 28B:
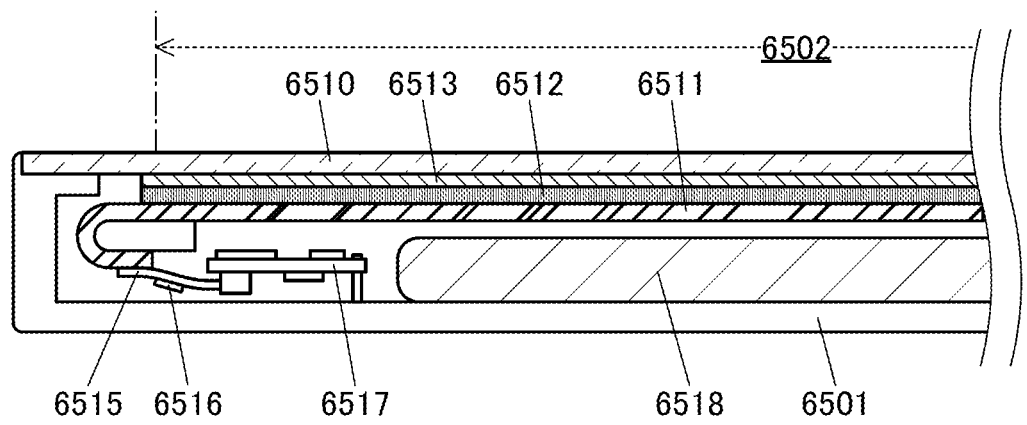

FIG. 28B is a schematic cross-sectional view including an end portion of the housing 6501 on the microphone 6506 side.

A protection member 6510 having a light-transmitting property is provided on the display surface side of the housing 6501, and a display apparatus 6511, an optical member 6512, a touch sensor panel 6513, a printed circuit board 6517, a battery 6518, and the like are provided in a space surrounded by the housing 6501 and the protection member 6510.

The display apparatus 6511, the optical member 6512, and the touch sensor panel 6513 are fixed to the protection member 6510 with an adhesive layer (not illustrated).

Part of the display apparatus 6511 is folded back in a region outside the display portion 6502, and an FPC 6515 is connected to the part that is folded back. An IC 6516 is mounted on the FPC 6515. The FPC 6515 is connected to a terminal provided on the printed circuit board 6517.

A flexible display of one embodiment of the present invention can be used as the display apparatus 6511. Thus, an extremely lightweight electronic device can be achieved. Since the display apparatus 6511 is extremely thin, the battery 6518 with high capacity can be mounted with the thickness of the electronic device controlled. An electronic device with a narrow frame can be achieved when part of the display apparatus 6511 is folded back so that the portion connected to the FPC 6515 is provided on the rear side of a pixel portion.

Using the display apparatus described in the above embodiment as the display apparatus 6511 allows image capturing on the display portion 6502. For example, an image of a fingerprint is captured by the display apparatus 6511; thus, fingerprint authentication can be performed. The display apparatus 6511 employing the display apparatus described in the above embodiment can perform authentication such as fingerprint authentication in a short time.

When the display portion 6502 further includes the touch sensor panel 6513, the display portion 6502 can be provided with a touch panel function. A variety of types such as a capacitive type, a resistive type, a surface acoustic wave type, an infrared type, an optical type, and a pressure-sensitive type can be used for the touch sensor panel 6513. Alternatively, the display apparatus 6511 may function as a touch sensor; in such a case, the touch sensor panel 6513 is not necessarily provided.

Electronic devices illustrated in FIG. 29A to FIG. 29F include a housing 9000, a display portion 9001, a speaker 9003, an operation key 9005 (including a power switch or an operation switch), a connection terminal 9006, a sensor 9007 (a sensor having a function of measuring force, displacement, position, speed, acceleration, angular velocity, rotational frequency, distance, light, liquid, magnetism, temperature, a chemical substance, sound, time, hardness, electric field, current, voltage, electric power, radiation, flow rate, humidity, gradient, oscillation, a smell, or infrared rays), a microphone 9008, and the like.

The display apparatus described in the above embodiments can be used in the display portion 9001. Therefore, the electronic device can perform authentication such as fingerprint authentication in a short time.

The electronic devices illustrated in FIG. 29A to FIG. 29F have a variety of functions. For example, the electronic devices can have a function of displaying a variety of information (a still image, a moving image, a text image, and the like) on the display portion, a touch panel function, a function of displaying a calendar, date, time, and the like, a function of controlling processing with the use of a variety of software (programs), a wireless communication function, and a function of reading out and processing a program or data stored in a recording medium. Note that the functions of the electronic devices are not limited thereto, and the electronic devices can have a variety of functions. The electronic devices may include a plurality of display portions. The electronic devices may each include a camera or the like and have a function of taking a still image or a moving image and storing the taken image in a recording medium (an external recording medium or a recording medium incorporated in the camera), a function of displaying the taken image on the display portion, or the like.

The details of the electronic devices illustrated in FIG. 29A to FIG. 29F are described below.

Figure 29A:
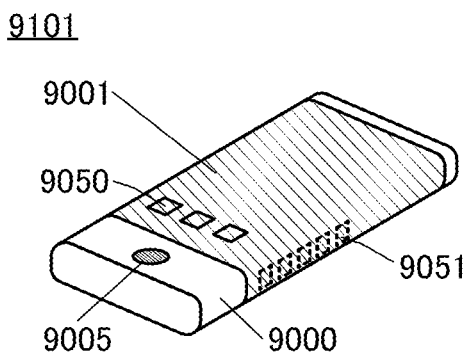
FIG. 29A to FIG. 29F are diagrams illustrating structure examples of electronic devices.

FIG. 29A is a perspective view illustrating a portable information terminal 9101. The portable information terminal 9101 can be used as a smartphone, for example. Note that the portable information terminal 9101 may be provided with the speaker 9003, the connection terminal 9006, the sensor 9007, or the like. The portable information terminal 9101 can display letters and image information on its plurality of surfaces. FIG. 29A illustrates an example where three icons 9050 are displayed. Information 9051 indicated by dashed rectangles can be displayed on another surface of the display portion 9001. Examples of the information 9051 include notification of reception of an e-mail, SNS, an incoming call, or the like, the title and sender of an e-mail, SNS, or the like, the date, the time, remaining battery, and the reception strength of an antenna. Alternatively, the icon 9050 or the like may be displayed at the position where the information 9051 is displayed.

Figure 29B:
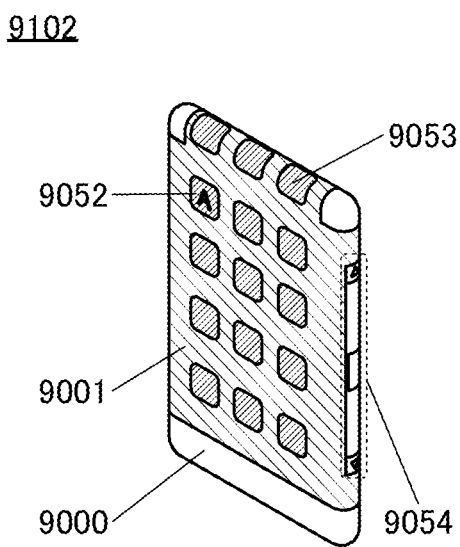

FIG. 29B is a perspective view illustrating a portable information terminal 9102. The portable information terminal 9102 has a function of displaying information on three or more surfaces of the display portion 9001. Here, an example in which information 9052, information 9053, and information 9054 are displayed on different surfaces is shown. For example, a user can check the information 9053 displayed at a position that can be observed from above the portable information terminal 9102, with the portable information terminal 9102 put in a breast pocket of his/her clothes. The user can see the display without taking out the portable information terminal 9102 from the pocket and decide whether to answer the call, for example.

Figure 29C:
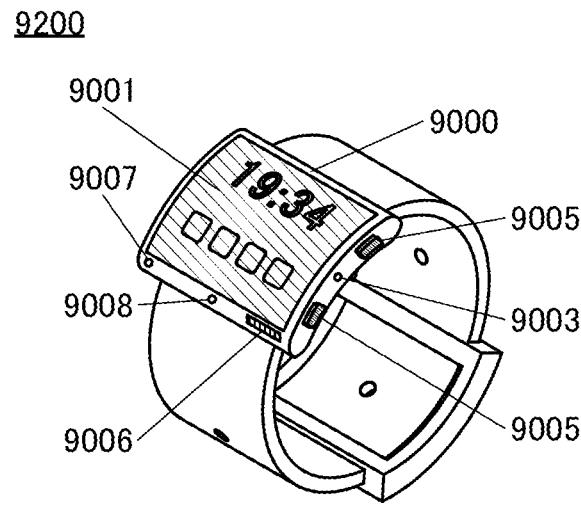

FIG. 29C is a perspective view illustrating a watch-type portable information terminal 9200. The information terminal 9200 can be used as a smartwatch, for example. The display portion 9001 is provided such that its display surface is curved, and display can be performed along the curved display surface. Mutual communication between the portable information terminal 9200 and, for example, a headset capable of wireless communication enables hands-free calling. With the connection terminal 9006, the portable information terminal 9200 can perform mutual data transmission with another information terminal, and charging. Note that the charging operation may be performed by wireless power feeding.

Figure 29D:
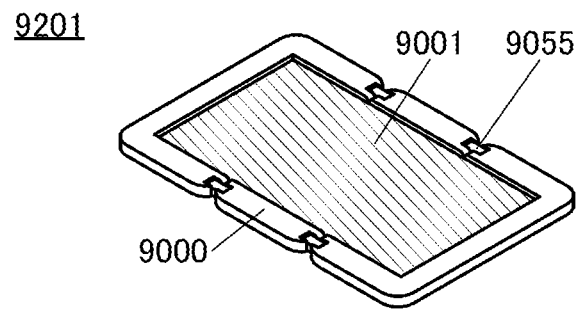
Figure 29E:
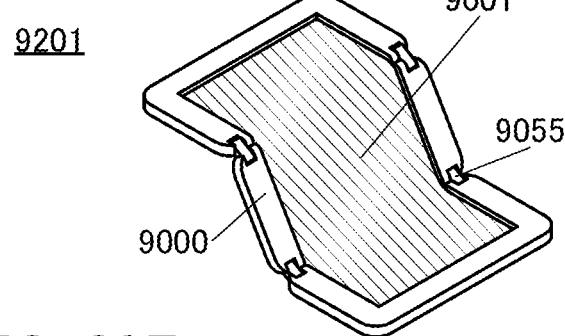
Figure 29F:
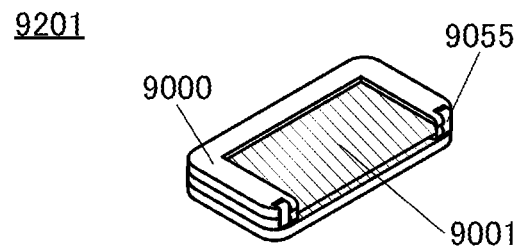

FIG. 29D to FIG. 29F are perspective views illustrating a foldable portable information terminal 9201. FIG. 29D is a perspective view of an opened state of the portable information terminal 9201, FIG. 29F is a perspective view of a folded state thereof, and FIG. 29E is a perspective view of a state in the middle of change from one of FIG. 29D and FIG. 29F to the other. The portable information terminal 9201 is highly portable in the folded state and is highly browsable in the opened state because of a seamless large display region. The display portion 9001 of the portable information terminal 9201 is supported by three housings 9000 joined by hinges 9055. For example, the display portion 9001 can be curved with a radius of curvature greater than or equal to 0.1 mm and less than or equal to 150 mm.

At least part of this embodiment can be implemented in combination with the other embodiments described in this specification as appropriate.

REFERENCE NUMERALS

10: display apparatus, 10A: display apparatus, 11: display portion, 11a: display portion, 11aa: display portion, 11ab: display portion, 11b: display portion, 11ba: display portion, 11bb: display portion, 12: data driver circuit, 13: gate driver circuit, 13a: gate driver circuit, 13b: gate driver circuit, 14: row driver circuit, 14a: row driver circuit, 14b: row driver circuit, 15: circuit, 16: column driver circuit, 17: control circuit, 18: arithmetic circuit, 21: subpixel, 21B: subpixel, 21G: subpixel, 21R: subpixel, 22: imaging pixel, 30: pixel, 30a: pixel, 30b: pixel, 31: finger, 32: fingerprint, 32L: fingerprint, 33: point, 33L: point, 34: point, 34L: point, 35: contact region, 35L: contact region, 36: path, 36L: path, 37: housing, 41: shift register circuit, 42: switch circuit, 43: signal output circuit, 43a: signal output circuit, 43b: signal output circuit, 44: circuit, 44a: circuit, 44b: circuit, 50: electronic device, 51: arithmetic device, 52: learning data, 53: correct label, 55: input data, 56: output data, 91: substrate, 92: substrate, 94: light, 95: light, 200: display apparatus, 200A: display apparatus, 200B: display apparatus, 201: substrate, 202: substrate, 203: functional layer, 211: light-emitting element, 211B: light-emitting element, 211G: light-emitting element, 211IR: light-emitting element, 211R: light-emitting element, 211W: light-emitting element, 211X: light-emitting element, 212: light-receiving element, 213R: light-emitting and light-receiving element, 220: finger, 221: contact portion, 222: fingerprint, 223: imaging range, 225: stylus, 226: path, 270B: light-emitting element, 270G: light-emitting element, 270PD: light-receiving element, 270R: light-emitting element, 270SR: light-emitting and light-receiving element, 271: pixel electrode, 273: active layer, 275: common electrode, 277: electrode, 278: electrode, 280A: display apparatus, 280B: display apparatus, 280C: display apparatus, 281: hole-injection layer, 281-2: hole-transport layer, 282: hole-transport layer, 282-1: hole-transport layer, 282-2: hole-transport layer, 283: light-emitting layer, 283B: light-emitting layer, 283G: light-emitting layer, 283R: light-emitting layer, 284: electron-transport layer, 285: electron-injection layer, 289: layer, 300A: display apparatus, 300B: display apparatus, 300C: display apparatus, 300D: display apparatus, 300E: display apparatus, 300F: display apparatus, 300G: display apparatus, 300H: display apparatus, 310: light-receiving element, 311: pixel electrode, 312: buffer layer, 313: active layer, 314: buffer layer, 315: common electrode, 318R: light-emitting and light-receiving layer, 321: visible light, 321B: light, 321G: light, 321R: light, 322: light, 323: light, 324: reflected light, 331: transistor, 332: transistor, 332B: transistor, 332G: transistor, 342: adhesive layer, 349: lens, 351: substrate, 352: substrate, 353: substrate, 354: substrate, 355: adhesive layer, 358: light shielding layer, 362: display portion, 364: circuit, 365: wiring, 366: conductive layer, 372: FPC, 373: IC, 390: light-emitting element, 390B: light-emitting element, 390G: light-emitting element, 390SR: light-emitting and light-receiving element, 391: pixel electrode, 391B: pixel electrode, 391G: pixel electrode, 392: buffer layer, 393: light-emitting layer, 393B: light-emitting layer, 393G: light-emitting layer, 393R: light-emitting layer, 394: buffer layer, 395: protective layer, 400: display apparatus, 401a: transistor, 401b: transistor, 404: connection portion, 408: transistor, 409: transistor, 410: transistor, 411: insulating layer, 412: insulating layer, 414: insulating layer, 415: insulating layer, 416: partition wall, 418: insulating layer, 421: conductive layer, 422a: conductive layer, 422b: conductive layer, 423: conductive layer, 425: insulating layer, 428: region, 431: semiconductor layer, 431i: region, 431n: region, 442: connection layer, 6500: electronic device, 6501: housing, 6502: display portion, 6503: operation button, 6504: operation button, 6505: speaker, 6506: microphone, 6507: camera, 6508: light source, 6510: protection member, 6511: display apparatus, 6512: optical member, 6513: touch sensor panel, 6515: FPC, 6516: IC, 6517: printed circuit board, 6518: battery, 9000: housing, 9001: display portion, 9003: speaker, 9005: operation button, 9006: connection terminal, 9007: sensor, 9008: microphone, 9050: icon, 9051: information, 9052: information, 9053: information, 9054: information, 9055: hinge, 9101: portable information terminal, 9102: portable information terminal, 9200: portable information terminal, 9201: portable information terminal This application is based on Japanese Patent Application Serial No. 2020-077033 filed on Apr. 24, 2020, the entire contents are hereby incorporated herein by reference.

The invention claimed is:
1. A display apparatus comprising:
a first display portion where first pixels are arranged in a matrix;
a second display portion where second pixels are arranged in a matrix;
a first row driver circuit;
a second row driver circuit; and
a control circuit,
wherein each of the first pixels and the second pixels comprises a light-receiving element, wherein each of the first pixels and the second pixels is configured to acquire imaging data using the light-receiving element,
wherein the first row driver circuit is configured to select one of the first pixels from which the imaging data is to be read out,
wherein the second row driver circuit is configured to select one of the second pixels from which the imaging data is to be read out,
wherein the control circuit is configured to perform driving in a first mode in which the first row driver circuit and the second row driver circuit are sequentially driven,
wherein the control circuit is configured to perform driving in a second mode in which one of the first row driver circuit and the second row driver circuit is driven based on a basis of the imaging data, and
wherein each of scan rates of the first row driver circuit and the second row driver circuit in the first mode is higher than a scan rate of the first row driver circuit or the second row driver circuit in the second mode.

2. The display apparatus according to claim 1,
wherein each of the first pixels and the second pixels comprises a transistor,
wherein one of a source and a drain of the transistor is electrically connected to one electrode of the light-receiving element, and
wherein the transistor comprises a semiconductor layer comprising a metal oxide.

3. The display apparatus according to claim 1,
wherein each of the first pixels and the second pixels comprises a light-emitting element.

4. The display apparatus according to claim 1,
wherein in the first mode, the control circuit is configured to detect an object in contact with the first display portion or the second display portion on a basis of the imaging data, and
wherein in the second mode, the control circuit is configured to perform authentication.

5. The display apparatus according to claim 4, further comprising a machine learning arithmetic circuit,
wherein when the object moves from a first point to a second point in the first display portion or the second display portion, the machine learning arithmetic circuit is configured to perform authentication on a basis of a path of the object from the first point to the second point.

6. An electronic device comprising the display apparatus according to claim 5, and a housing,
wherein the machine learning arithmetic circuit is configured to perform the authentication on a basis of a contact region of the housing.

7. An electronic device comprising:
the display apparatus according to claim 1; and
an operation button.

8. A method of driving a display apparatus comprising a first display portion and a second display portion in each of which pixels each comprising a light-receiving element are arranged in a matrix, comprising the steps of:
acquiring first imaging data by using the light-receiving element of each of one of the pixels provided in the first display portion and one of the pixels provided in the second display portion;
reading out the first imaging data by one of the pixels provided in the first display portion and then reading out the first imaging data by one of the pixels provided in the second display portion;
selecting one of the first display portion and the second display portion on a basis of the first imaging data; and
acquiring second imaging data by using the light-receiving element and then reading out the second imaging data in one of the pixels provided in the selected display portion,
wherein time required for reading out the second imaging data is longer than time required for reading out the first imaging data.

9. The method of driving a display apparatus according to claim 8,
wherein the pixel comprises a transistor,
wherein one of a source and a drain of the transistor is electrically connected to one electrode of the light-receiving element, and
wherein the transistor comprises a semiconductor layer comprising a metal oxide.

10. The method of driving a display apparatus according to claim 8,
wherein each of the pixels comprises a light-emitting element.

11. The method of driving a display apparatus according to claim 8, further comprising the steps of:
detecting an object in contact with the first display portion or the second display portion on a basis of the first imaging data and then selecting a display portion in contact with the object; and
performing authentication on a basis of the second imaging data.

* * * * *